US012375866B2

(12) United States Patent
Liu et al.

(10) Patent No.: US 12,375,866 B2
(45) Date of Patent: Jul. 29, 2025

(54) AUDIO PROCESSING METHOD AND ELECTRONIC DEVICE

(71) Applicant: Beijing Honor Device Co., Ltd., Beijing (CN)

(72) Inventors: Zhenyi Liu, Beijing (CN); Jianyong Xuan, Beijing (CN); Haikuan Gao, Beijing (CN)

(73) Assignee: Beijing Honor Device Co., Ltd., Beijing (CN)

( * ) Notice: Subject to any disclaimer, the term of this patent is extended or adjusted under 35 U.S.C. 154(b) by 0 days.

(21) Appl. No.: 17/925,373

(22) PCT Filed: Apr. 22, 2022

(86) PCT No.: PCT/CN2022/088335
§ 371 (c)(1),
(2) Date: Nov. 15, 2022

(87) PCT Pub. No.: WO2022/262416
PCT Pub. Date: Dec. 22, 2022

(65) Prior Publication Data
US 2024/0236596 A1 Jul. 11, 2024

(30) Foreign Application Priority Data

Jun. 16, 2021 (CN) .................. 202110667735.X

(51) Int. Cl.
H04S 7/00 (2006.01)
G06F 3/16 (2006.01)
H04N 21/414 (2011.01)
H04N 21/422 (2011.01)
H04N 21/4223 (2011.01)
H04N 21/43 (2011.01)
(Continued)

(52) U.S. Cl.
CPC .............. H04S 7/301 (2013.01); G06F 3/165 (2013.01); H04N 23/631 (2023.01); H04N 23/667 (2023.01); H04N 23/90 (2023.01)

(58) Field of Classification Search
None
See application file for complete search history.

(56) References Cited

U.S. PATENT DOCUMENTS 8,761,420 B2 6/2014 Negi et al.
9,247,192 B2 1/2016 Lee et al.
(Continued)

FOREIGN PATENT DOCUMENTS

CN 103516895 A 1/2014
CN 104699445 A 6/2015
(Continued)

Primary Examiner — Qin Zhu
(74) Attorney, Agent, or Firm — Womble Bond Dickinson (US) LLP

(57) ABSTRACT

An audio processing method and an electronic device are provided. In a dual-view recording mode, the electronic device perform filtering, azimuth virtualization, and remixing on collected audio based on focal lengths of pictures in two display regions, relative positions of the two display regions, and values of areas of the two display regions, so that audio-picture presentation synchronization of the picture and the sound is achieved, and a user has synchronized three-dimensional experience in terms of hearing and vision.

18 Claims, 29 Drawing Sheets

(51) Int. Cl.
*H04N 21/431* (2011.01)
*H04N 21/439* (2011.01)
*H04N 21/4402* (2011.01)
*H04N 21/442* (2011.01)
*H04N 23/63* (2023.01)
*H04N 23/667* (2023.01)
*H04N 23/90* (2023.01)

(56) References Cited

U.S. PATENT DOCUMENTS

| | | | |
|---|---|---|---|
| 10,387,007 | B2 | 8/2019 | Silva et al. |
| 2014/0267842 | A1 | 9/2014 | Lee et al. |
| 2015/0163587 | A1 | 6/2015 | Li |
| 2022/0159183 | A1 | 5/2022 | Li et al. |
| 2023/0116044 | A1* | 4/2023 | Han .............. G11B 27/34 348/220.1 |

FOREIGN PATENT DOCUMENTS

| | | |
|---|---|---|
| CN | 105165017 A | 12/2015 |
| CN | 108337465 A | 7/2018 |
| CN | 108683874 A | 10/2018 |
| CN | 110072070 A | 7/2019 |
| CN | 110740259 A | 1/2020 |
| CN | 112351248 A | 2/2021 |
| CN | 113573120 A | 10/2021 |
| EP | 2104343 A1 | 9/2009 |
| EP | 2680615 A1 | 1/2014 |
| EP | 2882170 A1 | 6/2015 |
| JP | 2008048374 A | 2/2008 |

* cited by examiner

AUDIO PROCESSING METHOD AND ELECTRONIC DEVICE

CROSS-REFERENCE TO RELATED APPLICATIONS

This application is a National Stage of International Application No. PCT/CN2022/088335, filed Apr. 22, 2022, which claims priority to Chinese Patent Application No. 202110667735.X, filed on Jun. 16, 2021, both of which are incorporated herein by reference in their entireties.

TECHNICAL FIELD

This application relates to the field of terminal technologies, and in particular, to an audio processing method and an electronic device.

BACKGROUND

Nowadays video shooting and production have become an indispensable part of our daily life and entertainment. In video shooting and play scenarios, users have increasingly high requirements on visual perception of video images and auditory perception of video and audio. Currently, in terms of vision, three-dimensional vision technologies have become mature, which can make video pictures have a stereoscopic effect. However, auditory perception of a video cannot match up with visual perception to create synchronous spatial experience, which affects use experience.

Therefore, how to create a stereoscopic effect of audio for a user to match up with a stereoscopic effect of video images is an urgent problem to be resolved.

SUMMARY

Objectives of this application are to provide an audio processing method, a graphical user interface (graphic user interface, GUI), and an electronic device. An electronic device can render audio of a video based on image interface information in the video, so that audio-picture presentation synchronization of the video is achieved. When an image interface of the video changes, the audio of the video is adjusted accordingly based on the image interface. In this way, a picture and a sound of the video can synchronously bring three-dimensional experience to a user, thereby providing better user experience.

The foregoing objects and other objects are achieved by features of the independent claims. Further implementations are embodied in the dependent claims, the specification, and the drawings.

According to a first aspect, an audio processing method is provided. The method includes: displaying a first interface, where the first interface includes a first control; detecting a first operation on the first control; in response to the first operation, starting shooting at a first moment T1, and displaying a second interface, where the second interface includes a first display region and a second display region; after first duration t1, at a second moment T2, displaying, by the electronic device in the first display region, a first picture collected in real time by a first camera, and displaying, in the second display region, a second picture collected in real time by a second camera; collecting, by a microphone, a first sound at the second moment T2, where the first sound is a sound of a real-time environment in which the electronic device is located at the second moment; detecting a second operation on a third control; in response to the second operation, stopping shooting, and storing a first video, where the first video includes the first picture and the second picture; displaying a third interface, where the third interface includes the third control; detecting a third operation on the third control, and playing the first video; and in the first duration of the first video, playing the first picture, the second picture, and the second sound, where the second sound is obtained by processing the first sound based on picture weights of the first picture and the second picture.

According to the method provided in the first aspect, during playing of a dual-view video, a sound heard by a user and a picture seen by the user may have a synchronous stereoscopic effect.

With reference to the first aspect, in a possible implementation, the electronic device displays the first display region and the second display region in a horizontally split-screen form, an area of the first display region is a first area, and an area of the second display region is a second area. The picture weight of the first picture is a proportion of the first area to a total area, the picture weight of the second picture is a proportion of the second area to the total area, and the total area is a sum of the areas of the first region and the second region.

With reference to the first aspect, in a possible implementation, the first display region is displayed on the second display region in a form of a floating window; An area of the first display region is a first area, and an area of a display of the electronic device is a third area; and the picture weight of the first picture is a proportion of the first area to the third area, and the picture weight of the second picture is a difference between the integer 1 and the picture weight of the first picture.

With reference to the first aspect, in a possible implementation, the first sound includes a first sub-sound and a second sub-sound, the first sub-sound is a sound of the first picture, the second sub-sound is a sound of the second picture, and the processing the first sound based on picture weights of the first picture and the second picture includes: mixing the first sub-sound and the second sub-sound based on the picture weights of the first picture and the second picture; and when the picture weight of the first picture is greater than the weight of the second picture, using a first sound mixing proportion so that loudness of the first sub-sound is larger than loudness of the second sub-sound; or when the picture weight of the first picture is less than the weight of the second picture, using a second sound mixing proportion so that loudness of the first sub-sound is smaller than loudness of the second sub-sound; or when the picture weight of the first picture is equal to the weight of the second picture, using a third sound mixing proportion so that loudness of the first sub-sound is equal to loudness of the second sub-sound.

In this implementation, two sounds included in the first audio can be used to match up with sizes of the two display regions to adjust a proportion for mixing, so as to create hearing experience that a sound from a display region with a larger area is also larger and a sound from a display region with a smaller area is also smaller.

With reference to the first aspect, in a possible implementation, before the detecting a second operation on a third control, the method further includes: storing, by the electronic device, the first sound. The processing the first sound based on picture weights of the first picture and the second picture includes: processing, by the electronic device, the first sound based on the picture weights of the first picture and the second picture to obtain the second sound; and storing, by the electronic device, the second sound, and deleting the first sound.

In this implementation, the unprocessed audio is first stored, and then is processed after being stored, which can reduce occupation of a processor during an audio recording process and improve smoothness of the audio recording process.

With reference to the first aspect, in a possible implementation, the first sound includes a first sub-sound and a second sub-sound, the first sub-sound is a sound of the first picture, the second sub-sound is a sound of the second picture, and the processing the first sound based on picture weights of the first picture and the second picture includes: separately filtering, by the electronic device, the first sound based on a first field of view of the first camera and a second field of view of the second camera to obtain the first sub-sound and the second sub-sound; and adjusting, by the electronic device, loudness of the first sub-sound and loudness of the second sub-sound based on the picture weights of the first picture and the second picture, and then mixing the first sub-sound and the second sub-sound, to obtain the second sound.

It can be understood that during playing of a video file recorded in a dual-view recording mode, the electronic device displays two pictures on the display, and the two pictures are from two different cameras during recording. When the video file is watched, sizes of the two pictures and directions and ranges of viewing angles may be different. For example, in the first picture, a face image of the user shot by a front-facing camera of the electronic device is presented; in the second picture, a landscape image shot by a rear-facing camera of the electronic device is presented. In addition, the user may adjust focal length multipliers of the front-facing camera and the rear-facing camera to change the viewing angles of the face image and the landscape image presented in the first picture and the second picture. When the focal length multiplier becomes smaller, a size of the image in the screen is reduced proportionally, and the user visually feels that the user is farther away from things in the screen, but a field of view range becomes larger. When the focal length multiplier becomes larger, a size of the image in the screen is increased proportionally, and the user visually feels that the user is closer to things in the screen, but a field of view range becomes smaller.

A sound not only has loudness, but also has directionality, and such directionality may be perceived by humans. Therefore, in this embodiment of this application, in order to match up with visual perception brought to the user by a field of view range presented to the user by image area sizes of the two pictures, in this method, the electronic device performs enhancement on audio collected in a field of view direction of the first picture to obtain a sound corresponding to the field of view direction of the first picture; performs enhancement on audio collected in a field of view direction of the second picture to obtain a sound corresponding to the field of view direction of the second picture; and then adjusts a proportion for mixing the two sounds based on areas of the first display region and the second display region to obtain the first sub-sound corresponding to the first picture and the second sub-sound corresponding to the second picture. After the first sub-sound and the second sub-sound are mixed, final output audio (namely, the second sound) is obtained.

With reference to the first aspect, in a possible implementation, the first sound includes a first sub-sound and a second sub-sound, the first sub-sound is a sound of the first picture, the second sub-sound is a sound of the second picture, and the processing the first sound based on picture weights of the first picture and the second picture includes: separately filtering, by the electronic device, the first sound based on a first field of view of the first camera and a second field of view of the second camera to obtain the first sub-sound and the second sub-sound; obtaining, by the electronic device, first azimuth information of the first display region relative to the second display region; performing azimuth virtualization on the first sub-sound based on the first azimuth information to obtain a first left azimuth sound and a first right azimuth sound; and adjusting, by the electronic device, loudness of the first left azimuth sound, loudness of the first right azimuth sound, and loudness of the second sub-sound based on the picture weights of the first picture and the second picture, and then mixing the first sub-sound and the second sub-sound, to obtain the second sound.

During actual shooting, the picture in the first display region should be exactly in front of or behind the electronic device. However, in a picture-in-picture mode, the first display region is included in the second display region, and an azimuth of the first display region is adjustable. Therefore, the position of the first display region in the second display region may be visually on the left and on the right. In this implementation, the electronic device performs azimuth virtualization on the first azimuth sound based on the first azimuth information, so that a direction of the first sub-sound perceived by the user can match up with the azimuth of the first display region.

With reference to the first aspect, in a possible implementation, the first sound includes a first sub-sound and a second sub-sound, the first sub-sound is a sound of the first picture, the second sub-sound is a sound of the second picture, and the processing the first sound based on picture weights of the first picture and the second picture includes: separately filtering, by the electronic device, the first sound based on a first field of view of the first camera and a second field of view of the second camera to obtain the first sub-sound and the second sub-sound. The first sub-sound includes a first left channel sound and a first right channel sound, the first left channel sound is obtained by the electronic device by filtering the first sound based on a left half angle of the first field of view; and the first right channel sound is obtained by the electronic device by filtering the first sound based on a right half angle of the first field of view. The second sub-sound includes a second left channel sound and a second right channel sound, the second left channel sound is obtained by the electronic device by filtering the first sound based on a left half angle of the second field of view; and the second right channel sound is obtained by the electronic device by filtering the first sound based on a right half angle of the second field of view.

The electronic device adjusts loudness of the first left channel sound, loudness of the first right channel sound, loudness of the second left channel sound, and loudness of the second right channel sound based on the picture weights of the first picture and the second picture, and then mixes the first sub-sound and the second sub-sound, to obtain the second sound.

In this implementation, in a process of enhancing the initial audio with reference to the field of view of the picture, the electronic device can distinguish between angles of view based on two directions, to obtain, for each picture, two sounds distinguishing between a left channel and a right channel, so that finally obtained output audio has a better stereoscopic effect.

With reference to the first aspect, in a possible implementation, the first sound includes a first sub-sound and a second sub-sound, the first sub-sound is a sound of the first picture, the second sub-sound is a sound of the second picture, and before the detecting a second operation on a third control, the method further includes: in response to a camera switching operation, switching, by the electronic device at a third moment T3, a picture displayed in the first display region from a picture shot by the first camera to a picture shot by the third camera; displaying, by the electronic device in the first display region at a fourth moment T4, a third picture shot by the third camera, where the fourth moment T4 is after the third moment T3; separately filtering, by the electronic device, the first sound based on a third field of view of the third camera and the first field of view of the first camera to obtain a historical sound and a target sound; and in a time between the third moment T3 and the fourth moment T4, dynamically adjusting, by the electronic device, mixing proportions of the historical sound and the target sound based on a time interval between the third moment T3 and the fourth moment T4, and mixing the historical sound and the target sound based on the mixing proportions to obtain the first sub-sound.

When the electronic device switches a camera corresponding to the first display region, a field of view of the picture in the first display region changes accordingly, and an audio signal obtained by the electronic device by filtering audio based on the picture also changes. However, because the electronic device usually requires a specific processing time for performing lens switching, whereas lens-based audio switching by the electronic device can be completed in a quite short time. In this case, visual perception of the picture and auditory perception of the audio may be unbalanced. Therefore, in this implementation, during a camera switching process, the electronic device can dynamically adjust proportions, in the third audio, of sounds obtained based on two temporally different pictures, so that a sound direction changes more slowly, and switching of the audio can be performed smoothly.

According to a second aspect, an embodiment of this application provides an electronic device. The electronic device includes or more processors and a memory. The memory is coupled to the one or more processors, and the memory is configured to store computer program code. The computer program code includes computer instructions, and the one or more processors invoke the computer instructions so that the electronic device is enabled to perform the method according to the first aspect or any possible implementation of the first implementation.

According to a third aspect, a chip system is provided. The chip system is applied to an electronic device, the chip system includes one or more processors, and the processor is configured to invoke computer instructions so that the electronic device is enabled to perform any possible implementation of the first aspect or any possible implementation of the second aspect.

According to a fourth aspect, a computer program product including instructions is provided. When the computer program product is run on an electronic device, the electronic device is enabled to perform any possible implementation of the first aspect or any possible implementation of the second aspect.

According to a fifth aspect, a computer-readable storage medium is provided, including instructions. When the instructions are run on an electronic device, the electronic device is enabled to perform any possible implementation of the first aspect or any possible implementation of the second aspect.

DESCRIPTION OF EMBODIMENTS

Figure 1A:
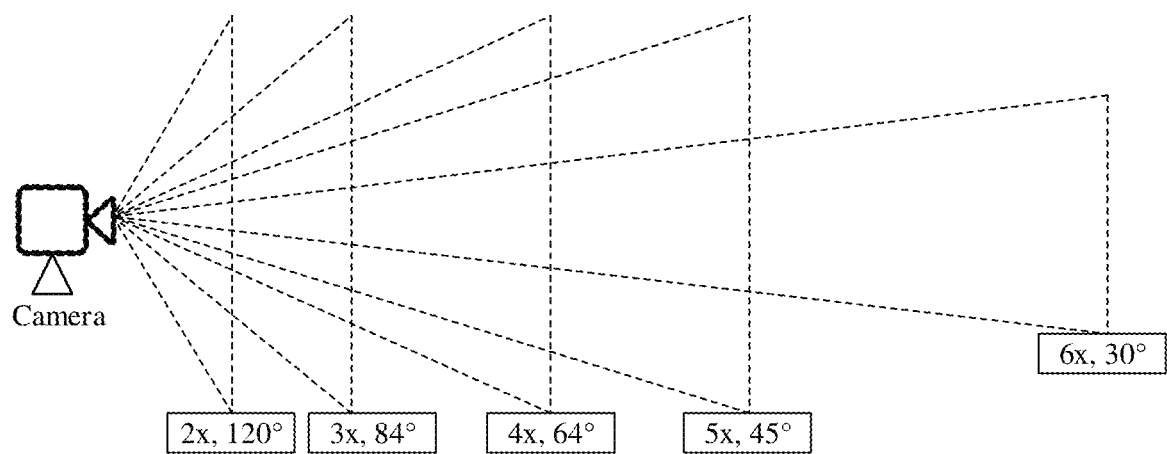
FIG. 1A is a schematic diagram of a correspondence between a camera and a field of view according to an embodiment of this application.

The terms used in the following embodiments of this application are merely for the purpose of describing specific embodiments, but are not intended to limit this application. As used in the specification of this application and the appended claims, the singular expression "a," "an," "the," "the foregoing," "such a," or "this" is intended to also include a plural expression unless otherwise clearly indicated in the context. It should be further understood that, as used in this application, the term "and/or" indicates and includes any and all possible combinations of one or more of the listed items.

The embodiments of this application is related to application of neural networks. Therefore, for ease of understanding, related terms in the embodiments of this application and concepts related to neural networks and the like are first described below.

(1) Dual-View Recording Mode

The dual-view recording mode means that a plurality of cameras in an electronic device, such as a front-facing camera and a rear-facing camera, can simultaneously record two videos. In the dual-view recording mode, a display may simultaneously display two images from two cameras in a same interface during video preview or a recording process or during a processing of playing a recorded video. The two images may be displayed through splicing or in a picture-in-picture manner in a same interface. Dual-view recording includes but is not limited to the following common recording modes:

1. Horizontally Split-Screen

To be specific, the display of the device is divided horizontally into two display interfaces, and the two horizontal display interfaces do not overlap. Areas of an upper display interface and a lower display interface may be the same or different.

2. Picture-In-Picture

To be specific, the display of the device is divided into two different-size display interfaces, and the smaller display interface is included in the larger display interface. A larger display region generally fully covers a screen of the device, and an image in a smaller display region may cover an image in the larger display region. In some cases, the smaller display region further supports zooming, and a position of the smaller display region on screen of the device may be further changed. This display mode is described in detail in subsequent embodiments.

In addition, in the dual-view recording mode, a plurality of multiple images shot based on the two images of the two cameras may be stored as a plurality of videos in Gallery (also referred to as Photos), or a combined video formed by splicing the plurality of videos.

"Recording" may also be referred to "video recording". In the following embodiments of this application, "recording" and "video recording" have a same meaning.

"Dual-view recording mode" is merely a name used in the embodiments of this application, a meaning represented by the name is already recorded in the embodiments of this application, and the name does not constitute any limitation on the embodiments.

(2) Focal Length and Field of View

The focal length is a distance from a center point of a lens to a clear picture formed on a focal plane, and is a manner of measuring concentration or divergence of light in an optical system. A value of the focal length determines a value of a field of view. A smaller focal length indicates a larger field of view; and a larger observed range. A larger focal length indicates a smaller field of view; and a smaller observed range. According to whether the focal length is adjustable, lenses may be classified into two categories: fixed-focus lenses and zoom lenses. When a same subject at a same distance is shot, an image formed by a lens with a longer focal length is larger, and an image formed by a lens with a shorter focal length is smaller. For an optical instrument, an included angle formed by two edges of a maximum range of the lens through which an object image of a to-be-measured object can pass by using a lens of the optical instrument as a vertex is referred to as a field of view. A value of a field of view determines a visual field of the optical instrument. A larger field of view indicates a larger visual field and a smaller optical magnification. Simply, in other words, a target object beyond this angle is not included in the lens. The focal length is inversely proportional to the field of view, that is, a larger focal length indicates a smaller field of view; and vice versa. FIG. 1A is used as an example. When a camera performs shooting, a focal length of the camera may be adjusted. Six focal length levels 1× (not shown in the figure), 2×, 3×, 4×, 5× and 6× are provided. It is not difficult to understand that when the focal length is 1×, a field of view that can be shot by the camera is the largest, which is 180° in front of the camera. When the focal length is adjusted to 2×, as shown in FIG. 1A, a field of view thereof is changed to 84°. If the focal length is further adjusted to 6×, as shown in FIG. 1A, a field of view thereof is only 30° in front of the camera.

(3) Field of View Range and Positive/Negative

Figure 1B:
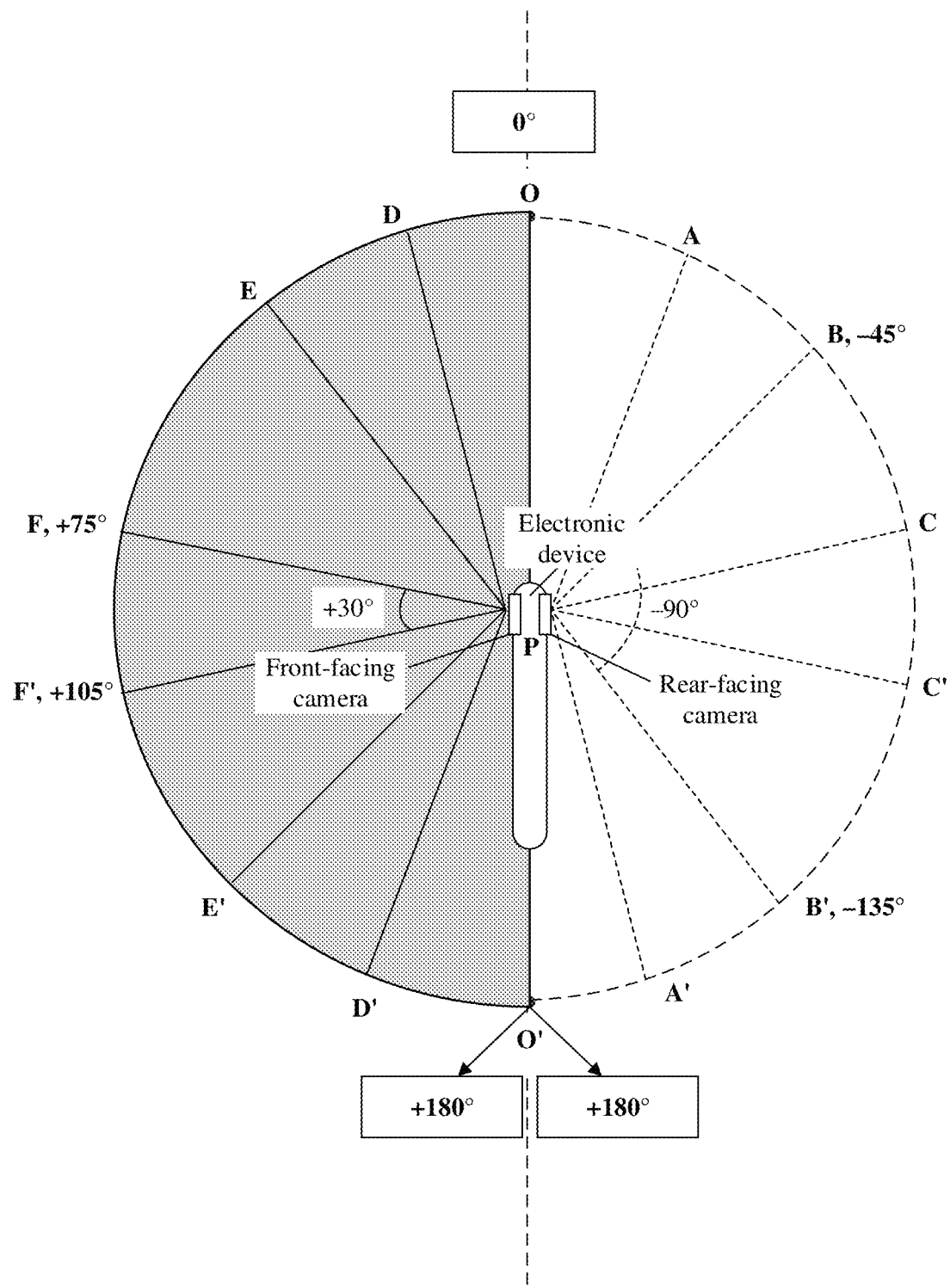
FIG. 1B is a schematic diagram of a field of view range of a front/rear-facing camera of an electronic device according to an embodiment of this application.

FIG. 1B is a schematic diagram of a field of view range of a front/rear-facing camera of an electronic device according to an embodiment of this application. As shown in FIG. 1B, for ease of understanding by readers, FIG. 1B shows a top view of an electronic device when it is placed upright, and the electronic device may be considered as a point P. In this case, OPO' is a plane on which the electronic device is located. The left side of OPO' represents a side on which a front-facing camera of the electronic device is located, and the right side of OPO' represents a side on which a rear-facing camera of the electronic device 100 is located. In FIG. 1B, the shaded part on the left side of OPO' represents a maximum field of view range that can be obtained by a front-facing camera of the electronic device, and the blank part on the right side of OPO' represents a maximum field of view range that can be obtained by a rear-facing camera of the electronic device. The schematic diagram of the field of view shown in FIG. 1B is merely intended for convenience of description, and is also presented in another form in an actual scenario.

In the following embodiments of this application, the plane OPO' on which the electronic device is located is used as a boundary to stipulate that a field of view on the left side of OPO' is positive, and a field of view on the right side of OPO' is negative, so that fields of view from 0° to 360° in the space are divided into two quadrants: 0° to +180° and −180° to 0°. To be specific, in the following embodiments of this application, a field of view of the front-facing camera of the electronic device is a positive value, and a field of view of the rear-facing camera is a negative value. In FIG. 1B, a line connecting each point to the point P represents a boundary of a field of view of the camera with a specific focal length. For example, assuming that the rear-facing camera of the electronic device has a field of view of 90° when the focal length is 3×, in FIG. 1B, ∠BPB' is equal to −90°, and rays BP and B'P are boundaries of the field of view of the rear-facing camera with a focal length of 3×. Assuming that the front-facing camera of the electronic device has a field of view of 30° when the focal length is 6×, in FIG. 1B, ∠FPF' is equal to +30°, and ray's FP and ray F'P are boundaries of the field of view of the front-facing camera with a focal length of 6×.

It should be understood that, after an electronic device is delivered, a correspondence between a focal length provided by a camera of the electronic device and a corresponding field of view is fixed. To be specific, after a user selects a focal length of the camera, the electronic device can obtain an angle value of a corresponding field of view of the camera with the focal length, and the angle value can reflect a value and a direction of the field of view:

(4) Sound Source Separation

To be specific, a target voice is tracked, and an interfering voice is suppressed or eliminated. In a complex acoustic environment, a voice signal collected by a microphone includes a target voice signal and an interference signal. For example, in daily life, when a speaker speaks through a microphone, in addition to the target speaker's voice signal, the voice signal is often accompanied by a voice of another speaker. For example, in an outdoor or street scenario or the like, a signal of interfering person seriously affects recognition performance of a voice of a target person. In this case, it is necessary to track the target speech and suppress or eliminate the interfering through sound source separation.

(5) Convex Optimization (Convex, CVX) Beam Training

CVX is a toolbox of MATLAB, which is a modeling system for building and solving disciplined convex programming (DCP). In CVX beam training, MATLAB may be used to select different array forms, and a convex method may be used for beamforming.

(6) Delay and Sum Beamforming (Delay and Sum Beamforming, DSB) Algorithm

It is used for compensation for relative delays between different microphone signals, and then a signal with a delay superposed forms single output, so that a beam points to a specific spatial direction.

(7) Picture Weight

In the dual-view recording mode, in a given interface form, a proportion of an area of a single viewfinder frame in a display of the electronic device may be calculated as a picture weight of the single viewfinder frame in this interface form.

In some embodiments, in the dual-view recording mode, an area formed by splicing two viewfinder frames fully covers a display region of the display. In this case, a sum of picture weights of the two viewfinder frames is 1. For example, as shown in FIG. 5(C), it can be obtained through calculation that a picture weight of the viewfinder frame 701 is 1248/2340, and a picture weight of the viewfinder frame 702 is 1092/2340. A sum of the proportions of the two is 1. Similarly, in some embodiments, when an area formed by splicing two viewfinder frames in the dual-view recording mode does not fully cover a display region of the display, a sum of picture weights of the two viewfinder frames may be less than 1.

Not limited to the foregoing manners of calculating picture weight proportions, the embodiments of this application may alternatively use another manner to calculate the picture weights of the two view finder frames, provided that the two picture weights calculated in the given manner can represent a value relationship between the areas of the two viewfinder frames. For example, in some embodiments, a proportion of an area of a single viewfinder frame in a sum of areas of the two view finder frames may be used as a picture weight of the single viewfinder frame, so that it can be ensured that a sum of proportions of the picture weights of the two viewfinder frames is 1, which is also easy for calculation.

For example, in some embodiments, a method for calculating picture weights of two viewfinder frames may alternatively be as follows:

$$w1 = \alpha \times S1/(S1 + S2)$$
$$w2 = 1 - w1$$

w1 represents a picture weight of a viewfinder frame with a smaller area of the two viewfinder frames, S1 is an area of the viewfinder frame. w2 represents a picture weight of a viewfinder frame with a larger area of the two viewfinder frames, and S2 is an area of the viewfinder frame. $\alpha$ is a correction coefficient, which is a fixed value that has been set after delivery of the electronic device, and has a value range of [1, (S1+S2)/S1]. In this way, it can be avoided that an area difference between the two viewfinder frames is too large, causing a value of a picture weight of a viewfinder frame with a smaller area to be too small.

(8) Sound Source Azimuth Virtualization Technology

Humans have two ears, but they can position a sound from three-dimensional space, which is due to a sound signal analysis system of a human ear. During a process of a sound signal propagating from a sound source to a human ear (in front of an eardrum), processes such as reflection and superposition may occur. Therefore, a signal transmitted from any point in the space to the human ear can be described by using a filter system, and after the sound source is processed by a filter, a sound signal in front of eardrums of both ears is obtained. This transmission system is a black box, and how the sound is transmitted to both ears is not cared, but only a difference between the sound source and a binaural signal is cared. If this set of filters (which may also be referred to as transfer functions) that describe spatial information are obtained, a sound signal from an azimuth in the space can be restored (for example, through a binaural headphone). A filter matrix can be obtained if a set of filters from all azimuths in the space to both ears are available, so as to restore sound signals from entire spatial azimuths. This attributes to the sound source azimuth virtualization technology.

(9) Head-Response Transfer Function (Head-Response Transfer Function, HRTF)

HRTF is a processing technology for sound positioning, and may be considered as a frequency response of a sound at a specific location transmitted to left and right ears. Because a sound is reflected from an auricle or a shoulder to the inside of a human ear, when two speakers are used to simulate sound positioning, a specific calculation method can be used to calculate loudness, pitch, and the like produced by the sound in different directions or positions, so as to create an effect of sound positioning in three-dimensional space.

(10) CIPIC_HRIR Data

HRTF is a frequency response of a sound at a specific location transmitted to left and right ears, and a time-domain response corresponding to HRTF is HRIR. To enable a sound source to have characteristics of HRTF, only a convolution operation needs to be performed on the sound source and HRIR data. CIPIC_HRIR data is a set of HRIR data provided by a CIPIC HRTF database of University of California, Davis.

(11) Convolution

Convolution is an important operation in analytical mathematics. Supposing that f(x) and g(x) are two integrable functions on R1, integration $\int_{-\infty}^{\infty} f(t)g(x-t)dt$ is performed. It can be proven that integration of almost all real numbers x exists. In this way, with different values of x, this integral defines a new function h(x), which is referred to as convolution of the functions f and g, and is denoted as h(x)=(f*g)(x).

(12) Sound Remixing

Sounds from a plurality of sources are combined into a stereo or mono track. Common mixing algorithms include direct summation method and an average weight adjustment method.

(13) Fast Fourier Transform Algorithm (Fast Fourier Transformation, FFT)

FFT is a fast algorithm for discrete Fourier transform, which can be used to transform a signal from time domain to frequency domain.

(14) Inverse Fast Fourier Transform Algorithm (Inverse Fast Fourier Transform, IFFT)

IFFT is an inverse fast Fourier transform algorithm corresponding to FFT, which can be used to transform a signal from frequency domain to time domain.

Nowadays video shooting and production have become an indispensable part of our daily life and entertainment. Various shooting devices and shooting modes have become research and development hotspots of electronic manufacturers. "Dual-view recording" is an emerging recording method. During recording, a device may invoke both of two lenses to simultaneously perform video recording, and present two pictures with different visual fields, such as close-up and panorama, front-facing and rear-facing shooting, to form different picture combinations, thereby visually creating a huge visual contrast.

Figure 2A:
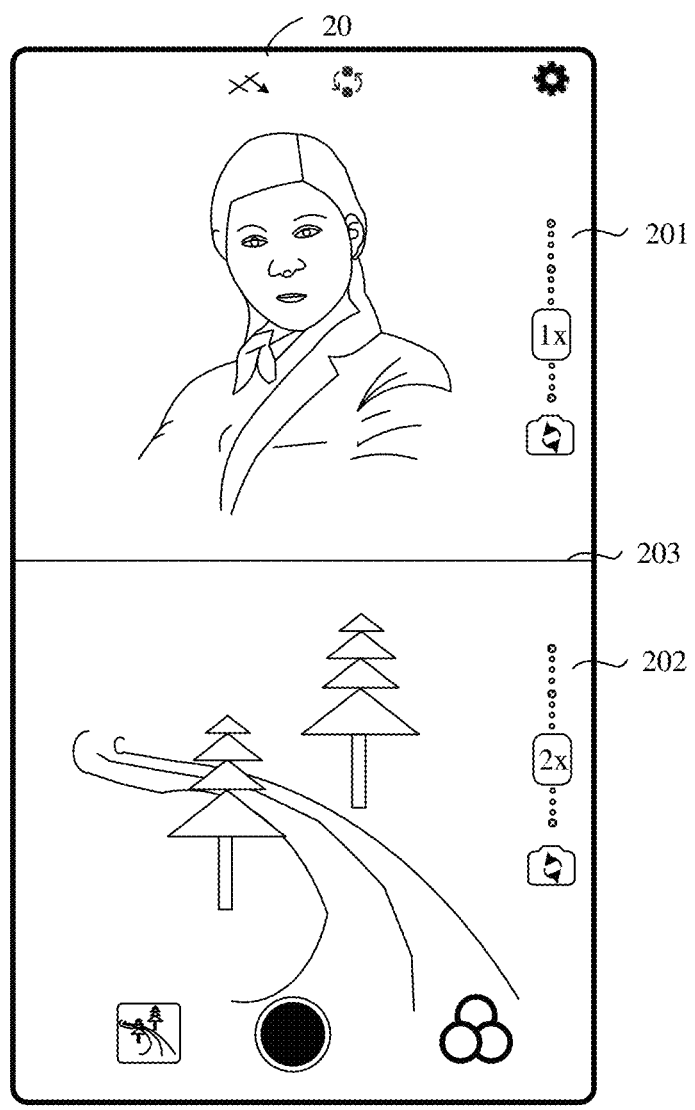
FIG. 2A is a diagram of a recording interface for dual-view recording according to an embodiment of this application.

FIG. 2A shows an example shooting interface of an electronic device in dual-view recording. As shown in FIG. 2A, the electronic device 200 invokes both a front-facing camera and a rear-facing camera for shooting. In this case, a shooting interface 20 is divided by a separator line 203 into two display regions: a display region 201 and a display region 202.

The display region 201 displays an image shot by the front-facing camera of the electronic device 200, and the image is a face of a user that is being recorded. The display region 202 displays an image shot by the rear-facing camera of the electronic device 200, and the image is a landscape image in front of the user. In the dual-view recording mode, two pictures with an obvious visual difference can be simultaneously presented in one picture.

It should be understood that, when the electronic device shoots a video, in addition to recording picture information of a scene through an image collection device such as a camera, the electronic device further records audio information in an environment through an audio collection device such as a microphone.

Figure 2B:
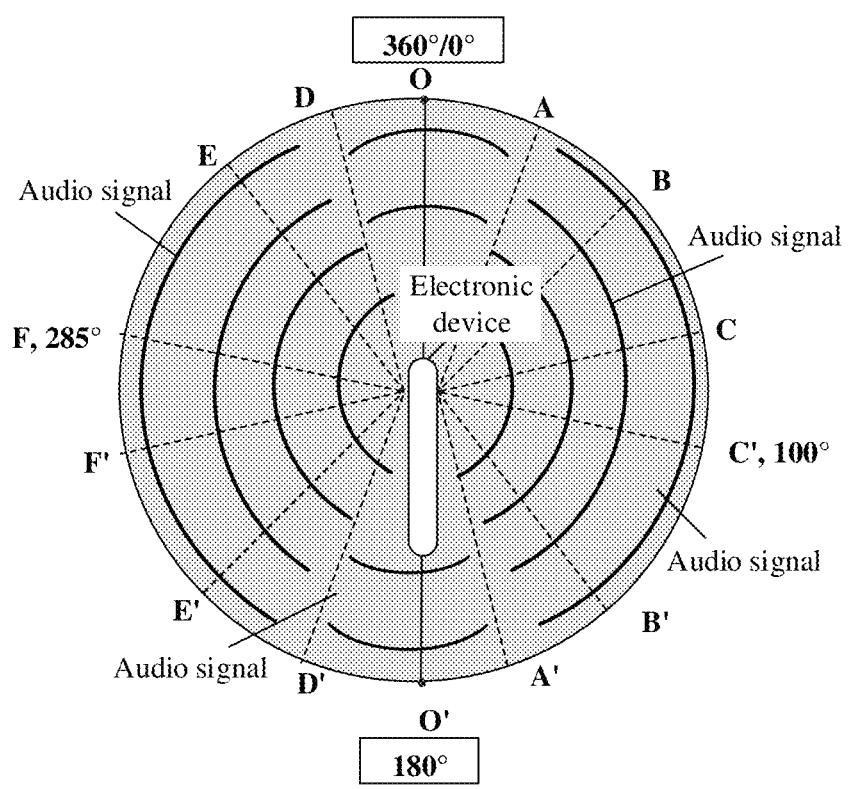
FIG. 2B is a schematic diagram of playing, by an electronic device, audio recorded in a dual-view recording mode according to an embodiment of this application.

In an implementation, audio information of the dual-view recording can be recorded and output in a mode of common audio recording and video recording. FIG. 2B is a schematic diagram of playing recorded audio in a dual-view recording mode by an electronic device according to an embodiment of this application. As shown in FIG. 2B, the electronic device performs necessary rendering and filtering operations on an omnidirectional audio signal in the space collected by a microphone, such as changing the timbre and performing denoising, and finally plays the audio signal through a speaker.

In FIG. 2B, the electronic device only simply renders and filters audio, so that the audio may hear more clearly. However, recording and play of a dual-view video are related to two pictures, there are size and azimuth relationships between the pictures, and such relationships may change during a recording process. Therefore, such a single audio recording and play manner provided in FIG. 2B cannot well fit a visual difference, provided on a screen to a user, of dual-view recording. In this case, the user cannot fully perceive a difference, in terms of hearing experience, between different pictures in the dual-view recording mode, leading to poor user experience.

Based on the foregoing problem, embodiments of this application provide an audio processing method and an electronic device. A dual-view recording mode of the electronic device includes a plurality of split-screen recording modes. During split-screen recording, when a user changes a split-screen recording mode, zooms in or out sizes of two screens, or switches pictures of the two screens, the electronic device may perform corresponding processing on collected audio based on image interface information (for example, focal lengths during recording in two display regions, and relative positions and area sizes of the two display regions), so that the user has a synchronized three-dimensional sense in terms of both hearing and vision.

First, an electronic device provided in an embodiment of this application is described below:

The electronic device may be a mobile phone, a tablet computer, a wearable device, a vehicle-mounted device, an augmented reality (augmented reality, AR)/virtual reality (virtual reality, VR) device, a notebook computer, an ultra-mobile personal computer (ultra-mobile personal computer, UMPC), a netbook, a personal digital assistant (personal digital assistant, PDA), or a dedicated camera (for example, a single-lens reflex camera, a card digital camera), or the like. A specific type of the electronic device is not limited in this application.

Figure 3:
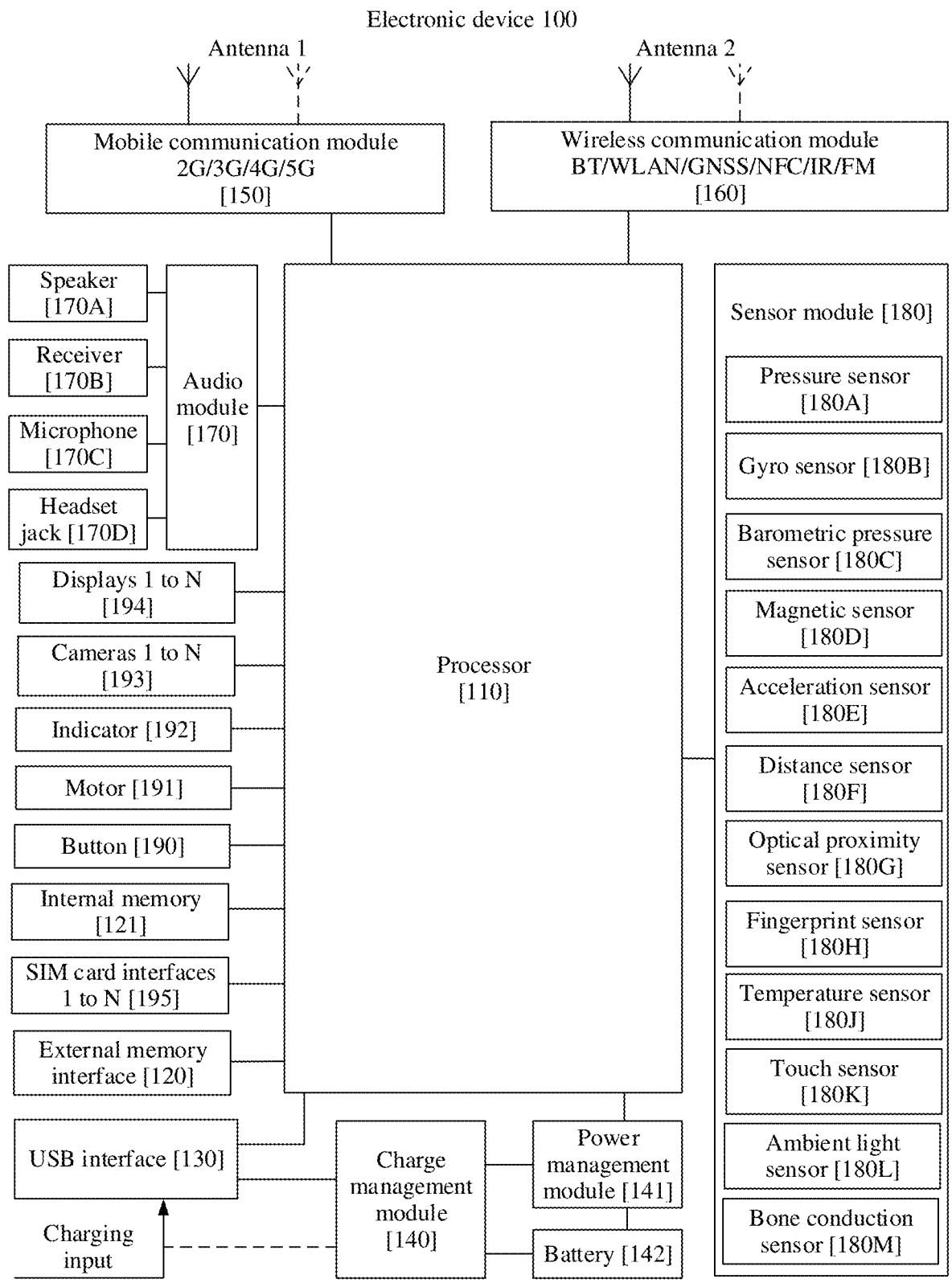
FIG. 3 is a schematic diagram of a structure of an electronic device 100 according to an embodiment of this application.

FIG. 3 shows a structure of the electronic device as an example.

As shown in FIG. 3, the electronic device 100 may have a plurality of cameras 193, such as a front-facing camera, a wide-angle camera, an ultra-wide-angle camera, a telephoto camera, and the like. In addition, the electronic device 100 may further include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a display 194, a subscriber identity module (subscriber identification module, SIM) card interface 195, and the like.

The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, and an ambient light sensor 180L, a bone conduction sensor 180M, and the like.

It may be understood that a structure shown in this embodiment of this application does not constitute a specific limitation on the electronic device 100. In some other embodiments of this application, the electronic device 100 may include more or fewer components than those shown in the figure, or some components may be combined, or some components may be split, or a different component arrangement may be used. The components shown in the figure may be implemented in hardware, software, or a combination of software and hardware.

The processor 110 may include one or more processing units. For example, the processor 110 may include an application processor (application processor, AP), a modem processor, a graphics processor (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU), and the like. Different processing units may be independent devices, or may be integrated in one or more processors.

In some embodiments, the processor 110 such as a controller or a GPU may be configured to combine and display, as a preview image in a viewfinder frame by means of splicing or partial overlaying or the like, a plurality of frames of images simultaneously collected by two cameras 193 in a dual-view recording mode frame, so that the electronic device 100 may simultaneously display the images collected by the two cameras 193.

In some other embodiments, the processor 110 such as a controller or a GPU may be further configured to perform anti-shake processing on the image collected by each camera 193 in a dual-view shooting scenario, and then combine images that are obtained after anti-shake processing and correspond to the plurality of cameras 193.

The controller may be a nerve center and a command center of the electronic device 100. The controller may generate an operation control signal based on an instruction operation code and a timing signal, to implement control on instruction fetching and execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, it may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) port, and/or the like.

The I²C interface is a bidirectional synchronous serial bus, including a serial data line (serial data line, SDA) and a serial clock line (serial clock line, SCL). In some embodiments, the processor 110 may include a plurality of I²C buses. The processor 110 may be respectively coupled to the touch sensor 180K, a charger, a camera flash, the camera 193, and the like through different I²C bus interfaces. For example, the processor 110 may be coupled to the touch sensor 180K through the I²C interface, so that the processor 110 and the touch sensor 180K communicate with each other through the I²C bus interface, thereby implementing a touch function of the electronic device 100.

The I²S interface may be used for audio communication. In some embodiments, the processor 110 may include a plurality of I²S buses. The processor 110 may be coupled to the audio module 170 through the I²S bus to implement communication between the processor 110 and the audio module 170. In some embodiments, the audio module 170 may transmit an audio signal to the wireless communication module 160 through the I²S interface, so as to implement a function of answering calls through a Bluetooth headset.

The PCM interface may also be used for audio communication, and may perform sampling, quantizing, and encoding on an analog signal. In some embodiments, the audio module 170 and the wireless communication module 160 may be coupled through the PCM bus interface. In some embodiments, the audio module 170 may also transmit an audio signal to the wireless communication module 160 through the PCM interface, so as to implement a function of answering calls through a Bluetooth headset. Both the I2S interface and the PCM interface may be used for audio communication.

The UART interface is a universal serial data bus and used for asynchronous communication. The bus may be a bidirectional communication bus. It converts to-be-transmitted data between serial communication and parallel communication. In some embodiments, the UART interface is usually configured to connect to the processor 110 and the wireless communication module 160. For example, the processor 110 communicates with a Bluetooth module in the wireless communication module 160 through the UART interface to implement a Bluetooth function. In some embodiments, the audio module 170 may transmit an audio signal to the wireless communication module 160 through the UART interface, so as to implement a function of playing music through a Bluetooth headset.

The MIPI interface may be configured to connect to the processor 110 and a peripheral device such as the display 194 and the camera 193. The MIPI interface includes a camera serial interface (camera serial interface, CSI), a display serial interface (display serial interface, DSI), and the like. In some embodiments, the processor 110 communicates with the camera 193 through the CSI interface to implement a photographing function of the electronic device 100. The processor 110 communicates with the display 194 through the DSI interface to implement a display function of the electronic device 100.

The GPIO interface may be configured by software. The GPIO interface may be configured as a control signal or as a data signal. In some embodiments, the GPIO interface may be configured to connect to the processor 110 and the camera 193, the display 194, the wireless communication module 160, the audio module 170, the sensor module 180, and the like. The GPIO interface may be further configured as an I²C interface, an I²S interface, a UART interface, a MIPI interface, or the like.

The USB interface 130 is an interface that conforms to the USB standard specification, and may specifically be a mini USB interface, a micro USB interface, a USB Type-C interface, or the like. The USB interface 130 may be configured to connect to the charger to charge the electronic device 100, and may also be configured to transmit data between the electronic device 100 and a peripheral device. It may also be configured to connect to a headset, so as to play audio through the headset. The interface may also be configured to connect to another electronic device such as an AR device.

It can be understood that an interface connection relationship between modules illustrated in this embodiment of this application is merely an illustrative description, and does not constitute a limitation on a structure of the electronic device 100. In some other embodiments of this application, the electronic device 100 may alternatively use an interface connection manner different from that in the foregoing embodiment, or use a combination of a plurality of interface connection manners.

The charge management module 140 is configured to receive a charging input from the charger. The charger may be a wireless charger or a wired charger. In some wired charging embodiments, the charge management module 140 may receive a charging input from the wired charger through the USB interface 130. In some wireless charging embodiments, the charge management module 140 may receive a wireless charging input through a wireless charging coil of the electronic device 100. At the same time when the charge management module 140 charges the battery 142, the power management module 141 may be used to supply power to the electronic device.

The power management module 141 is configured to connect to the battery 142, the charge management module 140, and the processor 110. The power management module 141 receives an input of the battery 142 and/or the charging management module 140, and supplies power to the processor 110, the internal memory 121, an external memory, the display 194, the camera 193, the wireless communications module 160, and the like. The power management module 141 may be further configured to monitor parameters such as battery capacity, a battery cycle quantity, and a battery health status (leakage and impedance). In some other embodiments, the power management module 141 may also be provided in the processor 110. In some other embodiments, the power management module 141 and the charge management module 140 may also be provided in a same device.

A wireless communication function of the electronic device 100 may be implemented through the antenna 1, the antenna 2, the mobile communication module 150, the wireless communication module 160, the modem processor, the baseband processor, and the like.

The antenna 1 and the antenna 2 are configured to transmit and receive electromagnetic wave signals. Each antenna in the electronic device 100 may be configured to cover one or more communication frequency bands. Different antennas may be further multiplexed to improve antenna utilization. For example, the antenna 1 may be multiplexed as a diversity antenna in a wireless local area network. In some other embodiments, the antenna may be used in combination with a tuning switch.

The mobile communication module 150 may provide a solution, applied to the electronic device 100, to wireless communication including 2G, 3G, 4G, 5G, and the like. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering and amplification on the received electromagnetic wave, and transmit a processed electromagnetic wave to the modem processor for demodulation. The mobile communication module 150 may further amplify a signal modulated by the modem processor, and convert the signal into an electromagnetic wave by using the antenna 1 for radiation.

The wireless communication module 160 may provide a wireless communication solution that is applied to the electronic device 100, and that includes a wireless local area network (wireless local area networks, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), a near field communication (near field communication, NFC) technology, an infrared (infrared, IR) technology; or the like. The wireless communication module 160 may be one or more components integrating at least one communication processing module. The wireless communication module 160 receives an electromagnetic wave through the antenna 2, performs frequency modulation and filtering processing on the electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, in the electronic device 100, the antenna 1 and the mobile communication module 150 are coupled, and the antenna 2 and the wireless communication module 160 are coupled, so that the electronic device 100 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLO-NASS), a BeiDou navigation satellite system (BeiDou navigation satellite system, BDS), a quasi-zenith satellite system (quasi-zenith satellite system, QZSS), and/or a satellite based augmentation system (satellite based augmentation systems, SBAS).

The electronic device 100 implements a display function by using the GPU, the display 194, the application processor, and the like. The GPU is a microprocessor for image processing, and is connected to the display 194 and the application processor. The GPU is configured to perform mathematical and geometric calculation, and render an image. The processor 110 may include one or more GPUs, which execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diodes, QLED), or the like. In some embodiments, the electronic device 100 may include one or N displays 194, where N is a positive integer greater than 1.

The electronic device 100 may implement a shooting function through the ISP, the camera 193, the video codec, the GPU, the display 194, the application processor, and the like.

The ISP is configured to process data fed back by the camera 193. For example, during photographing, a shutter is opened, and a ray of light is transmitted to a photosensitive element of a camera through a lens. An optical signal is converted into an electrical signal. The photosensitive element of the camera transmits the electrical signal to the ISP for processing, and converts the electrical signal into a visible image. The ISP may further perform algorithm optimization on image noise, brightness, and a skin tone. The ISP may further optimize parameters, such as exposure and color temperature, of a shooting scene. In some embodiments, the ISP may be provided in the camera 193.

The camera 193 is configured to capture a static image or a video. An optical image of an object is generated through the lens, and is projected onto a photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert it into a digital image signal. The ISP outputs the digital image signal to the DSP for processing. The DSP converts the digital image signal into an image signal in a format such as standard RGB or YUV. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transformation or the like on frequency energy.

The video codec is configured to compress or decompress a digital video. The electronic device 100 may support one or more video codecs. In this way, the electronic device 100 can play or record videos in a plurality of encoding formats, for example, moving picture experts group (moving picture experts group, MPEG)-1, MPEG-2, MPEG-3, and MPEG-4.

The NPU is a neural-network (neural-network, NN) computing processor, and simulates a biological neural network structure such as a transmission mode between neurons in a human brain to perform rapid process on input information, and can perform continuous self-learning. The NPU may implement applications such as intelligent cognition of the electronic device 100, for example, image recognition, facial recognition, speech recognition, and text understanding. The NPU may further implement a decision model provided in this embodiment of this application.

The external memory interface 120 may be configured to connect to an external memory card, for example, a micro SD card, to extend a storage capability of the electronic device 100. The external storage card communicates with the processor 110 through the external memory interface 120, to implement a data storage function. For example, files such as music and videos are stored in the external storage card.

The internal memory 121 may be configured to store computer-executable program code. The executable program code includes instructions. The executable program code includes instructions. The processor 110 performs various function applications and data processing of the electronic device 100 by running the instructions stored in the internal memory 121. The internal memory 121 may include a program storage area and a data storage area. The program storage area may store an operating system, an application required for at least one function (such as a sound play function and an image play function), and the like. The data storage area may store data (such as audio data and a phone book) created based on use of the mobile phone 100, and the like. In addition, the internal memory 121 may include a high-speed random access memory, and may further include a non-volatile memory, for example, at least one magnetic disk storage device, a flash memory device, and a universal flash storage (universal flash storage, UFS).

The electronic device 100 may implement an audio function such as music play and recording through the audio module 170, the speaker 170A, the receiver 170B, the microphone 170C, the headset jack 170D, the application processor, and the like. The audio module 170 is configured to convert digital audio information into an analog audio signal output, and is also configured to convert an analog audio input into a digital audio signal. The audio module 170 may be further configured to code and decode an audio signal. In some embodiments, the audio module 170 may be disposed in the processor 110, or some function modules in the audio module 170 are disposed in the processor 110.

The speaker 170A, also referred to as a "loudspeaker", is configured to convert an audio electrical signal into a sound signal. The electronic device 100 may listen to music or a sound in a video or listen to a call in a hands-free mode through the speaker 170A. In this embodiment of this application, there may be one, two, or more speakers 170A. In an audio processing method provided in the embodiments of this application, when the electronic device 100 has two or more speakers 170A, playing two-channel audio is supported. In addition, when the electronic device 100 has two speakers 170A (the two speakers are respectively referred to as 170A-1 and 170A-2 herein), the speakers 170A-1 and 170A-2 may be disposed respectively on upper and lower positions of the electronic device 100. It should be noted that "upper" and "lower" mentioned herein are "upper" and "lower" when the electronic device is placed upright.

The receiver 170B, also referred to as an "earpiece", is configured to convert an audio electrical signal into a sound signal. When a call is answered or a voice message is received through the electronic device 100, the receiver 170B may be put close to a human ear to listen to a voice.

The microphone 170C, also referred to as a "mike" or a "mic", is configured to convert a sound signal into an electrical signal. When making a call or sending a voice message, a user may make a sound by moving a human mouth close to the microphone 170C, to input the sound signal to the microphone 170C. At least one microphone 170C may be disposed in the electronic device 100. In some other embodiments, two microphones 170C may be disposed in the electronic device 100, to implement a noise reduction function, in addition to collecting the sound signal. In some other embodiments, three, four, or more microphones 170C may alternatively be disposed in the electronic device 100, to collect a sound signal, implement noise reduction, and identify a sound source, so as to implement a directional recording function and the like.

The headset jack 170D is configured to connect to a wired headset. The headset jack 170D may be the USB interface 130, or may be a 3.5 mm open mobile terminal platform (open mobile terminal platform, OMTP) standard interface or a Cellular Telecommunications Industry Association of the USA (Cellular Telecommunications Industry Association of the USA, CTIA) standard interface.

The pressure sensor 180A is configured to sense a pressure signal, and can convert the pressure signal into an electrical signal. In some embodiments, the pressure sensor 180A may be disposed in the display 194. There are many types of pressure sensors 180A, such as resistive pressure sensors, inductive pressure sensors, and capacitive pressure sensors. The capacitive pressure sensor may include at least two parallel plates having conductive materials. When a force is applied to the pressure sensor 180A, a capacitance between electrodes changes. The electronic device 100 determines a strength of the pressure based on the change in capacitance. When a touch operation is performed on the display 194, the electronic device 100 detects a strength of the touch operation by using the pressure sensor 180A. The electronic device 100 may also calculate a touched position based on a detected signal of the pressure sensor 180A.

The gyro sensor 180B may be configured to determine a motion posture of the electronic device 100. In some embodiments, angular velocities of electronic device 100 around three axes (which are x, y, and z axes) may be determined by using the gyro sensor 180B. The gyro sensor 180B may be used for image stabilization. For example, when a shutter is pressed, the gyro sensor 180B detects an angle at which the electronic device 100 jitters; calculates, based on the angle, a distance for which a lens module needs to compensate; and enables the lens to cancel the jitter of the electronic device 100 through reverse motion, to implement image stabilization. The gyro sensor 180B may be further used in a navigation scenario and a motion-sensing game scenario.

The barometric pressure sensor 180C is configured to measure barometric pressure. In some embodiments, the electronic device 100 calculates an altitude by using a barometric pressure value measured by the air pressure sensor 180C to assist in positioning and navigation.

The magnetic sensor 180D includes a Hall sensor. The electronic device 100 may detect opening and closing of a flip holster by using the magnetic sensor 180D. In some embodiments, when the electronic device 100 is a flip device, the electronic device 100 may detect opening and closing of the flip by using the magnetic sensor 180D. Further, a feature such as flip-controlled automatic unlocking by may be set based on a detected opening or closing state of the holster or an opening or closing state of a flip cover.

The acceleration sensor 180E may detect magnitudes of accelerations of the electronic device 100 in various directions (usually on three axes), and may detect a magnitude and a direction of gravity when the electronic device 100 is still. The acceleration sensor 180E may be further configured to identify a posture of the electronic device, and is used in an application such as switching between landscape mode and portrait mode or a pedometer.

The distance sensor 180F is configured to measure a distance. The electronic device 100 may measure a distance through infrared or laser. In some embodiments, in a shooting scenario, the electronic device 100 may use the distance sensor 180F to measure a distance to achieve fast focusing.

The optical proximity sensor 180G may include, for example, a light-emitting diode (LED) and an optical detector such as a photodiode. The light-emitting diode may be an infrared light-emitting diode. The electronic device 100 emits infrared light to the outside by using a light emitting diode. The electronic device 100 uses a photodiode to detect infrared reflected light from a nearby object. When abundant reflected light is detected, it may be determined that there is an object near the electronic device 100. When insufficient reflected light is detected, the electronic device 100 may determine that there is no object near the electronic device 100. The electronic device 100 may use the optical proximity sensor 180G to detect that a user holds the electronic device 100 close to an ear for a call, so as to automatically turn off the display to save power. The optical proximity sensor 180G may also be used in a holster mode or pocket mode for automatic unlocking and screen locking.

The ambient light sensor 180L is configured to sense ambient light luminance. The electronic device 100 may adaptively adjust brightness of the display 194 based on the sensed ambient light brightness. The ambient light sensor 180L may be further configured to automatically adjust a white balance during photographing. The ambient light sensor 180L may further cooperate with the optical proximity sensor 180G to detect whether the electronic device 100 is in a pocket, so as to prevent accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy based on the temperature detected by the temperature sensor 180J. For example, when the temperature reported by the temperature sensor 180J exceeds a threshold, the electronic device 100 reduces performance of a processor located near the temperature sensor 180J to reduce power consumption and implement thermal protection. In some other embodiments, when the temperature is lower than another threshold, the electronic device 100 heats the battery 142 to avoid abnormal shutdown of the electronic device 100 caused by a low temperature. In some other embodiments, when the temperature is lower than still another threshold, the electronic device 100 boosts an output voltage of the battery 142 to avoid abnormal shutdown caused by a low temperature.

The touch sensor 180K is also referred to as a "touch panel". The touch sensor 180K may be disposed on the display 194, and the touch sensor 180K and the display 194 form a touchscreen, which is also referred to as a "touch screen". The touch sensor 180K is configured to detect a touch operation performed on or near the touch sensor. The touch sensor may transfer the detected touch operation to the application processor, to determine a type of a touch event. A visual output related to the touch operation may be provided on the display 194. In some other embodiments, the touch sensor 180K may alternatively be disposed on a surface of the electronic device 100 in a position different from that of the display 194.

The bone conduction sensor 180M may obtain a vibration signal. In some embodiments, the bone conduction sensor 180M may obtain a vibration signal from a sound vibration bone of a human body. The bone conduction sensor 180M may also be in contact with a pulse of a human body and receive a blood pressure beat signal. In some embodiments, the bone conduction sensor 180M may be disposed in a headset, to be integrated into a bone conduction headset. The audio module 170 may parse out a voice signal based on the vibration signal of the sound vibration bone obtained by the bone conduction sensor 180M, to implement a voice function. The application processor may parse out heart rate information based on the blood pressure beat signal obtained by the bone conduction sensor 180M, to implement a heart rate detection function.

The button 190 includes a power button, a volume button, and the like. The button 190 may be a mechanical button, or may be a touch-sensitive button. The electronic device 100 may receive a button input, and generate a button signal input related to user setting and function control of the electronic device 100.

The motor 191 may generate a vibration alert. The motor 191 may be used for vibration alerts for incoming calls, and may also be used for touch vibration feedback. For example, touch operations on different applications (such as photographing and audio playing) may correspond to different vibration feedback effects. For touch operations on different regions of the display 194, the motor 191 may also correspondingly generate different vibration feedback effects. Different application scenarios (such as a time reminder, information receiving, an alarm clock, and a game) may also correspond to different vibration feedback effects. The touch vibration feedback effect may be further customized.

The indicator 192 may be an indicator, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or more SIM card interfaces. The SIM card interface 195 may support nano SIM cards, micro SIM cards, SIM cards, and the like. A plurality of cards may be inserted into a same SIM card interface 195. Types of the plurality of cards may be the same as or different. The SIM card interface 195 may also be compatible with different types of SIM cards. The SIM card interface 195 may also be compatible with an external memory card. The electronic device 100 interacts with a network through the SIM card to implement functions such as calls and data communication. In some embodiments, the electronic device 100 uses an eSIM, namely, an embedded SIM card. The eSIM card may be embedded into the electronic device 100, and cannot be separated from the electronic device 100.

The electronic device 100 may implement a shooting function through the ISP, the camera 193, the video codec, the GPU, the display 194, the application processor, and the like.

The ISP is configured to process data fed back by the camera 193. For example, during photographing, a shutter is opened, and a ray of light is transmitted to a photosensitive element of a camera through a lens. An optical signal is converted into an electrical signal. The photosensitive element of the camera transmits the electrical signal to the ISP for processing, and converts the electrical signal into a visible image. The ISP may further perform algorithm optimization on image noise, brightness, and a skin tone. The ISP may further optimize parameters, such as exposure and color temperature, of a shooting scene. The ISP is not limited to being integrated in the processor 110, and may alternatively be provided in the camera 193.

In this embodiment of this application, a quantity of cameras 193 may be M, where M≥2, and M is a positive integer. A quantity of cameras enabled by the electronic device 100 in dual-view recording may be N, where N≤M, where N is a positive integer.

The camera 193 includes a lens and a photosensitive element (also referred to as an image sensor), and is configured to capture a static image or a video. An optical image of an object is generated through the lens, and is projected onto a photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert it into a digital image signal, for example, an image signal in a format of standard RGB, YUV, or the like.

Hardware configurations and physical locations of the cameras 193 may be different, and therefore sizes, ranges, content, definition, or the like of images collected by different cameras may be different.

Generated image sizes of the cameras 193 may be different or the same. A generated image size of a camera means a length and a width of an image collected by the camera. Both the length and width of the image may be measured in pixels. The generated image size of the camera may also be referred to as image dimensions, image size, pixel size, or image resolution. Common generated image ratios of a camera may include: 4:3, 16:9, 3:2, or the like. The generated image ratio means a rough pixel ratio of a length to a width of an image collected by a camera.

The cameras 193 may correspond to a same focal length range, or may correspond to different focal length ranges. The focal length range may include, but is not limited to: a first focal length range with a focal length less than a preset value 1 (for example, 20 mm), a second focal length range with a focal length greater than or equal to the preset value 1 and less than or equal to a preset value 2 (for example, 50 mm), and a third focal length range with a focal length greater than the preset value 2. A camera corresponding to the first focal length range may be referred to as an ultra-wide-angle camera, a camera corresponding to the second focal length range may be referred to as a wide-angle camera, and a camera corresponding to the third focal length range may be referred to a long-focus camera. A larger focal length range of a camera indicates a smaller field of view (field of view; FOV) of the camera. The field of view means an angular range within which an optical system can perform imaging.

The cameras 193 may be arranged on both sides of the electronic device. A camera located on a same plane as the display 194 of the electronic device may be referred to as a front-facing camera, and a camera located on a plane on which a back cover of the electronic device is located may be referred to as a rear-facing camera. The front-facing camera may be configured to collect an image of a photographer facing the display 194, and the rear-facing camera may be configured to collect an image of a shooting object (such as a person or a landscape) facing the photographer.

In some embodiments, the camera 193 may be configured to collect depth data. For example, the camera 193 may have a time of flight (time of flight, TOF) 3D sensing module or a structured light (structured light) 3D sensing module for obtaining depth information. A camera used for collecting the depth data may be the front-facing camera or a rear-facing camera.

The video codec is configured to compress or decompress a digital image. The electronic device 100 may support one or more image codecs. In this way, the electronic device 100 may open or save images or videos in various coding formats.

The electronic device 100 may implement a display function by using the GPU, the display 194, the application processor, and the like. The GPU is a microprocessor for image processing, and is connected to the display 194 and the application processor. The GPU is configured to perform mathematical and geometric calculation, and render an image. The processor 110 may include one or more GPUs, which execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diodes, QLED), or the like. In some embodiments, the electronic device 100 may include one or more displays 194.

In some embodiments, in a dual-view recording mode, the display 194 may display two images from the two cameras 193 in a manner such as splicing or picture-in-picture, so that the two images from the two cameras 193 can be simultaneously presented to the user.

In some embodiments, in a dual-view recording mode, the processor 110 (such as a controller or a GPU) may combine a plurality of frames of images from the two cameras 193. For example, to combine two video streams from the two cameras 193 into one video stream, a video encoder in the processor 110 may encode combined video stream data to generate a video file. In this way, each frame of image in the video file may include two images from the two cameras 193. When playing a specific image frame of the video file, the display 194 may display two images from the two cameras 193, so as to present, to the user, two pictures of different ranges or different resolution or with different details at a same moment or scene.

In some embodiments, in a dual-view recording mode, the processor 110 may associate image frames from different cameras 193 with each other, so that when playing a shot picture or video, the display 194 may display associated image frames in the viewfinder frame. In this case, videos simultaneously recorded by different cameras 193 may be stored respectively as different videos, and pictures simultaneously recorded by different cameras 193 may be stored as different pictures respectively.

In some embodiments, in a dual-view recording mode, the two cameras 193 may respectively collect images at a same frame rate, that is, the two cameras 193 collect a same quantity of image frames in a same time. Videos from different cameras 193 may be stored as different video files, and the different video files are associated with each other. Image frames in the video file are stored according to a sequence in which the image frames are collected, and the different video files include a same quantity of image frames. When playing a recorded video, the display 194 may display image frames based on a layout indicated by the user or a preset layout in a sequence of image frames included in associated video files, so as to display, in a same interface, a plurality of frames of images corresponding to a same sequence in different video files.

In some embodiments, in a dual-view recording mode, the two cameras 193 may respectively collect images at a same frame rate, that is, the two cameras 193 collect a same quantity of image frames in a same time. The processor 110 may stamp each frame of image from different cameras 193 with a timestamp, so that when playing a recorded video, the display 194 may simultaneously display a plurality of frames of images from the two cameras 193 based on timestamps in a same interface.

For convenience of use, the electronic device usually performs shooting in a hand-held mode of the user, and in the hand-held mode of the user, a picture obtained by shooting usually shakes. In some embodiments, in a dual-view recording mode, the processor 110 may separately perform anti-shake processing on image frames collected by different cameras 193. Then, the display 194 displays an image obtained after the anti-shake processing.

The following describes a user interface provided in an embodiment of this application.

A user interface related to enabling of a dual-view recording mode is described first.

Figure 4A:
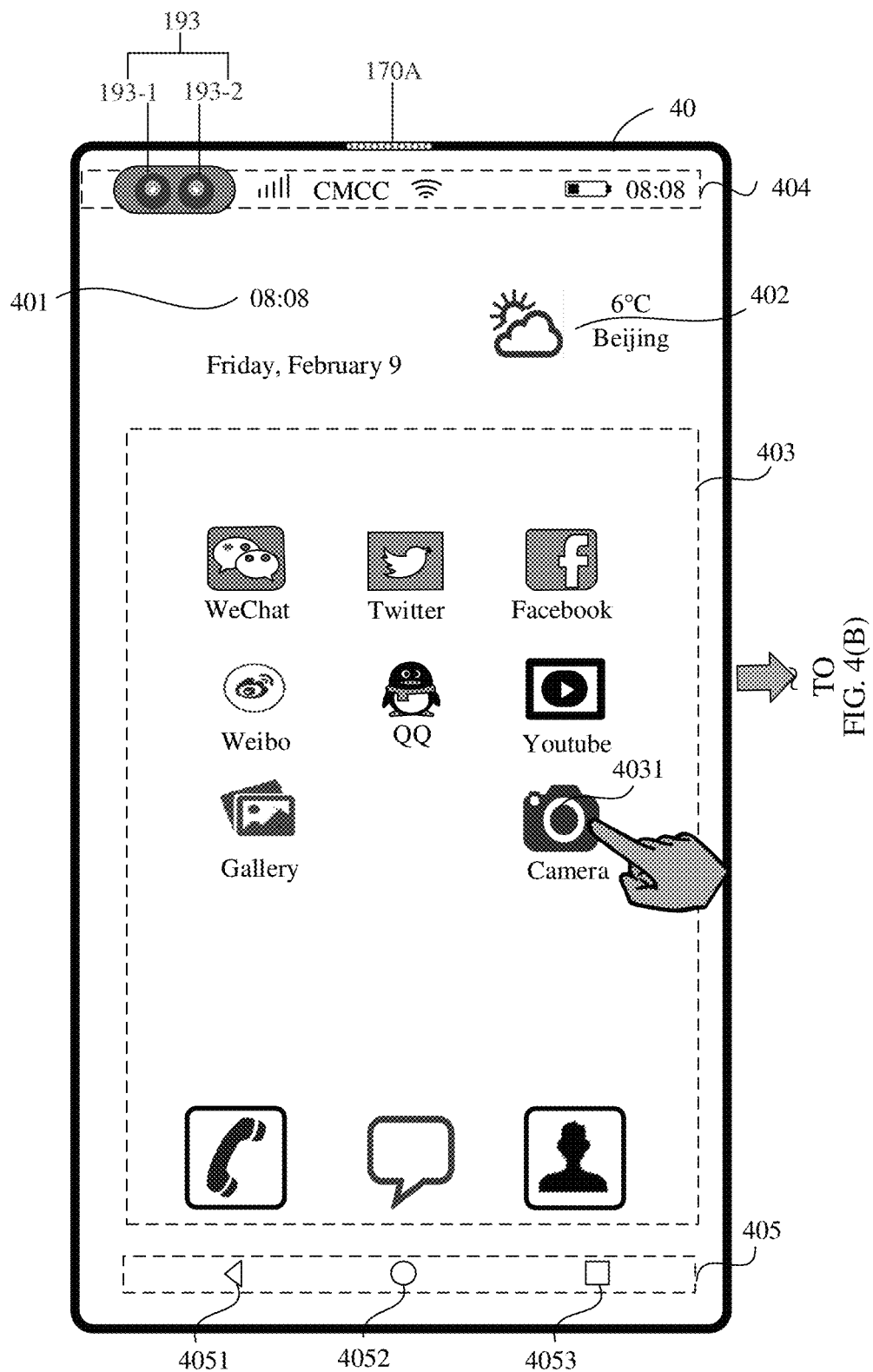
FIG. 4(A) and FIG. 4(B) are schematic diagrams of some man-machine interaction interfaces according to an embodiment of this application.
Figure 4B:
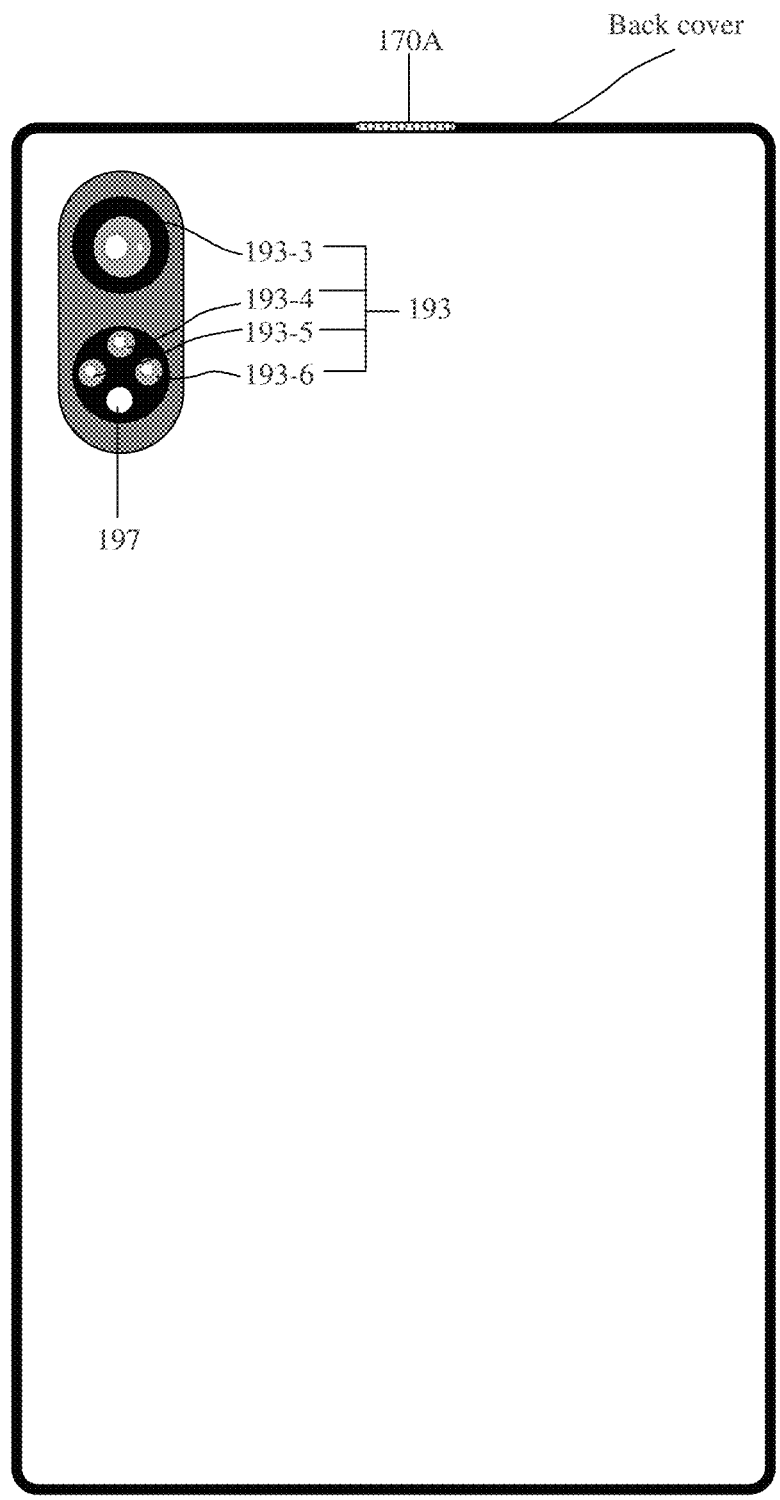

As shown in FIG. 4(A), FIG. 4(A) shows an example user interface 40 for an application menu on an electronic device 100. As shown in FIG. 4(A), the electronic device 100 may be provided with a plurality of cameras 193. The plurality of cameras 193 may include a front-facing camera and a rear-facing camera. There may also be a plurality of front-facing cameras, for example, a front-facing camera 193-1 and a front-facing camera 193-2. As shown in FIG. 4(A), the front-facing camera 193-1 and the front-facing camera 193-2 may be arranged on the top of the electronic device 100, and 170A is a speaker located on the top of the electronic device 100. It can be learned that, in some embodiments, as shown in FIG. 4(B), a rear-facing camera 193 and an illuminator 197 may be configured on the back of the electronic device 100. There may also be a plurality of rear-facing cameras 193, for example rear-facing cameras 193-3, 193-4, 193-5, and 193-6.

As shown in FIG. 4(A), a home screen interface 40 includes a calendar widget (widget) 401, a weather widget 402, application icons 403, a status bar 404, and a navigation bar 405.

The calendar widget 401 may be configured to indicate a current time, such as date, day, hour, and minute information.

The weather widget 402 may be configured to indicate a weather type, such as partially sunny or light rain, and may be further configured to indicate information such as temperature, and indicate a location.

The application icons 403 may include, for example, an icon of WeChat®(Wechat), an icon of Twitter®(Twitter), an icon of Facebook®(Facebook), an icon of Weibo®(Sina Weibo), an icon of QQ®(Tencent QQ), an icon of YouTube®(YouTube), an icon of Gallery (Gallery), and an icon 1031 of Camera (camera), and may further include icons of other applications, which are not limited in this embodiment of this application. An icon of any application may be used to respond to a user operation, such as a touch operation, so that the electronic device 100 starts an application corresponding to the icon.

The status bar 404 may include a name of an operator (for example, China Mobile), a time, a Wi-Fi icon, signal strength, and current remaining power.

The navigation bar 405 may include system navigation buttons such as a return button 4051, a home screen (home screen) button 4052, and a task history button 4053. The home screen interface 40 is an interface displayed by the electronic device 100 after a user operation on the home screen button 4052 is detected in any user interface. When detecting that the user taps the return button 4051, the electronic device 100 may display a previous user interface of a current user interface. When detecting that the user taps the home screen button 4052, the electronic device 100 may display the home screen interface 40. When detecting that the user taps the task history button 4053, the electronic device 100 may display tasks recently opened by the user. Names of the navigation buttons may also be other names, for example, 4051 may be referred to as "Back button", 4052 may be referred to as "Home button", and 4053 may be referred to as "Menu button", which are not limited in this application. The navigation buttons on the navigation bar 405 are not limited to virtual buttons, and may alternatively be implemented as physical buttons.

It can be understood that, FIG. 4(A) merely shows an example user interface of the electronic device 100, and shall not constitute a limitation on this embodiment of this application.

Figure 5A:
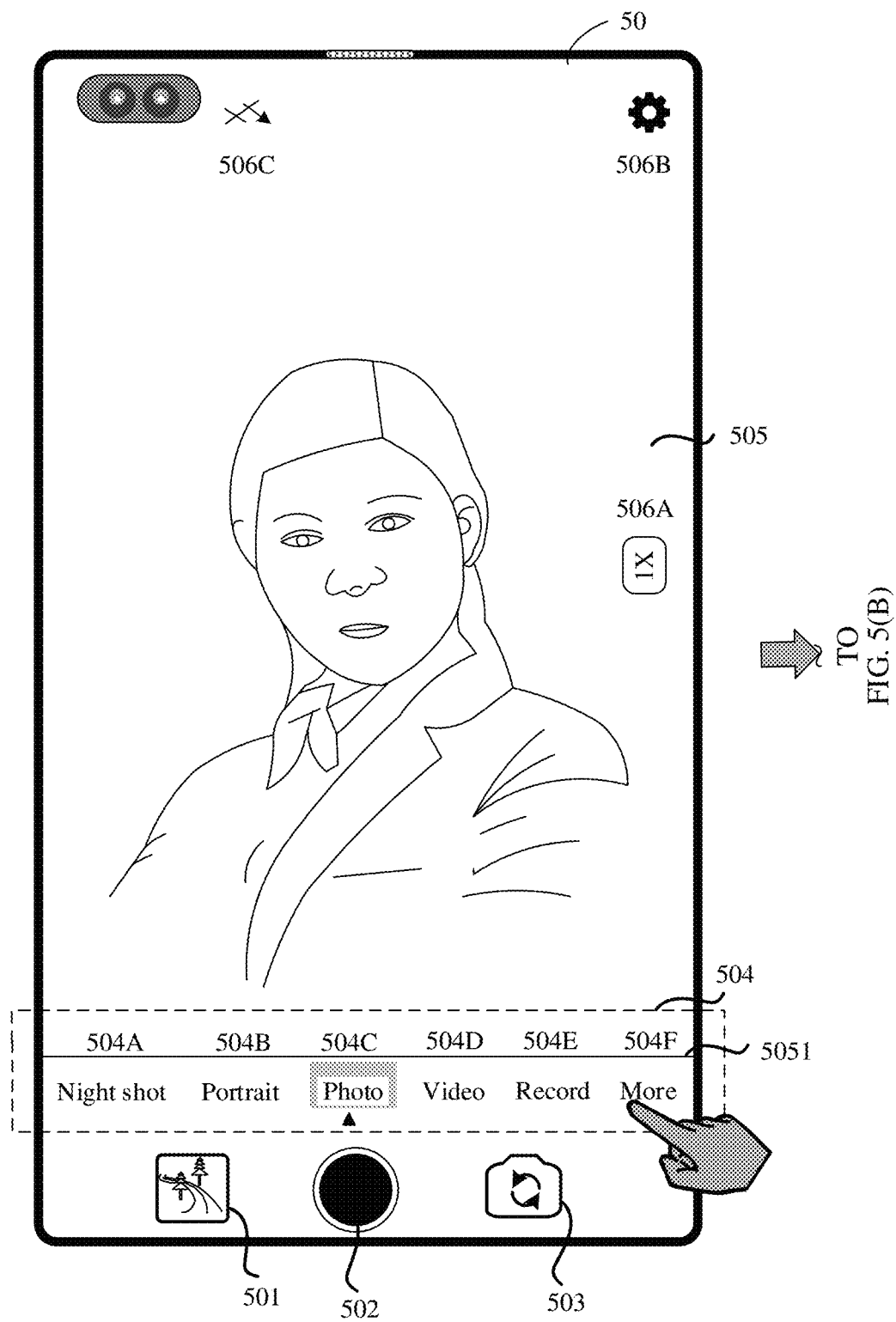
FIG. 5(A) to FIG. 5(D) are schematic diagrams of some man-machine interaction interfaces according to an embodiment of this application.
Figure 5B:
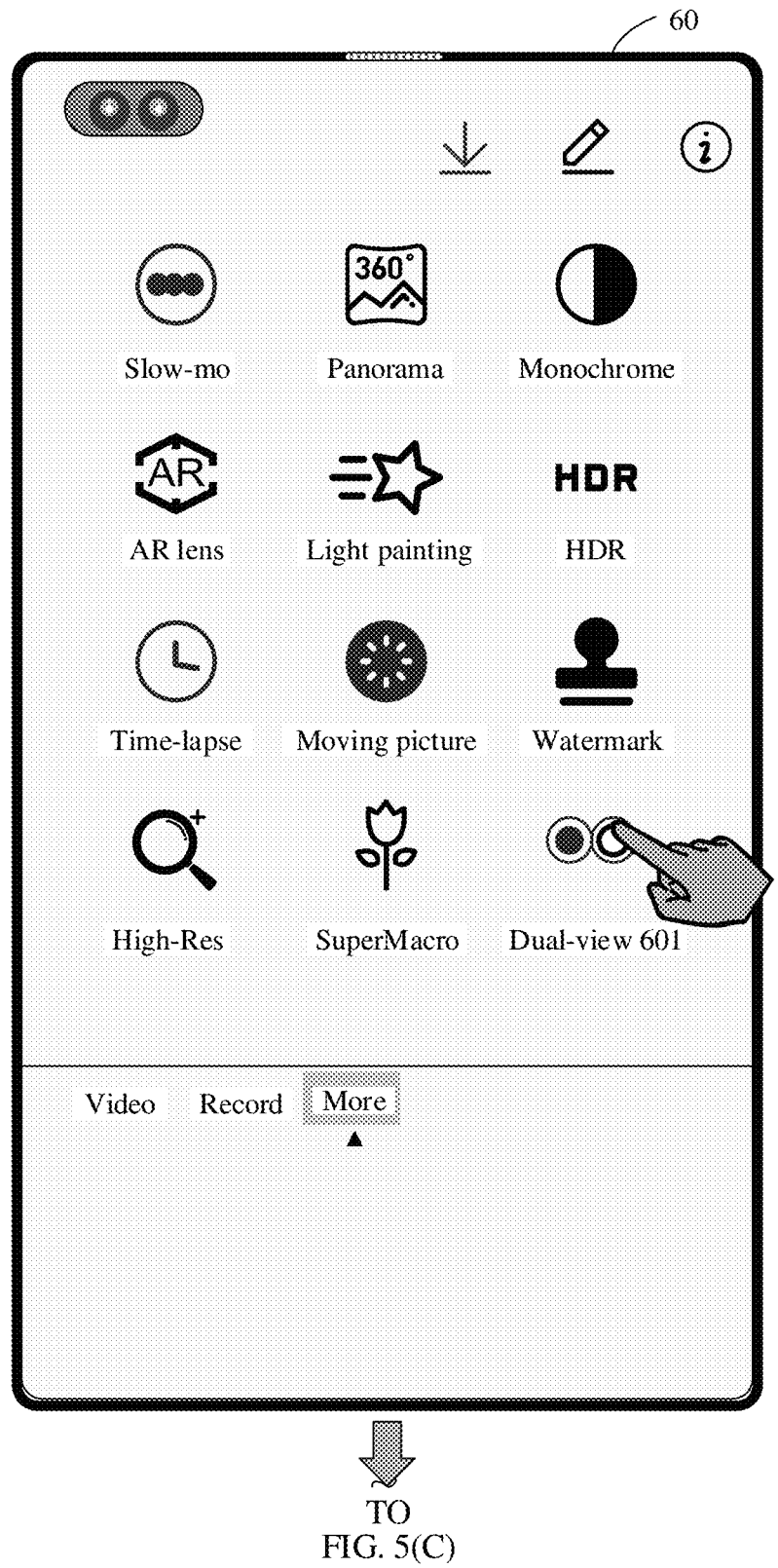
Figure 5C:
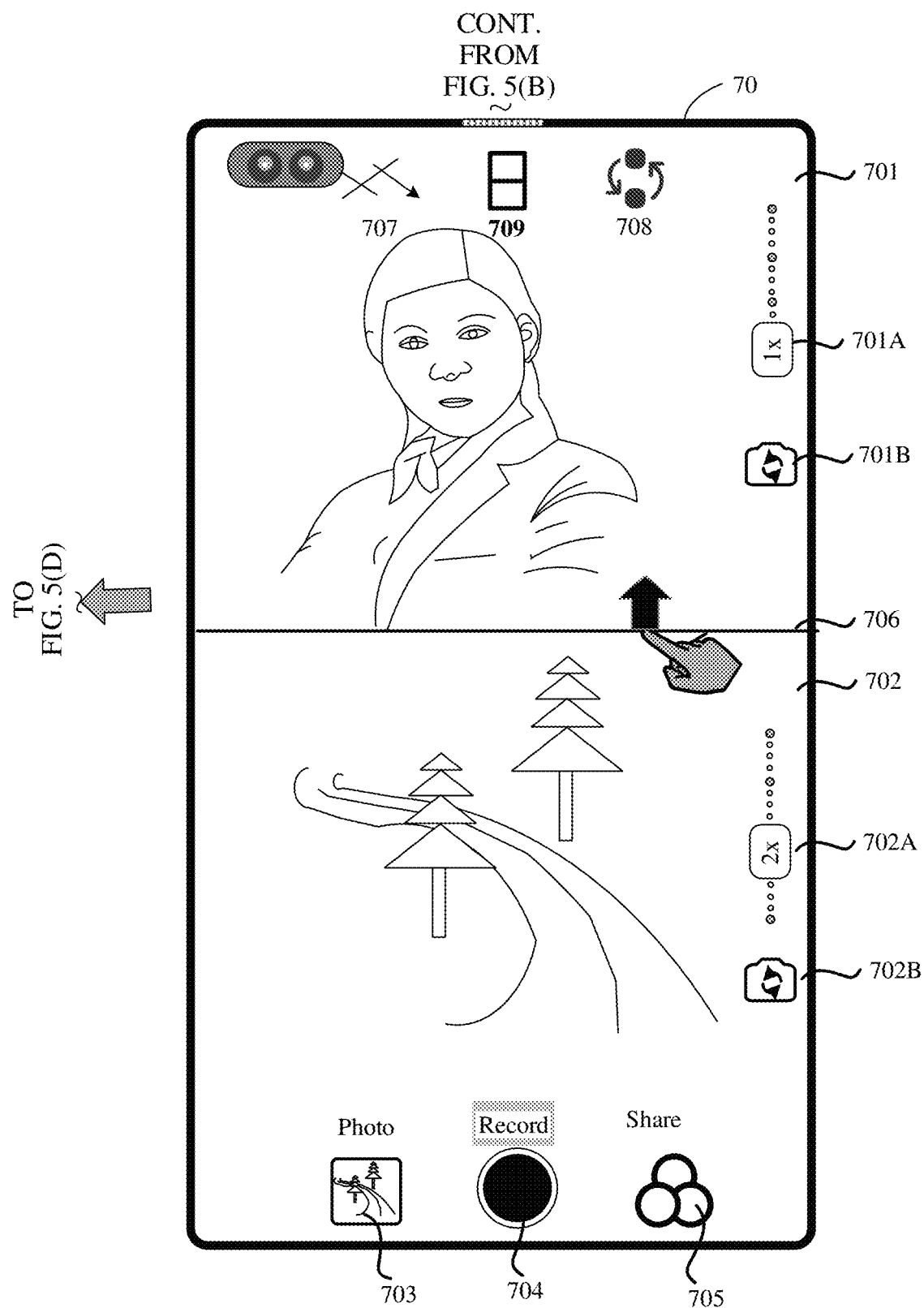

FIG. 5(A) and FIG. 5(B) show an example process in which the electronic device 100 enters a "dual-view recording mode" in response to a detected user operation.

For example, the electronic device may detect a touch operation (such as a tap operation on an icon 4031) on the icon 4031 of Camera shown in FIG. 4(A), and start the Camera application in response to the operation, and the electronic device 100 may display a user interface 50. "Camera" is an image shooting application on an electronic device such as a smartphone or a tablet computer, and a name of the application is not limited in this application. In other words, the user may tap the icon 4031 to open the user interface 50 of "Camera". This application is not limited thereto. The user may also open the user interface 50 in another application, for example, the user taps a shooting control in "WeChat®" to open the user interface 50. "WeChat®" is a social application that allows a user to share shot photos and the like with others.

FIG. 5(A) shows an example user interface 50 of the "Camera" application on an electronic device such as a smartphone. The user interface 50 may further include a thumbnail control 501, a shooting control 502, a camera switching control 503, a viewfinder frame 505, a focus adjustment control 506A, a settings control 506B, and a flash switch 506C.

The thumbnail control 501 is used by the user to view shot pictures and videos.

The shooting control 502 is configured to enable the electronic device 100 to shoot a picture or a video in response to a user operation. In this embodiment and other embodiments of this application, a moment at which the electronic device 100 starts to shoot a video may be referred to as a moment T1.

The camera switching control 503 is configured to switch an image collection camera between the front-facing camera and the rear-facing camera.

The viewfinder frame 505 is used for real-time preview display of a collected picture, where a dividing line 5051 is a lower boundary of the viewfinder frame 505, and an upper boundary of a screen of the electronic device 100 is an upper boundary of the viewfinder frame 505.

The focus adjustment control 506A is configured to adjust a focus of a camera.

In this embodiment of this application and subsequent embodiments, a camera focus adjustment manner is not limited to being implemented by touching the focus adjustment control, and may alternatively be implemented by a pinch-to-zoom operation on the viewfinder frame by the user. A zoom factor changes with a pinch-to-zoom gesture. When the pinch-to-zoom gesture is a pinch-to-zoom-in gesture, a larger range of the gesture indicates a larger zoom factor of a corresponding camera. When the pinch-to-zoom gesture is a pinch-to-zoom-out gesture, a larger range of the gesture indicates a smaller zoom factor of a corresponding camera.

The settings control 506B is configured to set various parameters during image collection.

The flash switch 506C is configured to turn on/off a flashlight.

The function bar 504 includes a night scene shooting control 504A, a portrait shooting control 504B, a photographing control 504C, a short video shooting control 504D, a video recording control 504E, and a more shooting options control 504F. Any shooting option control of the controls 504A to 504E may be used to respond to a user operation, such as a touch operation, so that the electronic device 100 starts a shooting mode corresponding to the control.

The more shooting options control 504F may respond to a user operation, namely, a touch operation on the more shooting options control 504F, and the electronic device 100 may display a user interface 60. The camera application interface 60 may further include a plurality of controls for selecting shooting modes, such as slow motion mode control, a panorama shooting control, a black and white mode control, and a dual-view video control 601, and may further include other shooting mode controls, which are implemented in this embodiment of this application.

As shown in FIG. 5(B), the dual-view recording control 601 responds to a user operation, namely, a touch operation on the dual-view recording control 601, and the camera enters a dual-view recording mode. In some embodiments, the dual-view recording control 601 may be included in the interface 50, or may be included in another user interface of the camera application, which is not limited in this embodiment of this application.

In some embodiments, the electronic device 100 may automatically enter the "dual-view recording mode" by default after the "Camera" is started. In some other embodiments, after the electronic device 100 starts the "Camera", if it does not enter the "dual-view recording mode", it may enter the "dual-view recording mode" in response to a detected user operation. This application is not limited thereto. The electronic device 100 may alternatively enter the "dual-view recording mode" in another manner. For example, the electronic device 100 may alternatively enter the "dual-view recording mode" based on a user's voice command, which is not limited in this embodiment of this application.

Figure 5D:
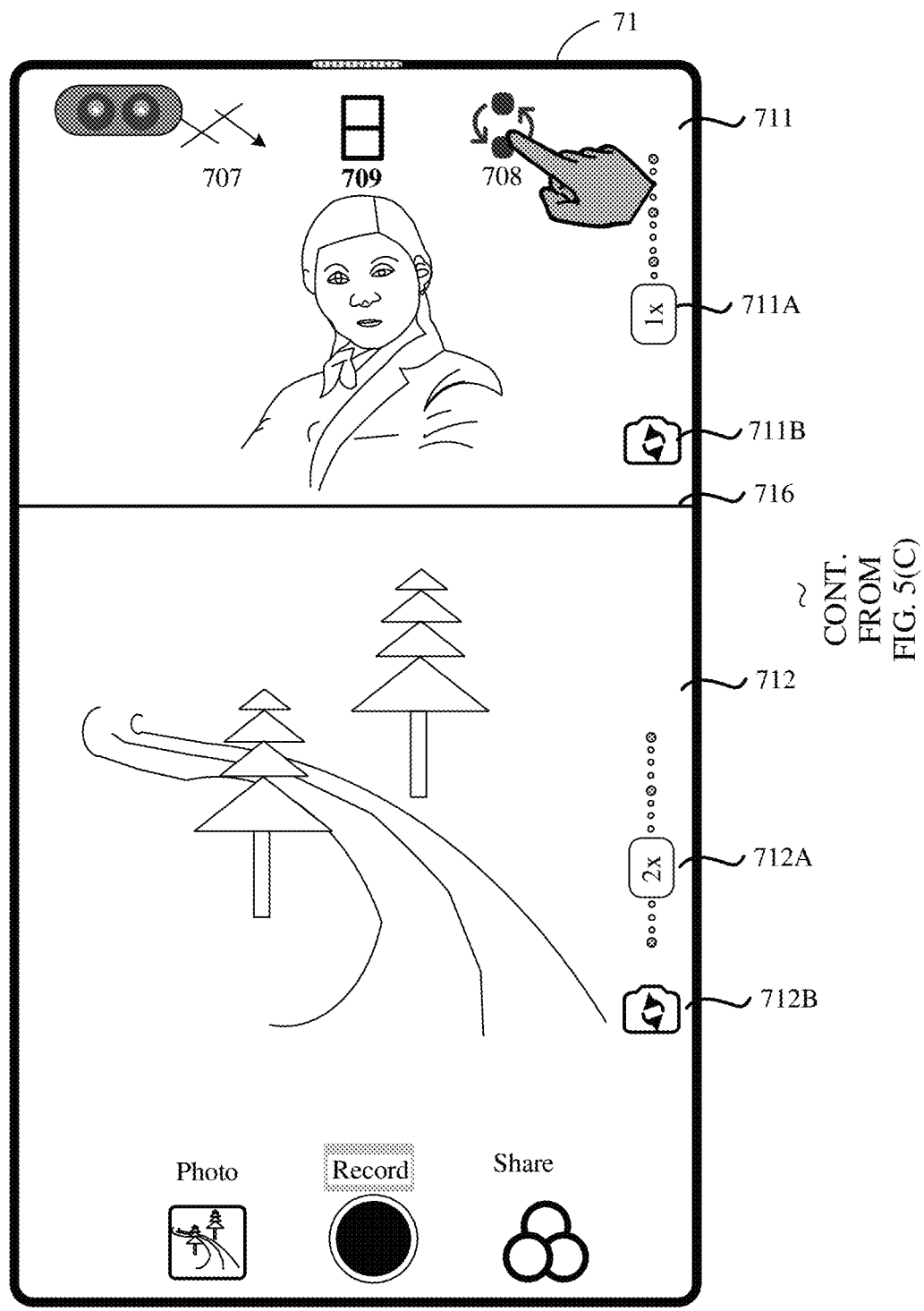

FIG. 5(C) to FIG. 5(D) show example scenarios of changing a recording interface form in a horizontal split-screen mode.

After entering a dual-view recording mode, the electronic device 100 may use two cameras to collect images, and display a preview interface on a display. As shown in a user interface 70 shown in FIG. 5(C), when the electronic device 100 first enters the dual-view recording mode, the electronic device 100 automatically selects a horizontally split-screen recording mode by default. In some embodiments, when entering the dual-view recording mode, a default split-screen mode may alternatively be another mode, such as a picture-in-picture mode, which is not limited in this embodiment of this application. The user interface 70 may further include the following controls.

An upper viewfinder frame 701 is used for real-time preview display of an image collected by a first camera. A separator line 706 is a lower boundary of the upper viewfinder frame 701, and the upper boundary of the screen of the electronic device 100 is an upper boundary of the viewfinder frame 701. The viewfinder frame 701 may include a camera switching control 701B, configured to switch an image collection camera between the front-facing camera and the rear-facing camera. For example, the user may tap the camera switching control 701B to change a camera corresponding to the viewfinder frame 701 from the front-facing camera 193-1 to the rear-facing camera 193-3.

In some implementations, a viewfinder frame corresponding to the front-facing camera may not include a focus adjustment control 701A. In other words, in this embodiment and subsequent embodiments, when the electronic device 100 performs front-facing framing, front-facing picture shooting does not support focus adjustment, and a focal length for front-facing picture shooting is fixed to wide-angle, long-focus, or another focal length. The front-facing picture shooting may alternatively support focus adjustment like rear-facing shooting, and the interface includes a focus adjustment control for focus adjustment.

A lower viewfinder frame 702 is used for real-time preview display of an image collected by a second camera. The separator line 706 is an upper boundary of the lower viewfinder frame 701, and a lower boundary of the screen of the electronic device 100 is a lower boundary of the view finder frame 702. The view finder frame 702 may include a focus adjustment control 702A, configured to adjust a focus of the second camera; and a camera switching control 702B, configured to switch an image collection camera between the front-facing camera and the rear-facing camera.

A thumbnail control 703 is used by the user to view shot pictures and videos.

A shooting control 704 is configured to enable the electronic device 100 to shoot a video in response to a user operation. In this embodiment and other embodiments of this application, a moment at which the electronic device 100 starts to shoot a video may be referred to as a first moment T1. In this embodiment and other embodiments of this application, a moment at which the electronic device 100 shoots a video in a dual-view recording mode may be referred to as a second moment T2. Duration between the first moment T1 and the second moment T2 may be referred to as first duration t1. When the first duration t1 is 0, the moment T1 is equal to the moment T2.

A filter control 705 is configured to set a filter for image shooting.

A flash switch 707 is configured to turn on/off a flashlight.

The separator line 706 is configured to separate the upper viewfinder frame 701 from the lower viewfinder frame 702.

It should be understood that, as shown in FIG. 5(C), the screen of the electronic device is divided horizontally into the upper viewfinder frame 701 and the lower viewfinder frame 702, the upper viewfinder frame 701 correspondingly displays an image from the front-facing camera 193-1, and the lower view finder frame 702 correspondingly displays an image from the rear-facing camera 193-3. An image in the upper viewfinder frame 701 is an image of a photographer facing the display of the electronic device 100, and an image in the lower viewfinder frame 702 is an image of the shooting object (such as a person or a landscape) facing the photographer.

After the electronic device 100 uses the user interface shown in FIG. 5(C) to record audio, when the audio is played, because an area of the upper viewfinder frame 701 is the same as an area of the lower viewfinder frame 702, the user can feel that loudness of a sound (which is on the side of the front-facing camera of the electronic device, and is referred to as a sound 1 below) of a surrounding environment of a shooting object in the upper viewfinder frame 701 is equal to loudness of a sound (which is on the side of the rear-facing camera of the electronic device, and is referred to as a sound 2 below) of a surrounding environment of a shooting object in the lower view finder frame 702. Optionally, it may be further implemented that the sound (namely, the sound 1) of the surrounding environment of the shooting object in the upper viewfinder frame 701 is emitted from an upper part of the electronic device, and the sound (namely, the sound 2) of the surrounding environment of the shooting object in the lower viewfinder frame 702 is emitted from a lower part of the electronic device. However, actually, speakers (for example, a top speaker or/and a bottom speaker or/and a back speaker) of the electronic device all play the sound of the surrounding environment of the shooting object in the upper viewfinder frame 701, and also play the sound of the surrounding environment of the shooting object in the lower viewfinder frame 702. In other words, the speakers of the electronic device all play the sound 1 and the sound 2. Moreover, in this way, a stereo effect is enhanced, so that the user feels that a sound of the upper viewfinder frame is emitted from an upper position, and a sound of the lower viewfinder frame is emitted from a lower position, which enhances experience and interests.

In some embodiments, the electronic device 100 may adjust the areas of the upper view finder frame 701 and the lower view finder frame 702 in response to the user's touch operation, such as a sliding operation, on the separator line 706. For example, as shown in FIG. 5(C), in response to the user operation, that is, a slide-up operation on the separator line 709, the area of the upper viewfinder frame 701 decreases, and the area of the lower viewfinder frame 702 increases. For a final presentation effect, refer to a user interface 71 shown in FIG. 5(D). After the electronic device 100 uses the user interface shown in FIG. 5(D) to record audio, because the area of the upper viewfinder frame 701 is smaller than the area of the lower viewfinder frame 702, when the audio is played, a difference from the sound in FIG. 5(C) lies in that the loudness of the sound 1 is smaller than the loudness of the sound 2. Optionally, the user may still feel that the sound 1 is emitted from the upper part of the electronic device, and the sound 2 is emitted from the lower part of the electronic device. For details, refer to the description of FIG. 5(C), which is not described again.

Certainly, the user may also use a slide-down operation on the separator line 709 to increase the area of the upper viewfinder frame 701 and reduce the area of the lower viewfinder frame 702. When audio recorded in such an interface is played, compared with the audio recorded in the interface before the separator line 709 is slided, loudness of the sound 1 is larger, and loudness of the sound 2 is smaller.

A picture swap control 708 is configured to swap the upper viewfinder frame 701 and the lower viewfinder frame 702.

For example, as shown in FIG. 5(D), in response to the user operation, that is, a touch operation on the picture swap control 708, the electronic device 100 swaps a picture in the upper viewfinder frame 711 and a picture in the lower viewfinder frame 712. For a final presentation effect, refer to a user interface 72 shown in FIG. 6(A). For a sound effect of FIG. 6(A), refer to the description of FIG. 5(D). Details are not described herein again. This application is not limited to the swapping of the two pictures by using the control 708 shown FIG. 5(C) and FIG. 5(D). The user may alternatively swap images of the two viewfinder frames by using another operation. For example, the user may swap the images of the two viewfinder frames by using a slide-down operation on the upper viewfinder frame 711 or a slide-up operation on the lower viewfinder frame 712.

A split-screen option control 709 is configured to enable the electronic device 100 to switch a split-screen mode in a dual-view recording mode in response to the user operation.

It should be understood that in the horizontally split-screen mode, the user can further change a recording interface by adjusting a focus, switching a front/rear lens, and changing the split-screen mode. For details, refer to description of the subsequent embodiments.

The following describes, with reference to FIG. 6(A) to FIG. 6(F), manners in which the electronic device 100 enters a "picture-in-picture" mode and adjusts a recording interface style in the "picture-in-picture" mode. It should be noted that, in embodiments shown in FIG. 6(A) to FIG. 6(F), a posture of the electronic device 100 is not changed. In other words, the user does not move the electronic device 100 when adjusting the recording interface style of the electronic device, and the change of the recording interface in FIG. 6(A) to FIG. 6(F) is not related to posture change of the electronic device.

Figure 6A:
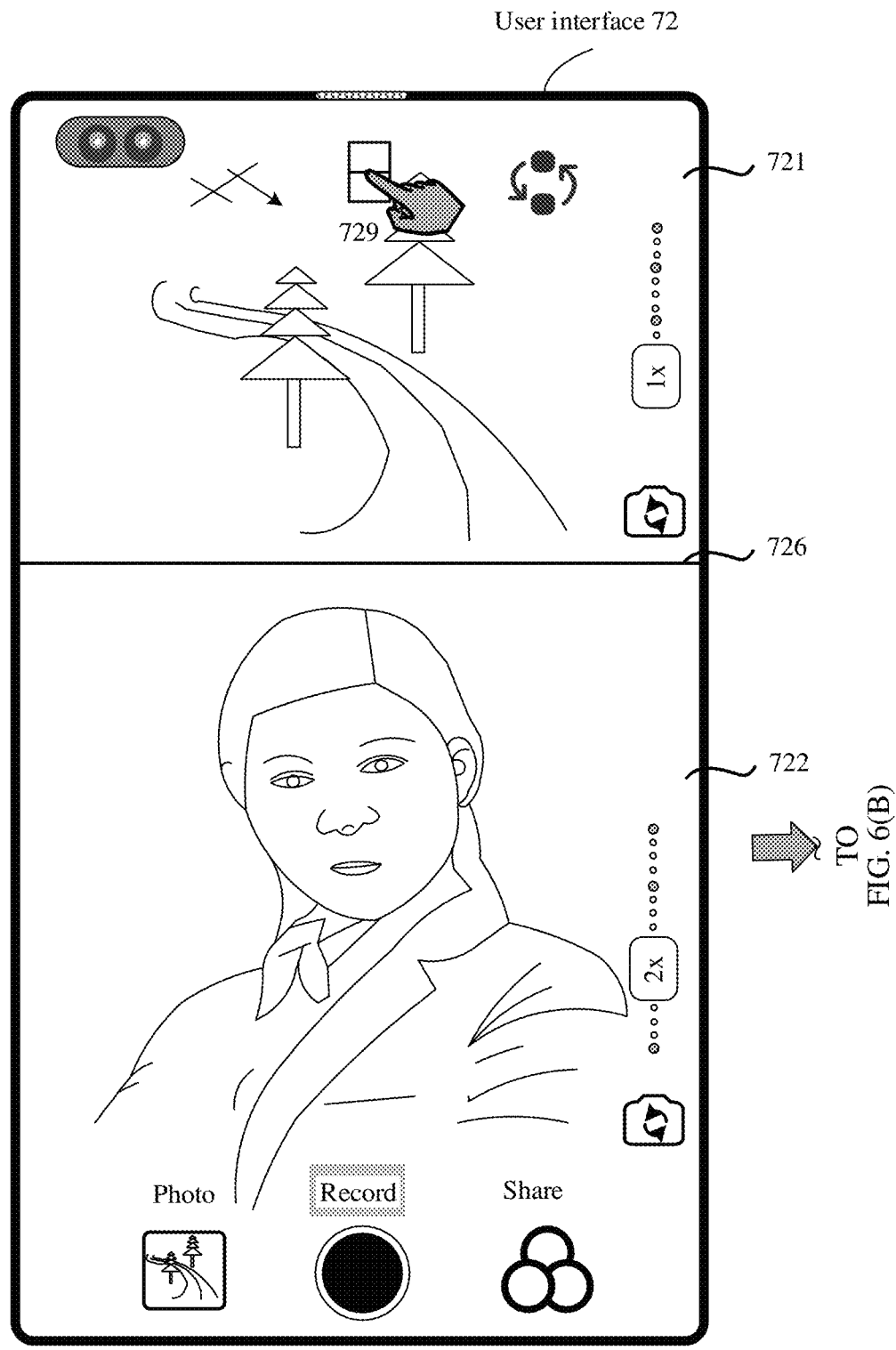
FIG. 6(A) to FIG. 6(H) are schematic diagrams of some man-machine interaction interfaces according to an embodiment of this application.
Figure 6B:
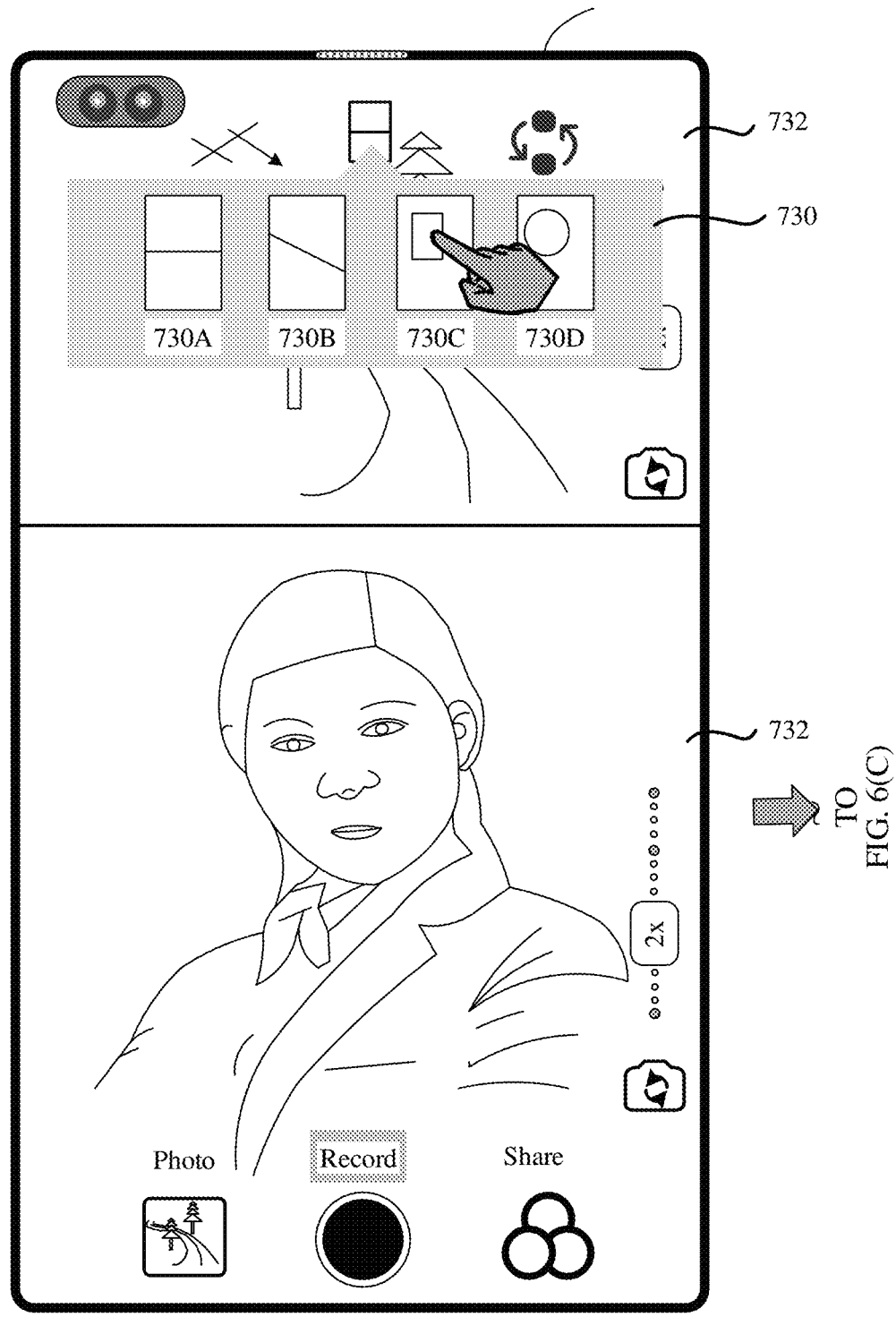
Figure 6C:
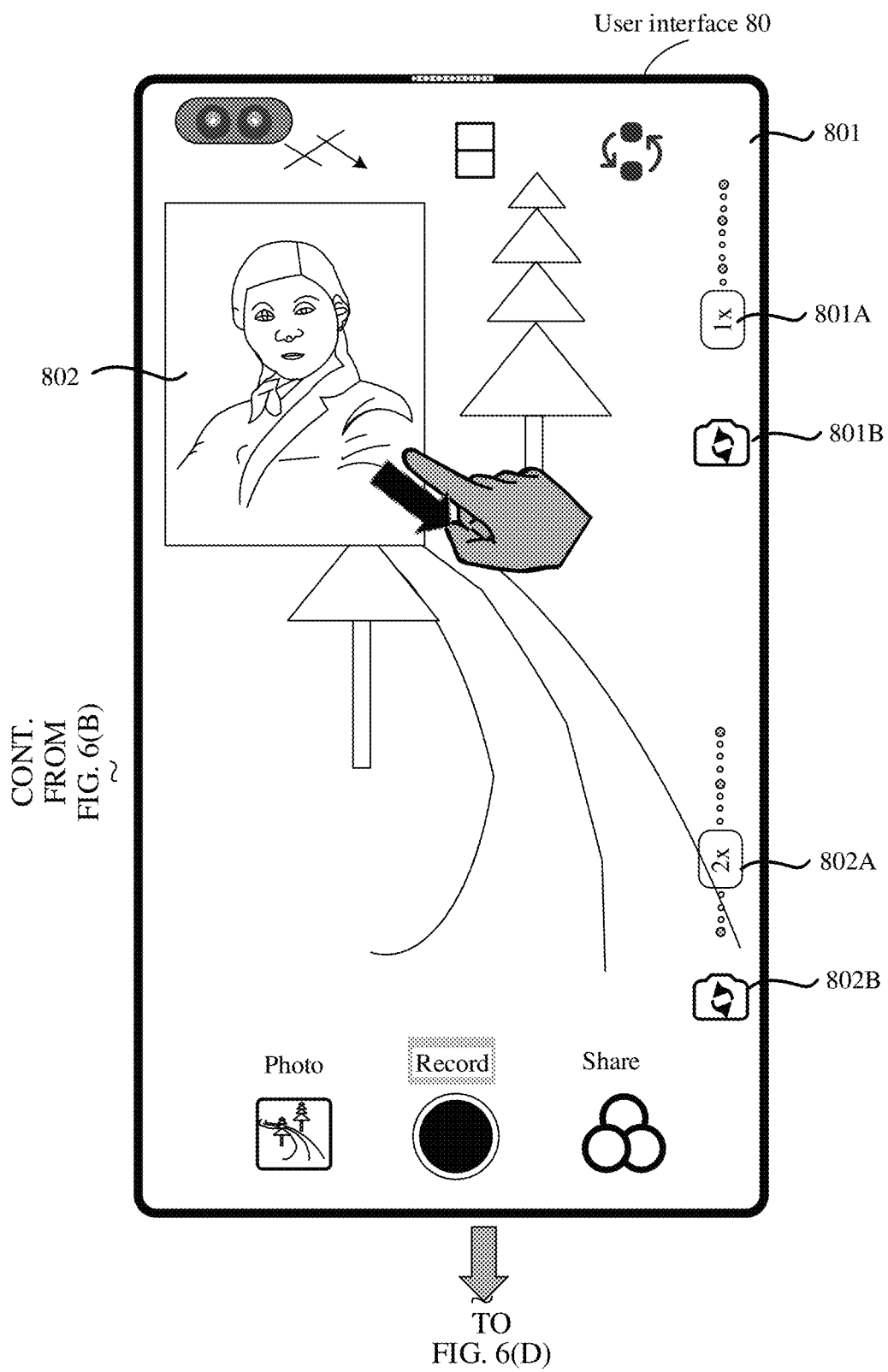

FIG. 6(A) to FIG. 6(C) show example scenarios in which the user switches a split-screen mode in the dual-view recording mode.

As shown in FIG. 6(A), the electronic device 100 displays a split-screen option frame 710 in response to the user operation, namely, a touch operation on the split-screen option control 709. As shown in FIG. 6(B), the split-screen option frame 710 may include a plurality of split-screen option controls, for example, a horizontally split-screen control 701A (regular split-screen), a horizontally split-screen control 701B (irregular split-screen), a picture-in-picture control 710C (a shape of a smaller viewfinder frame is a square), and a picture-in-picture control 710D (a shape of a small viewfinder frame is a circle). In some embodiments, the split-screen option frame 710 may further include other split-screen option controls, which are not limited in this embodiment of this application. Any split-screen option control may be used to respond to the user operation, such as a touch operation, so that the electronic device 100 starts a split-screen recording mode corresponding to the control.

Switching of the split-screen mode is not limited to switching through the split-screen option frame shown in FIG. 6(B), and the user may alternatively switch the split-screen mode in another manner, which is not limited in this embodiment of this application. For example, the electronic device 100 may directly switch to another split-screen mode different from a current split-screen mode in response to the user's touch operation on a split-screen option control 729 in FIG. 6(A). When the user touches the split-screen option control 729 again in FIG. 6(A), the electronic device 100 switches to still another split-screen mode.

As shown in FIG. 6(B), the electronic device 100 starts a dual-view recording mode in a picture-in-picture split-screen manner in response to the user operation, namely, a touch operation on a picture-in-picture control 730C, and displays a user interface 80 shown in FIG. 6(C). As shown in FIG. 6(C), the user interface 80 may further include a camera switching control, a viewfinder frame 802, and other controls such as a shooting control and a filter control (for details, refer to the description of FIG. 5(C); details are not described herein again).

The main viewfinder frame 801 (also referred to as a main picture region) is used for real-time preview display of an image collected by the first camera. The main viewfinder frame 801 may include a focus adjustment control 801A, configured to adjust a focus of the first camera; and a camera switching control 801B, configured to switch an image collection camera between the front-facing camera and the rear-facing camera. For example, the user may tap the camera switching control 801B to change a camera corresponding to the viewfinder frame 801 from the front-facing camera 193-1 to the rear-facing camera 193-3. A sub-viewfinder frame 802 (also referred to as a picture sub-region) is used for real-time preview display of an image collected by the second camera. The sub-viewfinder frame 802 may include a focus adjustment control 802A, configured to adjust a focus of the second camera; and a camera switching control 802B, configured to switch an image collection camera between the front-facing camera and the rear-facing camera. For example, the user may tap the camera switching control 802B to change a camera corresponding to the viewfinder frame 802 from the rear-facing camera 193-3 to the front-facing camera 193-1. For convenience of description, as shown in FIG. 6(C), the focus adjustment control 802A and the camera switching control 802B are presented in the main viewfinder frame 801. In some embodiments, the focus adjustment control 802A and the camera switching control 802B are presented in the sub-viewfinder frame 801. For details, refer to FIG. 6(G). In some implementations, the sub-viewfinder frame may not include a focus adjustment control. For details, refer to FIG. 6(H).

After the electronic device 100 uses the user interface shown in FIG. 6(C) to record audio, when the audio is played, because the sub-viewfinder frame 802 is located in an upper-left corner of the main viewfinder frame 801 and has a smaller area, the user can feel that loudness of a sound (which is on the side of the front-facing camera of the electronic device, and is referred to as a sound 1 below) of a surrounding environment of a shooting object in the sub-viewfinder frame 802 is smaller than loudness of a sound (which is on the side of the rear-facing camera of the electronic device, and is referred to as a sound 2 below) of a surrounding environment of a shooting object in the main viewfinder frame 801. Optionally, it may be further implemented that the sound (which is on the side of the rear-facing camera of the electronic device, and is referred to as a sound 2 below) of the surrounding environment of the shooting object in the main viewfinder frame 801 is emitted around the user without directivity, and the sound (which is on the side of the front-facing camera of the electronic device, and is referred to as a sound 1 below) of the surrounding environment of the shooting object in the sub-viewfinder frame 802 is emitted from an upper-left corner of the electronic device (the mobile phone is hold by the user in the direction shown in FIG. 6(C)). However, actually, speakers (for example, a top speaker or/and a bottom speaker or/and a back speaker) of the electronic device all play the sound of the surrounding environment of the shooting object in the sub-viewfinder frame 802, and also play the sound of the surrounding environment of the shooting object in the main viewfinder frame 801. In other words, the speakers of the electronic device all play the sound 1 and the sound 2. Moreover, in this way, a stereo effect is enhanced, so that the user feels that the sound has a picture-in-picture effect, which enhances experience and interests. In some embodiments, the user may further feel that the sound 1 is emitted from the left side of the user.

It should be understood that pictures of the main viewfinder frame 801 and the sub-viewfinder frame 802 may also be swapped through a touch operation on a picture swap control, and audio recorded in an interface obtained after the swap also changes accordingly during playing (refer to the descriptions of FIG. 5(D) and FIG. 6(A); details are not described herein again).

It should be understood that, as shown in FIG. 6(C), the screen of the electronic device is divided into the main viewfinder frame 801 and the sub-viewfinder frame 802. The main viewfinder frame 801 correspondingly displays an image from the rear-facing camera 193-3, and the sub-viewfinder frame 802 correspondingly displays an image from the front-facing camera 193-1. An image in the main viewfinder frame 801 is an image of a shooting object (such as a person or a landscape) facing a photographer, and an image in the sub-viewfinder frame 802 is an image of the photographer facing the display of the electronic device 100.

When a picture-in-picture dual-view recording mode is just started, a default area and azimuth of the viewfinder frame 802 are not limited to the style shown in FIG. 6(C). In some embodiments, the area of the viewfinder frame 802 may be larger or smaller than that shown in FIG. 6(C), and an azimuth of the viewfinder frame 802 relative to the viewfinder frame 801 may alternatively be an upper-right corner or another azimuth of the screen of the electronic device 100, which is not limited in this embodiment of this application.

FIG. 6(C) to FIG. 6(F) show example scenarios of adjusting a recording interface style in a picture-in-picture mode.

In some embodiments, the electronic device 100 may adjust the area and the azimuth of the viewfinder frame 802 in response to the user's touch operation.

For example, refer to FIG. 6(C). The electronic device 100 may change the azimuth of the view finder frame 802 on the screen in response to a sliding operation on the viewfinder frame 802. For a changed azimuth of the viewfinder frame 802, refer to FIG. 6(D). The azimuth of the view finder frame 802 is changed from the upper-left corner to the lower-right corner of the screen of the electronic device 100. In this case, the loudness of the sound 1 and the loudness of the sound 2 are not changed, but the sound 1 is felt to have moved from the upper-left corner to the lower-right corner of the electronic device.

Figure 6D:
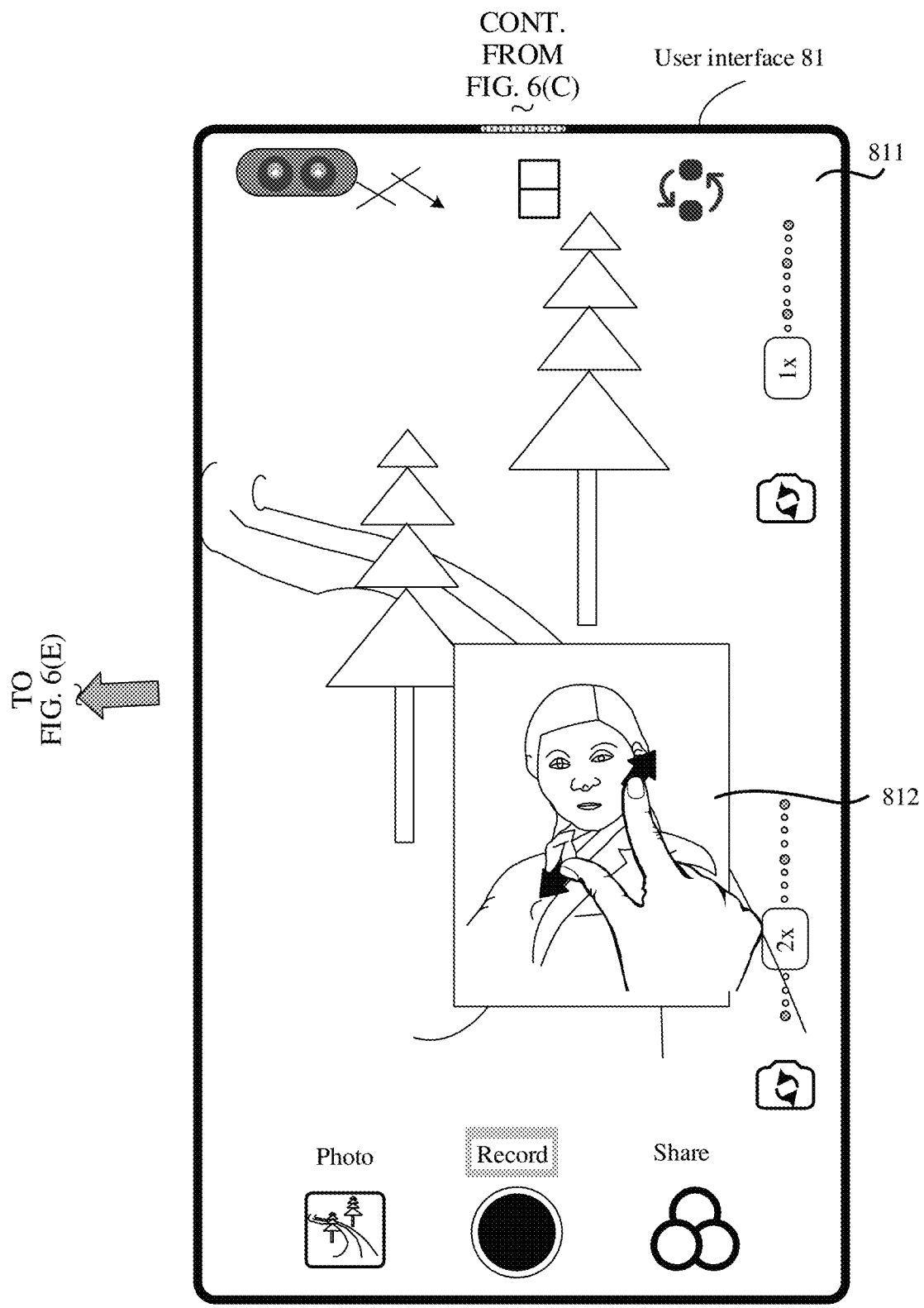

For example, refer to FIG. 6(D), in response to a pinch-to-zoom-in operation on a view finder frame 812, the electronic device 100 enlarges the area of the view finder frame 802. For an enlarged viewfinder frame, refer to a viewfinder frame 822 in FIG. 6(E). Similarly, the electronic device 100 may shrink the area of the viewfinder frame 802 in response to a pinch-to-zoom-out operation on the viewfinder frame 812.

Figure 6E:
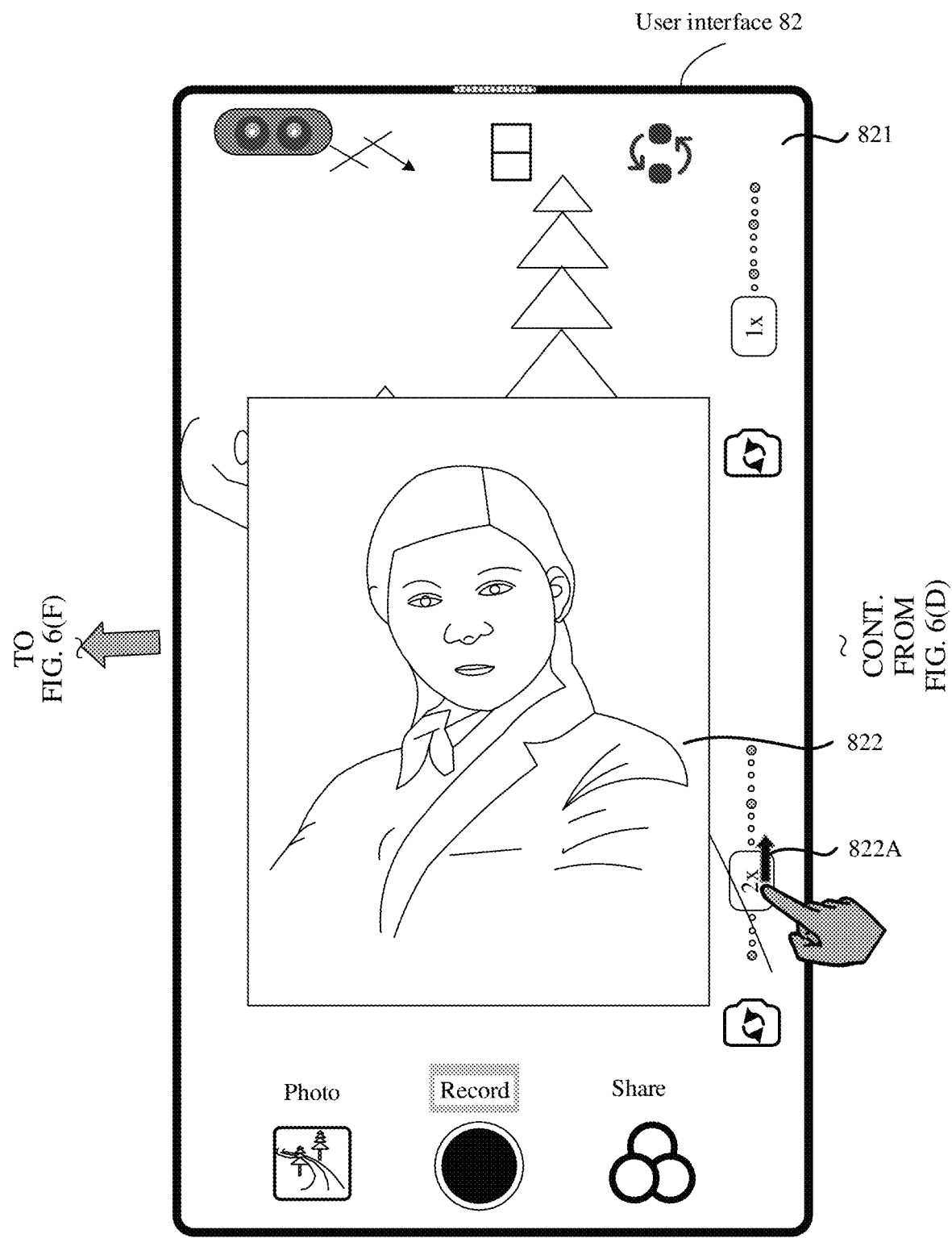
Figure 6F:
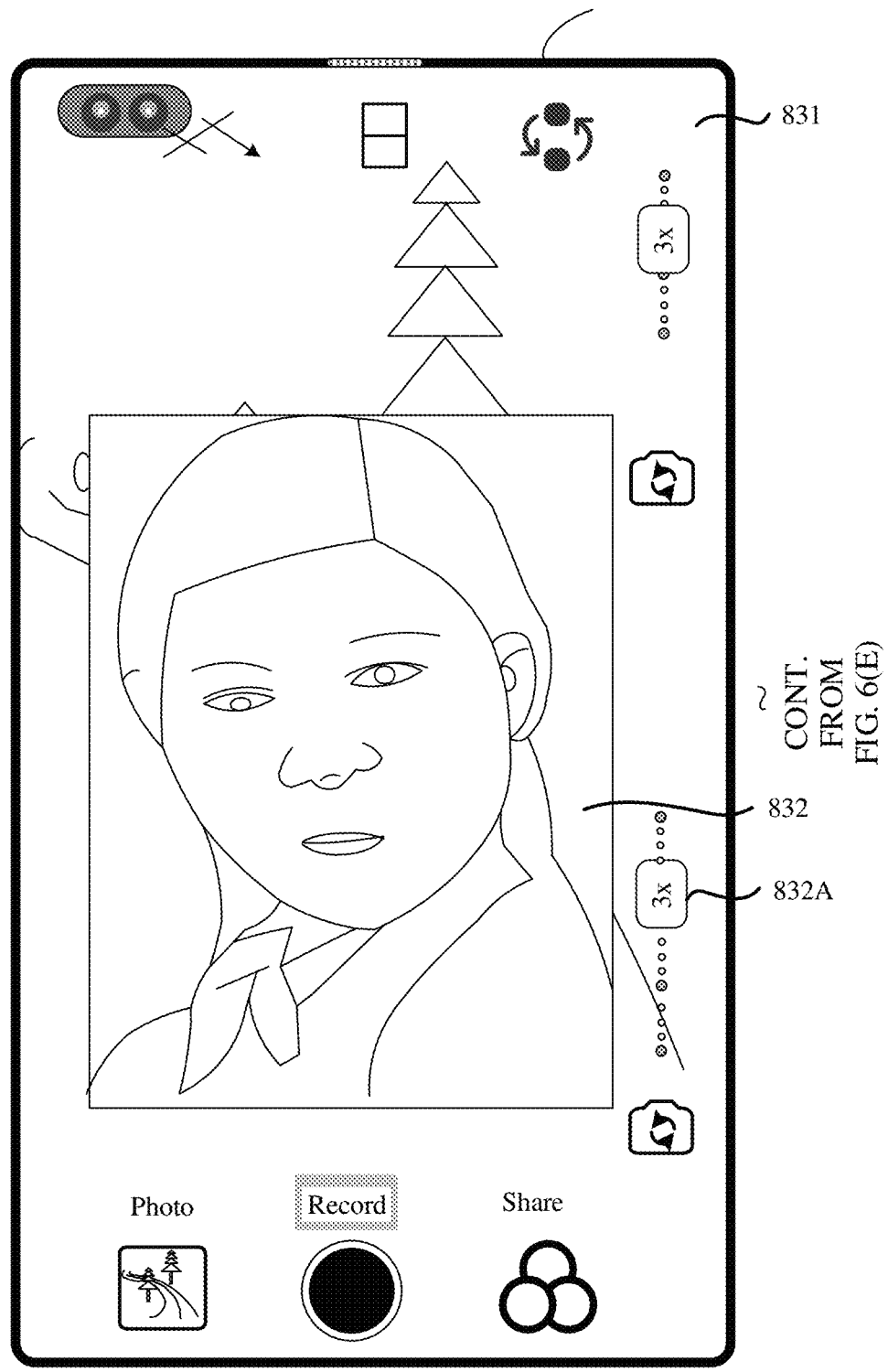
Figure 6G:
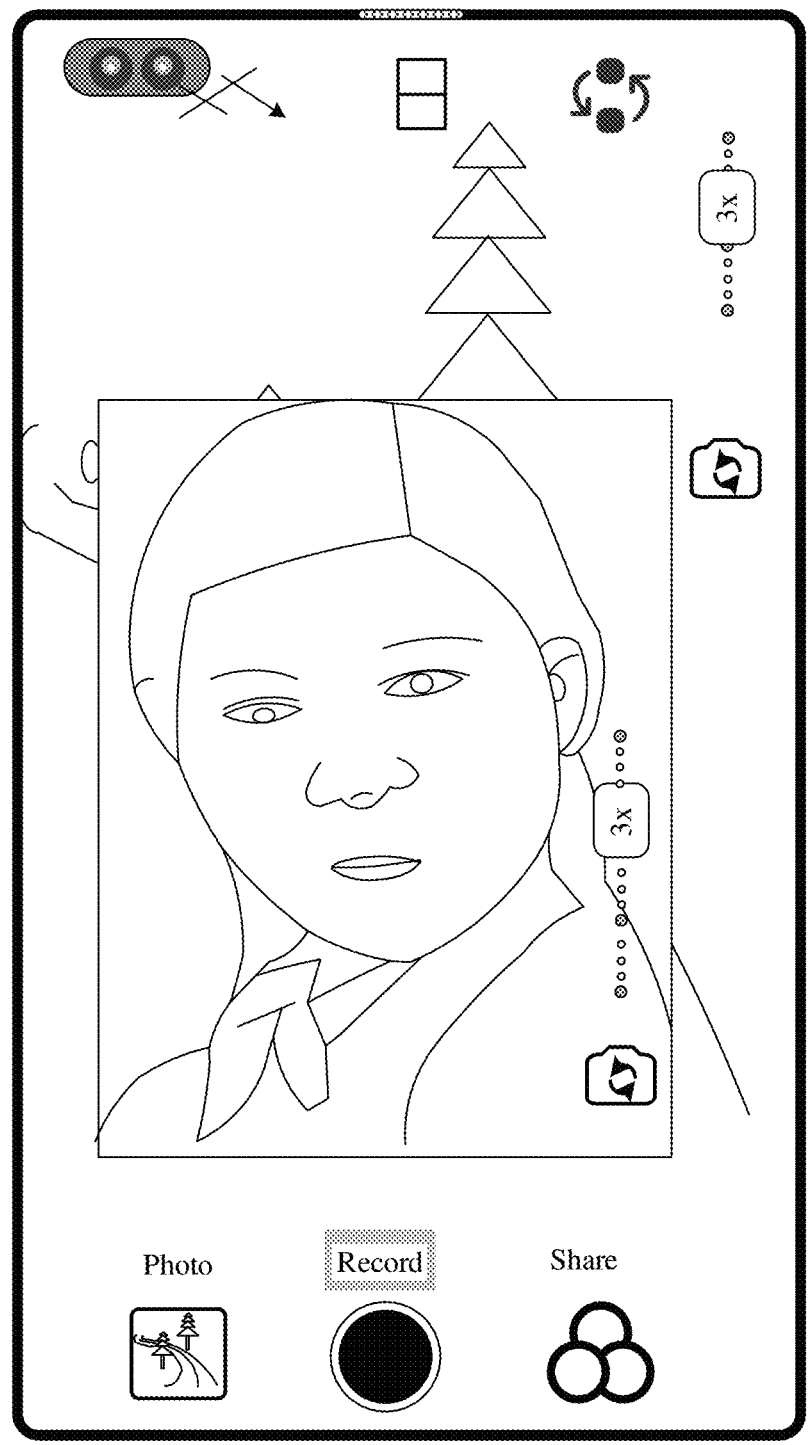
Figure 6H:
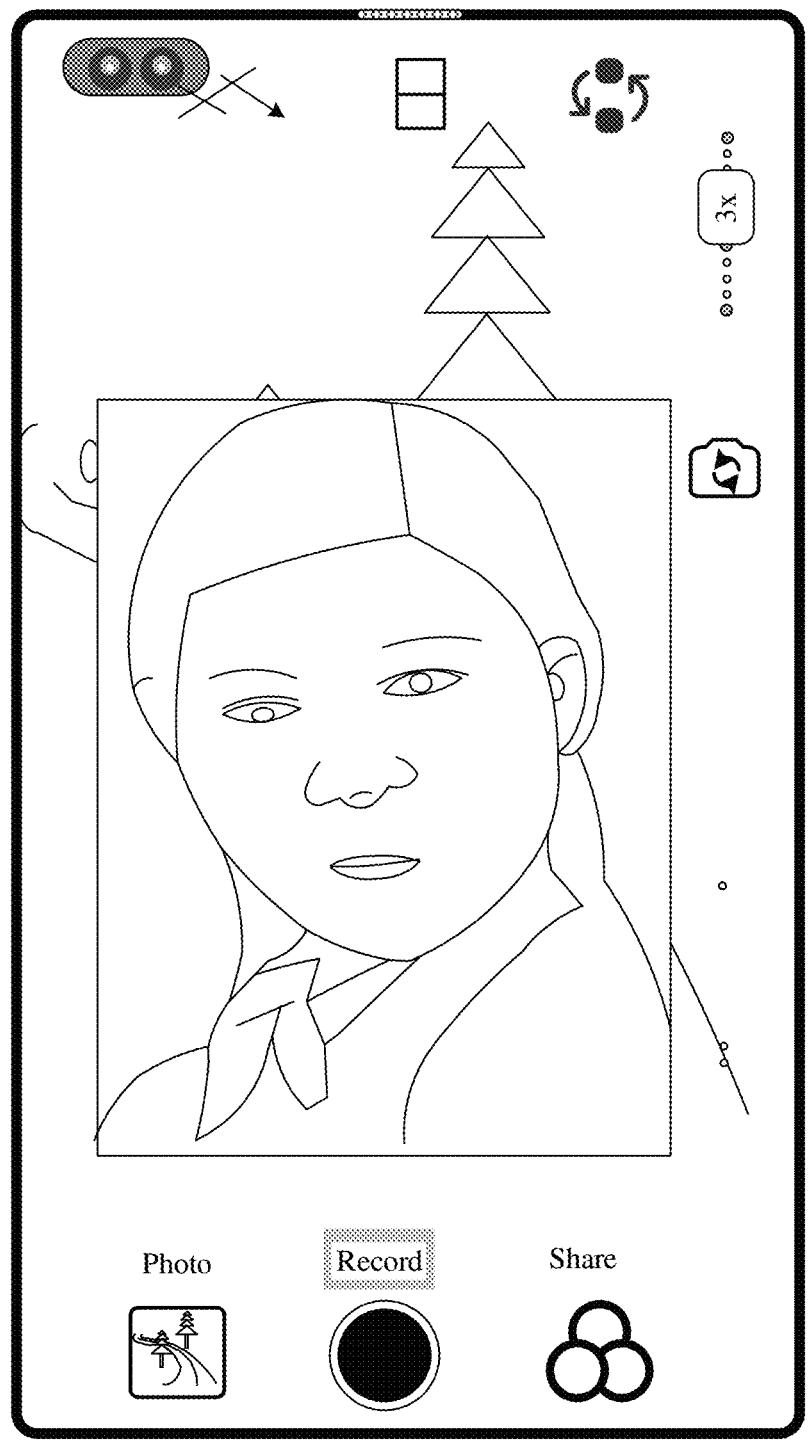

Compared with audio recorded in an interface shown in FIG. 6(D), when the electronic device 100 uses a user interface shown in FIG. 6(E) to record the audio, the loudness of the sound 1 becomes larger during playing. In addition, the electronic device further may adjust a focal length of a camera in response to a detected user operation. As shown in FIG. 6(E), in response to a sliding operation on a focus adjustment control 822A, the electronic device increases a focal length of a camera corresponding to a viewfinder frame 822 from 2× to 3×. For an adjusted user interface, refer to FIG. 6(F). A visual field presented by an image in the viewfinder frame 822 is changed from FIG. 6(E) (the viewfinder frame 822) to FIG. 6(F) (a viewfinder frame 832). However, the image in the viewfinder frame 822 is larger than an image in the viewfinder frame 832 shown in FIG. 6(E).

Based on the electronic device 100 described in the foregoing content and the foregoing user interface related embodiments, the following describes some scenarios of filtering audio signals in different user interfaces (namely, recording interfaces in dual-view recording) when the electronic device 100 performs the audio processing method provided in the embodiments of this application.

First, correspondences between some focal length multipliers and fields of view provided by an electronic device 100 in an embodiment of this application are described. Refer to the following Table 1.

TABLE 1

| | Focal length | | | | | |
|---|---|---|---|---|---|---|
| | 1× | 2× | 3× | 4× | 5× | 6× |
| Field of view | 180° | 120° | 90° | 60° | 45° | 30° |

It should be understood that values of fields of view in Table 1 merely represent ranges of fields of view, and do not reflect directivity of fields of view. Specifically, with reference to Table 1 and the foregoing rules, when a focal length of a front-facing camera is 1×, a field of view of the front-facing camera is 180°, and when a focal length of a rear-facing camera is 1×, a field of view of the rear-facing camera is −180°, and so on.

In addition, Table 1 merely shows example focal length multipliers that can be provided by the camera in the electronic device 100. Not limited to the focal length multipliers included in Table 1, the camera in the electronic device 100 may further provide a user with other more focal length multiplier options, such as 7× and 8×, which are not limited in this embodiment of this application.

In addition, a correspondence between each focal length multiplier and a field of view in the electronic device 100 may not be limited to the correspondence shown in Table 1. For example, in some embodiments, a field of view corresponding to a focal length multiplier of 1× may be 170°, and a field of view corresponding to a focal length multiplier of 2× may be 160°, which is not limited in this embodiment of this application. However, it should be noted that regardless of the correspondence between a focal length multiplier and a field of view, the correspondence is fixed when the electronic device 100 is manufactured and delivered. In other words, when the electronic device 100 performs shooting, the electronic device 100 may obtain a value and a range of a field of view based on front-facing/rear-facing information and a focal length multiplier of a camera used for shooting.

Figure 7A:
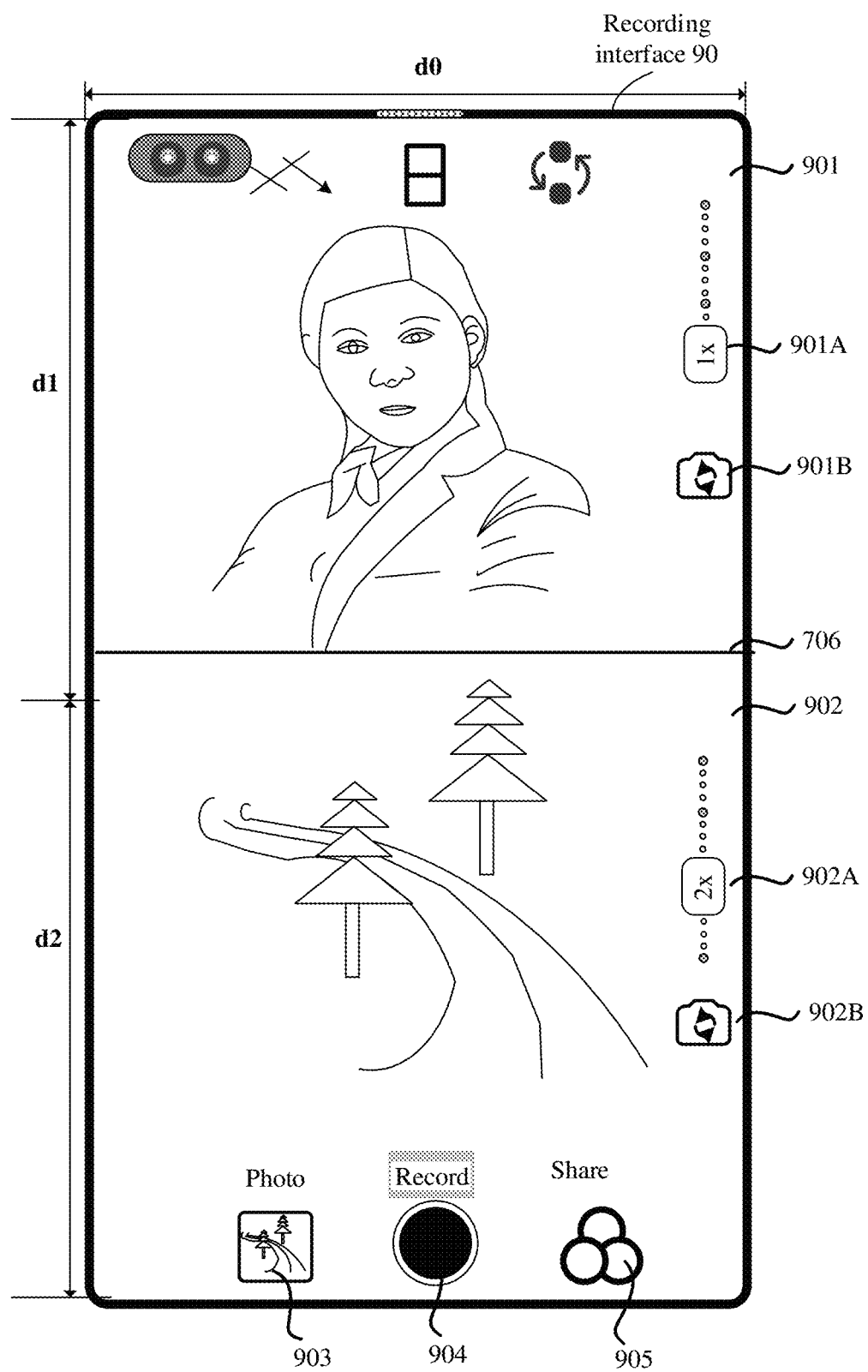
FIG. 7A is a schematic diagram of a recording interface according to an embodiment of this application.

FIG. 7A shows an example recording interface when the electronic device 100 performs dual-view recording in a horizontally split-screen mode by using both the front-facing and rear-facing cameras.

Refer to FIG. 7A. A recording interface 90 shown in FIG. 7A may include a plurality of controls, such as a shooting control 904, a filter control 905, and some other controls. The electronic device 100 may switch a recording picture in response to the user's touch operation on the control. For details about switching a recording picture, refer to the foregoing related description of FIG. 5(A) to FIG. 5(D). Details are not described herein again.

In the recording interface 90 shown in FIG. 7A, the front-facing camera of the electronic device 100 provides only a fixed focal length multiplier of 1×, that is, a field of view of the front-facing camera is fixed at +180°; the rear-facing camera of the electronic device 100 may provide six different focal length multipliers of 1× to 6×. The user may switch the focal length multiplier of the rear-facing camera by touching a focus adjustment control 902A, so as to adjust a field of view range of a picture in a viewfinder frame 902. The user may further use a camera switching control 901B to switch an image collection camera of an upper viewfinder frame 901 between the front-facing camera and the rear-facing camera. Similarly, the user may further use a camera switching control 902B to switch an image collection camera of the lower viewfinder frame 902 between the front-facing camera and the rear-facing camera. For example, the user may tap the camera switching control 901B to change a camera corresponding to the viewfinder frame 901 from the front-facing camera 193-1 to the rear-facing camera 193-3. In some embodiments, switching of the focal length of the front-facing camera is also supported, and the recording interface also includes a focus adjustment control for focus adjustment of the front-facing camera. For details, reference may be made to a control 911A in a recording interface 91 shown in FIG. 7B, which can be used to switch the focal length of the front-facing camera.

As shown in FIG. 7A, the electronic device 100 is performing dual-view recording in a horizontally split-screen mode by using a front-facing camera with a fixed focal length multiplier of 1× and a rear-facing camera with a focal length multiplier of 3×. In this case, a picture (referred to as a picture 1 below) presented in an upper viewfinder frame 901 is a picture shot by the front-facing camera (for example, 193-1), and is the user's own face; a picture (referred to as a picture 2 below) presented in a lower viewfinder frame 902 is a picture shot by the rear-facing camera (for example, 193-3), and is a landscape image in front of the electronic device 100. In this case, it can be learned from the foregoing Table 1 that a field of view of the front-facing camera is +180°, and a field of view of the rear-facing camera is −90°.

Figure 7B:
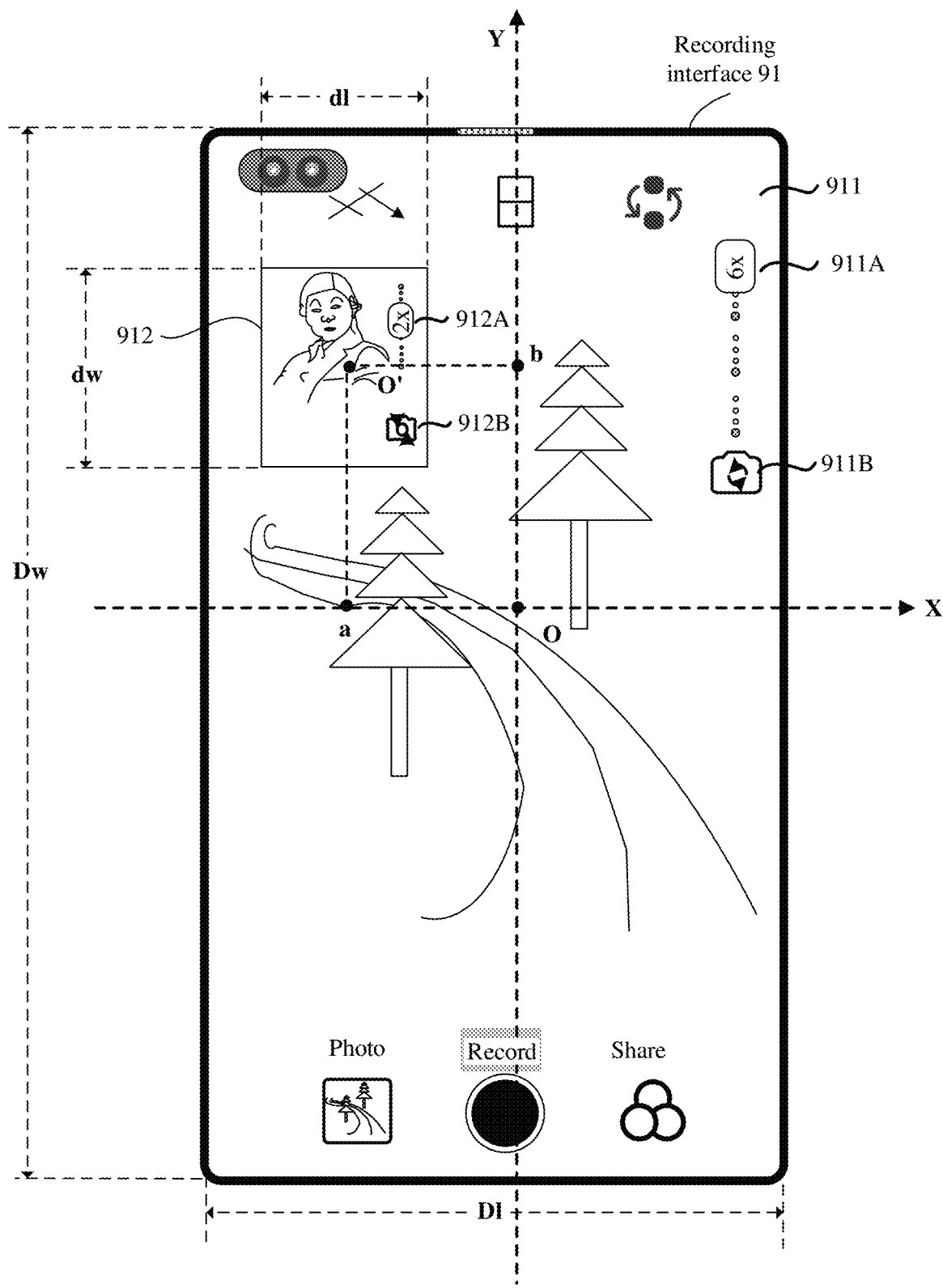
FIG. 7B is a schematic diagram of another recording interface according to an embodiment of this application.

FIG. 7B shows a recording interface when the electronic device 100 performs dual-view recording in a picture-in-picture split-screen mode by using both the front-facing and rear-facing cameras.

Refer to FIG. 7B. The recording interface 91 shown in FIG. 7B may include a plurality of controls. The electronic device 100 may switch a recording picture in response to the user's touch operation on the control. For details about switching a recording picture, refer to the foregoing related description of FIG. 5(A) to FIG. 5(D). Details are not described herein again.

In the recording interface 91 shown in FIG. 7B, the electronic device 100 is performing dual-view recording in a picture-in-picture mode by using a front-facing camera with a focal length multiplier of 6× and a rear-facing camera with a focal length multiplier of 2×. In this case, a picture (referred to as a main picture below) presented in a viewfinder frame 911 is a picture shot by the rear-facing camera (for example, 193-4) with a focal length multiplier of 2×, and is a landscape in front of the electronic device 100; a picture (referred to as a sub-picture below) presented in a view finder frame 912 is a picture shot by the front-facing camera (for example, 193-2) with a focal length multiplier of 6×, and is the user's own face. In this case, it can be learned from the foregoing Table 1 that a field of view corresponding to the main picture is −90°, and a field of view corresponding to the sub-picture is +30°.

Figure 8A:
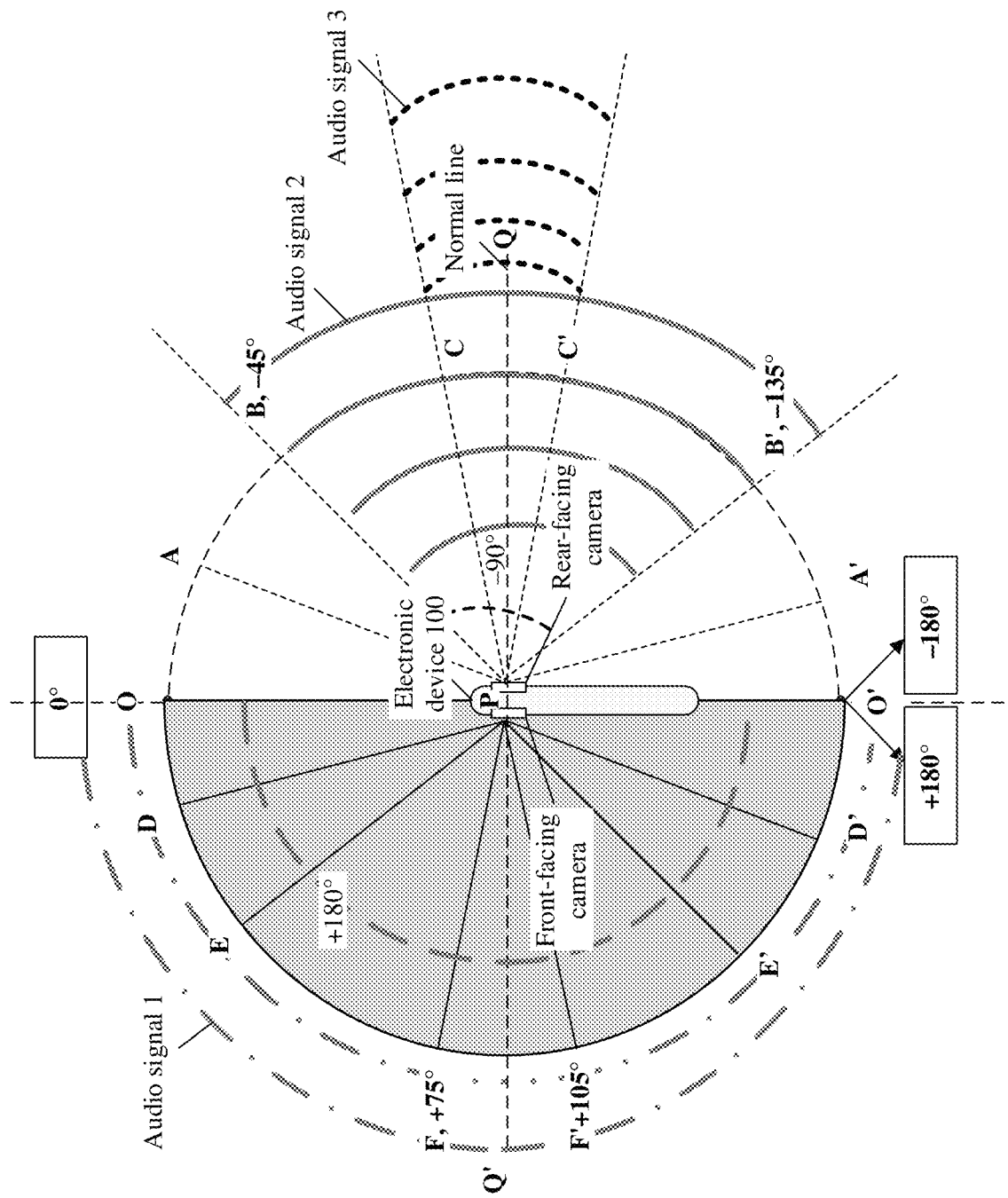
FIG. 8A is a schematic diagram of a scenario in which an electronic device filters an audio signal with reference to a field of view of a picture according to an embodiment of this application.

In this embodiment of this application, when collecting audio signals in an environment, the electronic device 100 still collects audio signals in all directions in the space (namely, 360° in the space). However, in order to enable the recorded audio to match up with field of view ranges presented by the two pictures to the user, after collecting the audio signals transmitted at an omnidirectional angle, the electronic device 100 may perform same-angle filtering on the received audio signals with reference to respective fields of view of the two pictures, to obtain audio signals that are respectively enhanced in directions of the two fields of view:

Refer to FIG. 8A. FIG. 8A is a schematic diagram of a scenario in which an electronic device provided in an embodiment of this application filters an audio signal with reference to a field of view of a picture.

FIG. 8A presents a top view of the electronic device 100 when it is placed upright, and the electronic device may be considered as a point P. OPO' is a plane on which the electronic device is located, and QQ' is a normal line of the plane. The left side of OPO' represents a side on which a front-facing camera of the electronic device is located, and the right side of OPO' represents a side on which a rear-facing camera of the electronic device 100 is located. It is not difficult to understand that the shaded part on the left side of OPO' represents a field of view range (0° to +180°) that can be obtained by the front-facing camera of the electronic device 100 with a focal length of 1×, and the blank part on the right side of OPO' represents a field of view range (−180° to 0°) that can be obtained by the rear-facing camera of the electronic device 100 with a focal length of 1×. ∠OPO' (on the right side), ∠APA', ∠BPB', and ∠CPC' are corresponding fields of view of the rear-facing camera of the electronic device 100 with 1×, 2×, 3× and 6×, respectively. ∠OPO' (on the right side), ∠DPD', ∠EPE', ∠FPF' are corresponding fields of view of the front-facing camera of the electronic device 100 with 1×, 2×, 3×, and 6×, respectively. A value of each angle is may be obtained by referring to the foregoing Table 1. Details are not described herein again.

It can be learned from the description of FIG. 7A that in the case of the recording interface 90, a value and a direction of the field of view of the front-facing camera (namely, the camera corresponding to the picture 1) of the electronic device 100 are the same as those of ∠OPO' (on the left side) in FIG. 8A. The value is +180°, and boundaries of the field of view are rays on which PO and PO' are located. A size and a direction of the field of view of the rear-facing camera (namely, the camera corresponding to the picture 2) of the electronic device 100 are the same as those of ∠BPB' in FIG. 8A. The value is −90°, and boundaries of the field of view are rays on which PB and PB' are located. Therefore, when the user uses the recording interface shown in FIG. 7A to perform dual-view recording, the electronic device 100 suppresses, based on the field of view ∠OPO' (on the left side) of the picture 1, an audio signal collected in an angular direction except ∠OPO' (on the left side), to obtain an audio signal 1 in the same angular direction as ∠OPO' (on the left side); and suppresses, based on the field of view of ∠BPB' of the picture 2, an audio signal collected in an angular direction except ∠BPB', to obtain an audio signal 2 in the same angular direction as ∠BPB'. For example, the picture 1 includes a sound source A, a scene outside the picture 1 includes a sound source A', the picture 2 includes a sound source B, and a scene outside the picture 2 includes a sound source B'. After the foregoing process is performed, a sound signal obtained by using the field of view of the picture 1 makes the user feel, in terms of hearing, that the sound source A is a main sound, and may make the user perceive that the sound has an effect of directivity corresponding to an azimuth of the picture 1 presented on the screen. A sound signal obtained by using the field of view of the picture 2 makes the user feel, in terms of hearing, that the sound source B is a main sound, and may make the user perceive that the sound has an effect of directivity corresponding to an azimuth of the picture 2 presented on the screen.

It should be understood that when the user changes the recording interface, angular directions of two fields of view in the recording interface may also change accordingly. In this case, an angular direction selected when the electronic device 100 filters the audio signal also changes accordingly.

With reference to the description of FIG. 7B, it may be learned that in the case of the recording interface 91, a value and a direction of the field of view of the front-facing camera (namely, the camera corresponding to the sub-picture) of the electronic device 100 are the same as those of ∠FPF' (on the left side) in FIG. 8A. The value is +30°, and boundaries of the field of view are rays on which PF and PF' are located. A size and a direction of the field of view of the rear-facing camera (namely, the camera corresponding to the main picture) of the electronic device 100 are the same as those of ∠APA' in FIG. 8A. The value is −120°, and boundaries of the field of view are rays on which PA and PA' are located. Therefore, when the user uses the recording interface shown in FIG. 8A to perform dual-view recording, the electronic device 100 suppresses, based on the field of view FPF' of the sub-picture, an audio signal collected in an angular direction except ∠FPF', to obtain an audio signal 3 in the same angular direction as ∠FPF'; and suppresses, based on the field of view of ∠APA' of the main picture, an audio signal collected in an angular direction except ∠APA', to obtain an audio signal 4 (not shown in FIG. 8A) in the same angular direction as ∠APA'.

Figure 7C:
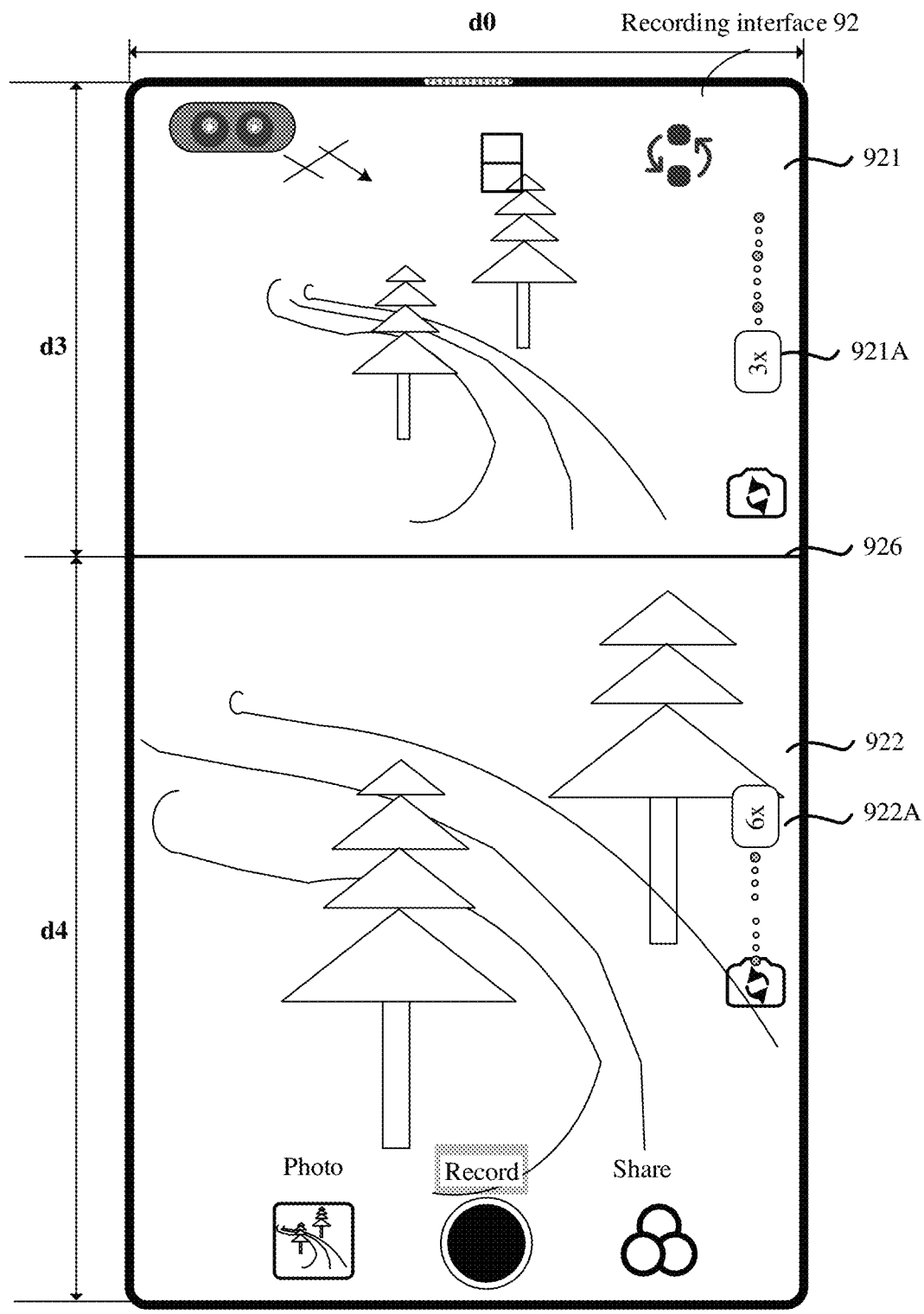
FIG. 7C is a schematic diagram of still another recording interface according to an embodiment of this application.

It can be understood that, depending on a combination of different cases such as front-facing/rear-facing and focal length multipliers of two viewfinder cameras in dual-screen recording, there are a plurality of recording interfaces for the dual-view recording. For example:

In the recording interface 92 shown in FIG. 7C, when the electronic device 100 is performing dual-view recording by using a front-facing camera with a focal length of 3× and and a front-facing camera with a focal length of 6×, a corresponding field of view of the front-facing camera with a focal length of 3× in FIG. 8A is ∠EPE', and a corresponding field of view of the front-facing camera with a focal length of 6× FIG. 8A is ∠FPF'.

When the electronic device 100 is performing dual-view recording by using a rear-facing camera with a focal length of 1× and a rear-facing camera with a focal length of 2×, a corresponding field of view of the rear-facing camera with a focal length of 1× in FIG. 8A is ∠OPO' (on the right side), a corresponding field of view of the rear-facing camera with a focal length of 2× in FIG. 8A is ∠BPB'.

Certainly, the electronic device 100 may alternatively use another different combination of cameras with focal lengths to perform dual-view recording. When the electronic device 100 uses a different combination of cameras with focal lengths for video recording, an angular direction selected for filtering an audio signal varies accordingly, and two audio signals obtained by filtering also vary. Details are not listed herein again.

In some embodiments, in order to enable the audio to have a better dual-channel stereoscopic effect, when filtering the audio signal, the electronic device 100 may select a specific filtering method (for example, a CVX beam training method) for filtering based on left and right angular directions of a field of view of each picture, which is described below with reference to FIG. 8B.

Figure 8B:
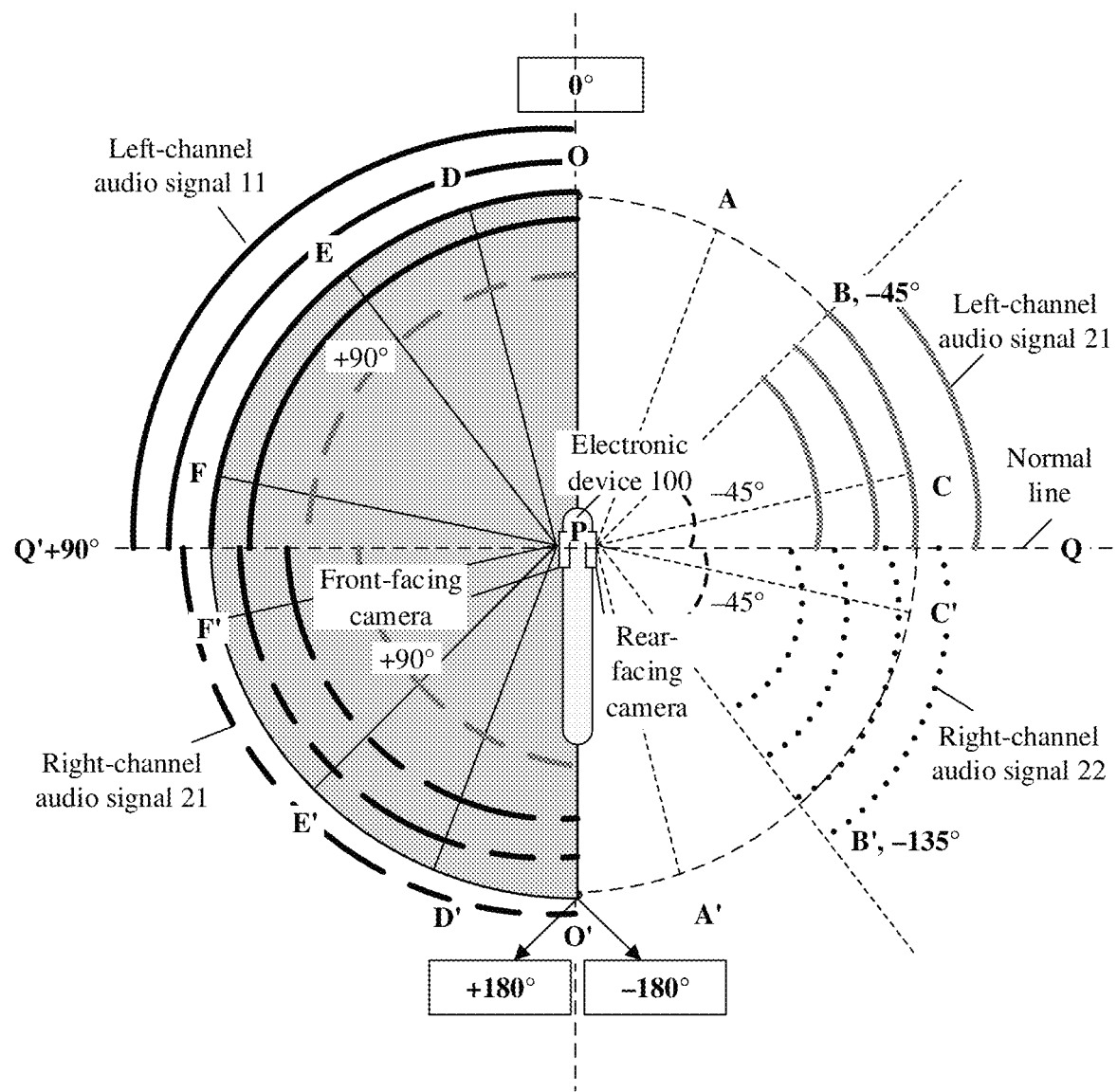
FIG. 8B is a schematic diagram of another scenario in which an electronic device filters an audio signal with reference to a field of view of a picture according to an embodiment of this application.

FIG. 8B is a schematic diagram of another scenario in which an electronic device provided in an embodiment of this application filters an audio signal with reference to a field of view of a picture by using a CVX beam training method. FIG. 8B presents a top view of the electronic device 100 when the electronic device 100 is placed upright, and the electronic device may be considered as a point P. For specific meanings of the plane OPO', QQ', ∠OPO' (on the right side), ∠APA', ∠BPB', ∠CPC', ∠OPO' (on the right side), ∠DPD', ∠EPE', and ∠FPF' in FIG. 8B, refer to the description of FIG. 7B. Details are not described herein again.

In FIG. 8B, the electronic device 100 is performing dual-view recording by using the recording interface 90 shown in FIG. 7A. It can be learned from the description of FIG. 7A that, in the case of the recording interface 90, a field of view of the picture 1 is ∠OPO' (on the left side) in FIG. 8B, and boundaries are rays on which PO and PO' are located. A field of view of the picture 2 is ∠BPB', and boundaries of the field of view are rays on which PB and PB' are located. It can be learned from FIG. 8B that the normal line QQ' of the plane on which the electronic device 100 is located is an angle bisector of ∠OPO' (on the left side) and ∠BPB'. In this case, the normal line QQ' divides ∠OPO' (on the left side) into ∠OPQ' and ∠O'PQ', and divides ∠BPB' into ∠BPQ and ∠B'PQ. It is stipulated herein that, for the electronic device 100, the upper side of the normal line QQ' is the left side of the electronic device 100, and the lower side of the normal line QQ' is the right side of the electronic device 100.

During dual-view recording, the electronic device 100 may suppress, based on the field of view ∠OPO' (on the left side) of the picture 1, an audio signal collected in an angular direction except ∠OPQ' and ∠O'PQ', to obtain a left channel audio signal 11 in the same angular direction as ∠OPQ' and a right channel audio signal 12 in the same angular direction as ∠O'PQ'; and suppresses, based on the field of view of ∠BPB' of the picture 2, an audio signal collected in an angular direction except ∠BPQ and ∠B'PQ, to obtain a left channel audio signal 21 in the same angular direction as ∠BPQ and a right channel audio signal 22 in the same angular direction as ∠B'PQ. In this way, when the four audio signals obtained above are mixed and output, the output audio can bring more three-dimensional hearing experience to the user.

Certainly, the method for filtering an audio signal shown in FIG. 8B is also applicable to other recording interfaces. For a given recording interface, it is only necessary to perform left and right division based on fields of view of two pictures in each recording interface to obtain four fields of view with distinguished left and right sides, and then separately perform audio filtering based on angular directions of the four fields of view to obtain four audio signals with differences between left and right channels. Scenarios in which the electronic device 100 filters audio in all recording interfaces are not described one by one herein.

In addition, shapes of the audio signals shown in FIG. 8A and FIG. 8B are merely intended to distinguish between the audio signals, and do not represent actual waveforms of the audio signals when they propagate in the space.

Figure 9:
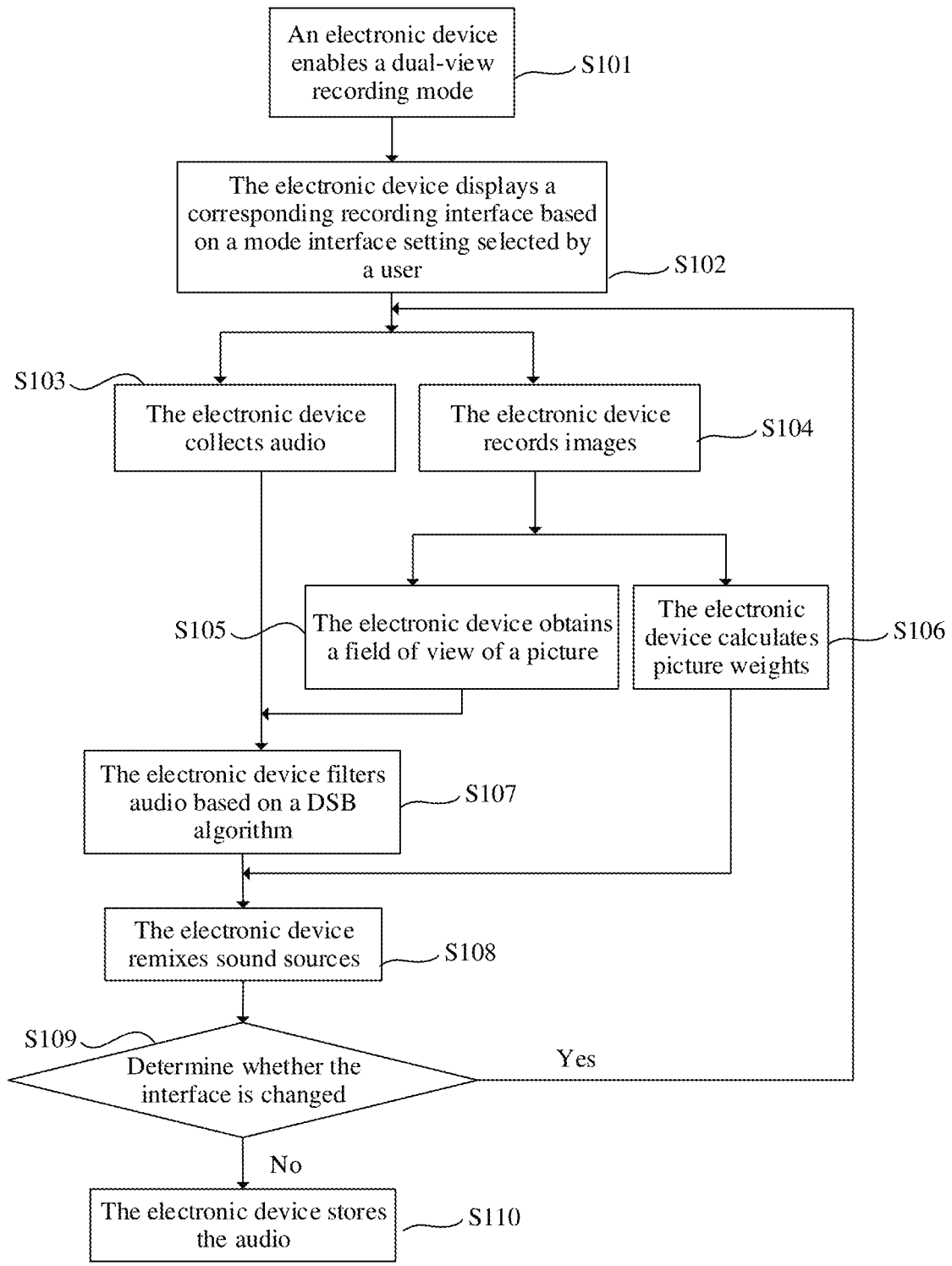
FIG. 9 is a flowchart of an audio processing method according to an embodiment of this application.

FIG. 9 is a flowchart of an audio processing method according to an embodiment of this application. In this method, audio is separately filtered based on a DSB algorithm by using a field of view as an input of the DSB algorithm with reference to fields of view of two pictures in dual-view recording, and then the audio is remixed so that obtained audio can have a stereoscopic effect synchronized with the pictures. As shown in FIG. 9, the method provided in this embodiment of this application may include the following steps.

S101. An electronic device enables a dual-view recording mode.

For example, the electronic device may detect a touch operation (such as a tap operation on an icon 4031) on the icon 4031 of Camera shown in FIG. 4(A), and start the Camera application in response to the operation.

Then, after detecting a user operation of selecting "Dual-view recording mode", the electronic device starts the dual-view recording mode. For example, the user operation may be a touch operation (such as a tap operation) on the dual-view recording control 601 shown in FIG. 5(B). The user operation may alternatively be another type of user operation such as a voice command.

Not limited to being selected by a user, the electronic device 100 may select "Dual-view recording mode" by default after the Camera application is started.

S102. The electronic device displays a corresponding recording interface based on the user's adjustment to a recording interface.

Before starting video recording, the electronic device may detect the user's settings of an interface style in the dual-view recording mode. Refer to related user interfaces shown in FIG. 5(A) to FIG. 5(D), FIG. 6(A) to FIG. 6(H), FIG. 7A, FIG. 7B, and FIG. 7C. Adjustment of the recording interface includes but is not limited to the following:

① Switching a Split-Screen Mode in the Dual-View Recording Mode

For example, the electronic device may detect a touch operation on the split-screen option control 709 shown in FIG. 6(A) (such as a tap operation on the control 709), and switch the split-screen mode in response to the operation.

② Performing Zooming on an Area of a Viewfinder Frame

For example, the electronic device may detect a pinch-to-zoom-in operation on the view finder frame 802 shown in FIG. 6(D), and zoom in the viewfinder frame 802 in response to the operation; or detect a sliding operation on the separator line 706 shown in FIG. 5(C), zoom out the viewfinder frame 701 in response to the operation, and zoom in the viewfinder frame 702.

③ Adjusting a Focal Length of a Camera

For example, the electronic device may detect a pinch operation on the focus adjustment control 802A shown in FIG. 6(D), and increase a focal length of a camera corresponding to the viewfinder frame 802 in response to the operation, to adjust the focal length from 2× to 3×.

The adjustment of the focal length may be adjustment of a focal length of a rear-facing camera, or adjustment of a front-facing camera. When two cameras used in the dual-view recording are respectively the front-facing camera and the rear-facing camera, the adjustment of the focal length may alternatively be adjustment of both the focal length of the front-facing camera and the rear-facing camera.

④ Switching Between Front-Facing and Rear-Facing Cameras

For example, the electronic device may detect a tap operation on the control 901B shown in FIG. 7A, and switch a camera corresponding to the viewfinder frame 901 in FIG. 7A from the front-facing camera to the rear-facing camera in response to the operation. For a switched-to user interface, refer to the recording interface 92 shown in FIG. 7C.

⑤ Interchanging Pictures of Two Viewfinder Frames

For example, the electronic device may detect a tap operation on the picture swap control 708 shown in FIG. 5(D), and swap picture content of the viewfinder frame 701 and picture content of the viewfinder frame 702 in response to the operation.

It should be understood that switching of the pictures of the two viewfinder frames is actually to swap cameras corresponding to the two viewfinder frames. Therefore, after the swapping, front-facing/rear-facing and focal length information of the cameras corresponding to the two viewfinder frames are swapped accordingly.

S103. The electronic device collects audio.

The electronic device detects a user operation indicating to start video recording, such as a tap operation on the control 704 shown in FIG. 5. (C), and an audio collection apparatus (such as a microphone) in the electronic device collects an audio signal in an environment.

Specifically, a microphone is used as an example, and the electronic device may be provided with M microphones, where M>1 and M is a positive integer. In the dual-view recording mode, the M microphones may simultaneously collect an audio signal in the environment to obtain M audio signals.

It should be noted that collecting an audio signal means that a collected sound is used as an input sound source of the electronic device. Collection of the sound source may be determined based on performance of the microphone. Optionally, the sound may be an omnidirectional 360° spatial sound or may be another sound, such as a directional spatial sound, which is not limited in this application. In this embodiment and other embodiments, the M audio signals may also be referred to as sounds of a real-time environment.

It should be noted that after delivery of the electronic device, a position of the microphone of the electronic device in the electronic device is already fixed, and the position of the microphone in the electronic device does not change during subsequent use of the electronic device. In other words, when M>1, relative positions of all microphones in the electronic device are fixed, and therefore distances between each microphone and the other (M−1) microphones are also fixed.

S104. The electronic device records images.

The electronic device detects a user operation indicating to start video recording, such as a tap operation on the control 704 shown in FIG. 5(C), and the electronic device starts to perform image collection and shooting by using two cameras at the same time.

Specifically, the electronic device may be provided with N cameras, where N≥2 and N is a positive integer. The N cameras may be a combination of front-facing cameras or rear-facing cameras. The N cameras may also be a combination of cameras with any focal lengths among wide-angle cameras, ultra-wide-angle cameras, and long-focus cameras. The combination of the N cameras is not limited in this application. During recording, the electronic device uses two viewfinder frames on a screen based on selection of cameras in S102 (for example, selection of the front/rear-facing camera and selection of a focal length of the camera) by the user to respectively present two images collected by two cameras.

A display of the electronic device may display two images from the two cameras in a manner such as splicing (refer to the horizontally split-screen in the foregoing description) or picture-in-picture, so that the two images from the two cameras may be presented to the user at the same time.

The following describes steps S105 to S107 in this embodiment of this application with reference to the recording interface 90 shown in FIG. 7A.

S105. The electronic device obtains a field of view of a picture.

Refer to the recording interface 90 shown in FIG. 7A. The electronic device is performing dual-view recording in a horizontally split-screen mode by using a front-facing camera with a fixed focal length multiplier of 1× and a rear-facing camera with a focal length multiplier of 3×. In this case, a picture (referred to as a first picture below) presented in an upper view finder frame 901 is a picture shot by the front-facing camera, and is the user's own face; a picture (referred to as a second picture below) presented in a lower viewfinder frame 902 is a picture shot by the rear-facing camera, and is a landscape image in front of the electronic device 100.

In this case, it can be learned from the foregoing Table 1 that a value of a field of view of the first picture is 180°, and a value of a field of view of the second picture is 90°.

S106. The electronic device calculates picture weights.

Refer to the foregoing related description of the concept of "picture weight". The following describes in detail a manner of calculating picture weights of two display regions in a horizontally split-screen interface with reference to the recording interface shown in FIG. 7A. In the recording interface 90 shown in FIG. 7A, a length of the display of the electronic device is do, a width thereof is (d1+d2), a width of the first picture is d1, a width of a display region of the first picture is d1, and a width of a display region of the second picture is d2. In this case, the electronic device may calculate picture weights w1 and w2 of the two pictures as follows:

$$w1 = d1/(d1 + d2)$$
$$w2 = d2/(d1 + d2)$$

w1 is a picture weight of the first picture, and w2 is a picture weight of the second picture.

S107. The electronic device filters audio based on a DSB algorithm.

In order to enable pictures and audio of the dual-view recording have a synchronous stereoscopic effect, the electronic device uses information about the fields of view of the pictures obtained in S105 to filter the audio collected by the audio collection apparatus in S103, so as to obtain beams corresponding to the two pictures. This process may be implemented by an algorithm such as a blind source separation algorithm or a beamforming algorithm, which is not limited in this embodiment of this application.

The following further describes a process of audio filtering by using the beamforming algorithm as an example.

It is assumed that the electronic device is provided with M microphones, where M is greater than 1. During dual-view recording, the M microphones obtain M audio signals through collection. The electronic device may convert the M audio signals from time-domain signal to frequency-domain signals based on an FFT algorithm, and then filter the M audio signals based on front-facing/rear-facing information and a focal length (namely, field of view information) of the two cameras in the dual-view recording. A formula used for filtering is as follows:

$$y(\omega) = \sum_{i=1}^{M} w_i(\omega) x_i(\omega)$$

i=1, 2, 3, . . . , M, $x_i(\omega)$ represents an audio signal collected by an $i^{th}$ (i≤M) microphone in the electronic device, $w_i(\omega)$ may be obtained by using the DSB algorithm, a CVX beam training method, or the like, and represents a weight vector of a beamformer when a frequency of the audio signal of the $i^{th}$ microphone is $\omega$. It should be understood that regardless of which algorithm is used to implement audio filtering, $w_i(\omega)$ is a necessary parameter that is strongly related to a filtering direction in the algorithm.

In this embodiment, $w_i(\omega)$ is obtained based on the DSB algorithm. It should be understood that when $w_i(\omega)$ is obtained by using the DSB algorithm, input of the DSB algorithm includes distances between the $i^{th}$ microphone and the other (M−1) microphones, front-facing/rear-facing information of the camera, and the focal length. Therefore, when $w_i(\omega)$ is used for filtering, the audio signal collected by the $i^{th}$ microphone may be enhanced to in a specific direction an extent, and the specific direction is roughly front-facing/rear-facing information of the camera and a range and a direction of a field of view corresponding to the focal length. The range and direction of the field of view determine picture content presented by the viewfinder frame. In this way, a direction sense and an auditory sense of the pictures can be synchronized.

The recording interface 90 shown in FIG. 7A is still used as an example for description. The field of view information of the two pictures is already calculated in step S105, where the field of view of the first picture is +180°, and the field of view of the second picture is −90°. Based on the two fields of view, the electronic device may calculate, by using the DSB algorithm, weight vectors $w_i^1(\omega)$ and $w_i^2(\omega)$ required for filtering the first picture and the second picture, and filter the collected audio based on the two weight vectors, to obtain beams y1(ω) and y2(ω) corresponding to the first picture and the second picture, which may be expressed as follows:

$$y1(\omega) = \sum_{i=1}^{M} w_i^1(\omega) x_i(\omega)$$
$$y2(\omega) = \sum_{i=1}^{M} w_i^2(\omega) x_i(\omega)$$

It can be learned from the foregoing related descriptions of FIG. 7A and FIG. 8A that the beam y1(ω) is the audio signal 1 in FIG. 8A, and the beam y2(ω) is the audio signal 2 in FIG. 8A. It should be noted that the beam y1(ω) and the beam y2(ω) obtained herein have no difference in terms of left and right channels.

S108. The electronic device remixes sound sources.

After obtaining the beams and the picture weights corresponding to the two pictures, the electronic device mixes the two beams with reference to the picture weights of the two pictures.

The recording interface 90 shown in FIG. 7A is still used as an example for description. In order to enable the audio to be output through two channels, the electronic device may perform dual-channel virtualization on the beam y1(ω) and the beam y2(ω):

$$y1l(\omega) = y1(\omega)$$
$$y1r(\omega) = y1(\omega)$$
$$y2l(\omega) = y2(\omega)$$
$$y2r(\omega) = y2(\omega)$$

After remixing, a specific form of the audio finally output by the electronic device in the recording interface 90 may be expressed as follows:

$$outl(\omega) = y2l(\omega) \times w2 + y1l(\omega) \times w1$$
$$outr(\omega) = y2r(\omega) \times w2 + y1r(\omega) \times w1$$

It is not difficult to understand that, in this embodiment, for outl(ω) and outr(ω), left-channel audio and right-channel audio may be distinguished in the formula, the two pieces of audio data are actually the same, and may actually be the same in terms of hearing during playing.

S109. The electronic device determines whether the interface is changed.

During dual-view recording, the electronic device detects in real time whether the recording interface is changed. In addition, the electronic device may change the recording interface in response to a detected user operation. It should be understood that when the recording interface is changed, the picture weights, front-facing/rear-facing information, and the focal length information of the two pictures of the electronic device in the dual-view recording mode may all change.

Therefore, when the recording interface of the electronic device is changed, if the electronic device does not terminate or end the dual-view recording mode, the electronic device performs steps S103 to S104 again, to update some parameters related in steps S105 to S108 in time based on the changed recording interface, and performs audio filtering and remixing based on viewing angles and areas of the two pictures in the updated recording interface.

For manners of changing the recording interface, refer to the changing manners shown in the related user interfaces shown in FIG. 5(A) to FIG. 5(D) and FIG. 6(A) to FIG. 6(H), or refer to the six scenarios ① to ⑥ for setting the user interface style in step S102. Details are not described herein again.

S110. The electronic device stores processed audio.

After the user completes recording, the electronic device may stop or disable the dual-view recording mode in response to a user operation. For example, the electronic device detects a user operation indicating to stop video recording, such as another tap operation on the control 704 shown in FIG. 5(C), and the electronic device stop audio collection and processing. The user operation may alternatively be another type of user operation such as a voice command.

Then, the electronic device may convert, based on an IFFT algorithm, the audio signals outl(ω) and outr(ω) obtained in step S108 into time-domain signals outl(t) and outr(t), which are stored together with a recorded video into a local memory.

Assuming that the electronic device supports two-channel output, when the audio signals outl(t) and outr(t) are played, outl(t) and outr(t) may be output respectively by using two speakers in the electronic device. However, because the two audio signals actually have no essential difference, audio heard by the user's left and right ears may be very slightly different. In addition, when areas of the two display regions are almost the same or are equal (as shown in FIG. 5(C)), the user may feel that sound loudness is approximately equal between the two pictures when hearing the audio.

In some embodiments, after performing steps S103 and S104, the electronic device may first store a recorded video file and initial audio into the memory. Then, even if the recording interface changes, the electronic device may also first store the initial audio recorded in the interface. It should be understood that the audio obtained in this case has not been processed through steps S105 to S108. After an entire recording process ends, the electronic device obtain a moment at which the recording interface changes and field of view information of the recording interface with reference to the video file to perform processing provided in steps S105 to S108 on an initial audio file, so as to obtain target audio finally used for outputting. Optionally, the target audio and the video file are combined to obtain a recorded file for storage, which is used for subsequent playing by the user. Optionally, after storing the target audio, the electronic device may delete the initial audio, so as to save storage space of the device, or both of them may be stored for subsequent use by the user.

It should be understood that, not limited to the recording interface 90 shown in FIG. 7A, the audio processing method provided in this embodiment is also applicable to processing of audio recorded in the recording interfaces shown in FIG. 5(A) to FIG. 5(D), FIG. 6(A) to FIG. 6(H), FIG. 7B, and FIG. 7C and other recording interfaces. For example, in FIG. 7B, the recording interface 91 is in a picture-in-picture dual-view recording mode, and the electronic device may also obtain the front-facing/rear-facing information, focal length information, and picture weights of two pictures in the recording interface 91, and use the audio processing method provided in this embodiment to filter and combine audio recorded in the recording interface 91. No further examples are provided herein again for description.

Figure 10:
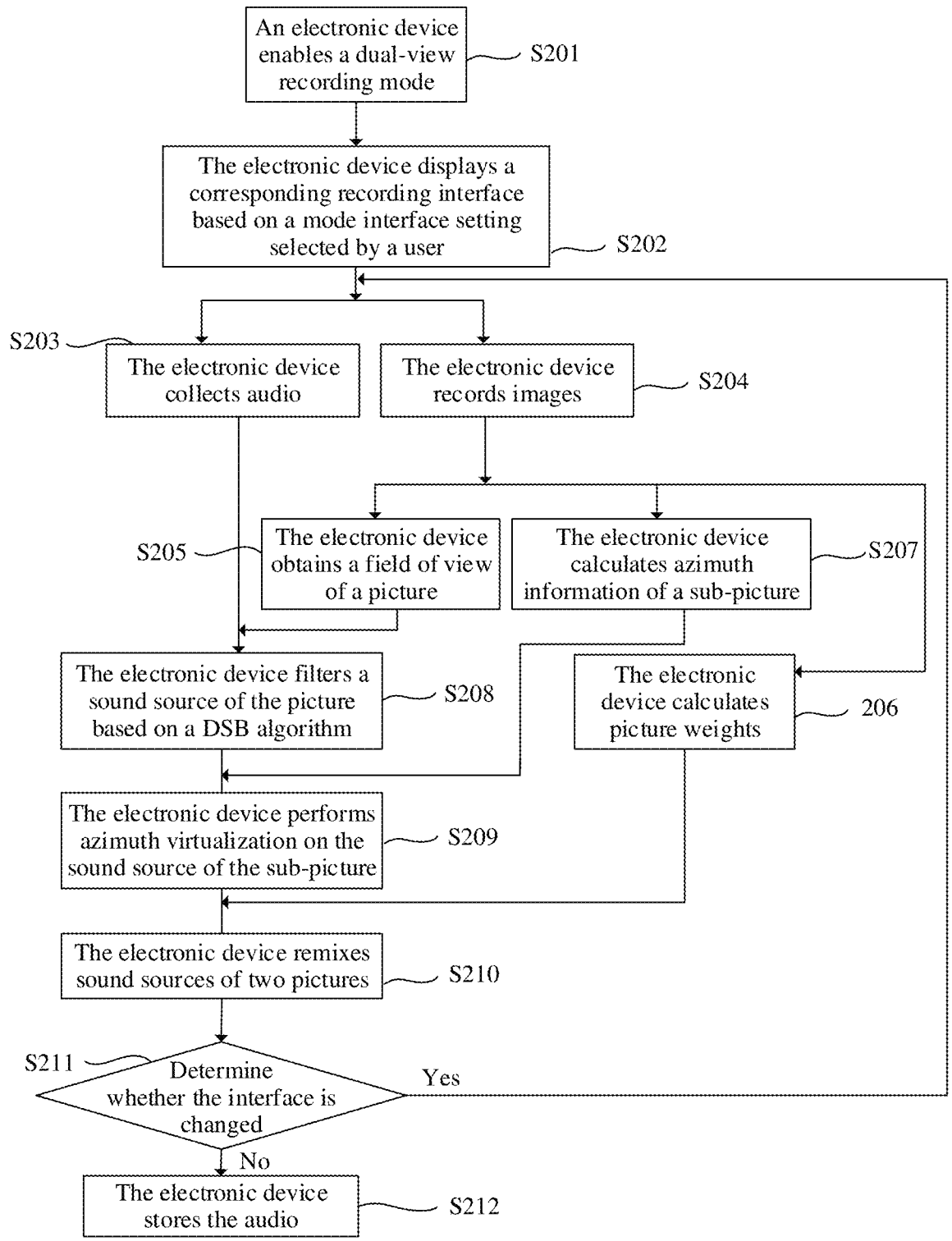
FIG. 10 is a flowchart of another audio processing method according to an embodiment of this application.

FIG. 10 is a flowchart of another audio processing method according to an embodiment of this application. On a basis of FIG. 9, this method can be used to perform azimuth virtualization on audio in a picture-in-picture dual-view recording mode to cooperate with a direction sense of the two pictures, so as to further enhance a stereoscopic effect of the audio.

Before a specific process of this embodiment is described, sound source azimuth virtualization in this method is first described briefly. In the picture-in-picture dual-view recording mode, a picture with a larger area of the two pictures may be referred to as a main picture, and a picture with a smaller area may be referred to as a sub-picture. Specific positions of the sub-picture and the main picture have a visual sense of deviation in terms of left and right, for example, the sub-picture is located on the left side or the right side of the main picture. In order to enable such a sense of left/right deviation to be synchronized to the audio, an azimuth virtualization technology in this embodiment may be used for implementation.

It is not difficult to understand that in a horizontally split-screen dual-view recording mode, relative positions of the two pictures does not produce such a sense of left/right azimuth deviation. Therefore, the azimuth virtualization technology is applicable only to a recording interface in which the relative positions of the two pictures have such deviation. In other words, when a horizontally split-screen recording interface is used for recording in the dual-view recording mode, if the method in this embodiment is used to process the audio, there is no essential difference between audio finally obtained in this method and the audio obtained by using the method in FIG. 9. Therefore, the following describes a process of the method in this embodiment of this application with reference to the recording interface 91 shown in FIG. 7B.

As shown in FIG. 10, the method provided in this embodiment of this application may include the following steps.

S201. An electronic device enables a dual-view recording mode.

S202. The electronic device displays a corresponding recording interface based on a user's adjustment to a recording interface.

S203. The electronic device collects audio.

S204. The electronic device records images.

For specific implementations of the steps S201 to S204, refer to the descriptions of the steps S101 to S104 in the embodiment corresponding to FIG. 9. Details are not described herein again.

S205. The electronic device obtains a field of view of a picture.

Refer to the recording interface 91 shown in FIG. 7B. In the recording interface 91 shown in FIG. 7B, the user is performing dual-view recording in a picture-in-picture mode by using a front-facing camera with a focal length multiplier of 6× and a rear-facing camera with a focal length multiplier of 2×. In this case, a picture (referred to as a main picture below) presented in a viewfinder frame 911 is a picture shot by the rear-facing camera with a focal length multiplier of 2×, and is a landscape in front of the electronic device 100; a picture (referred to as a sub-picture below) presented in a viewfinder frame 912 is a picture shot by the front-facing camera with a focal length multiplier of 6×, and is the user's own face. In this case, it can be learned from the foregoing Table 1 that a field of view corresponding to the main picture is −90°, and a field of view corresponding to the sub-picture is +30°.

S206. The electronic device calculates picture weights.

Refer to the foregoing related description of the concept of "picture weight". In the recording interface 91 shown in FIG. 7B, a length of the display region of the main picture is D1, a width thereof is Dw, a width of a display region of the sub-picture is d1, and a width thereof is dw. In this case, the electronic device may calculate picture weights wm and ws of the two pictures as follows:

$$ws = \alpha(d1 \times dw)/(D1 \times Dw)$$

$$wm = 1 - ws$$

"x" means a multiplication operation, ws is a picture weight of the sub-picture, wm is a picture weight of the main picture, and α is a correction coefficient, which is a fixed value that has been set after delivery of the electronic device, and has a value range of [1, (D1×Dw)/(d1×dw)]. In this way, it can be avoided that an area difference between the two pictures is too large, causing a value of a picture weight of a viewfinder frame with a smaller area to be too small.

S207. The electronic device calculates azimuth information of the sub-picture.

The recording interface 91 shown in shown 7B is still used as an example for description.

The recording interface in the picture-in-picture mode shown in FIG. 7B is used as an example. A rectangular coordinate system is created, by using a center point O of the main picture the origin, on a plane on which a screen of the mobile phone is located. Horizontal and vertical coordinates of a center point F of the small picture are (a, b), where a and b are values with positive or negative signs. It is stipulated that a horizontal coordinate of a point on the left side of the Y-axis is a negative value, and a horizontal coordinate of a point on the right side of the Y-axis is a positive value. A vertical coordinate of a point below the X-axis is a negative value, and a vertical coordinate of a point above the X-axis is a positive value.

It can be learned from the description that the length of the main picture is D1, the width is Dw, and a unit thereof is the same as that of the coordinate axis. In this case, an azimuth of the sub-picture relative to the main picture may be represented by an azimuth angle z and an elevation angle e, where:

$$z = a/(Dw/2) \times 90°$$

$$e = b/(D1/2) \times 90°$$

S208. The electronic device filters audio based on a DSB algorithm.

In step S208, for specific manners of collecting audio and performing frequency-domain conversion on the audio by the electronic device, refer to related descriptions of step S107 in FIG. 9. Details are not described herein again.

After collecting an audio signal in an environment, the electronic device separately filters the audio signal based on field of view information of the two pictures, to obtain audio signals corresponding to the two pictures.

The recording interface 91 shown in FIG. 7B is still used as an example for description. It can be learned from the description of step S205 that, in the recording interface 91, a field of view corresponding to the main picture is −90°, and a field of view corresponding to the sub-picture is +30°. Based on the two fields of view, the electronic device may calculate, by using the DSB algorithm, weight vectors $w_i^s(\omega)$ and $w_i^m(\omega)$ required for filtering the first picture and the second picture, and filter the collected audio based on the two weight vectors, to obtain beams ys(ω) and ym(ω) corresponding to the first picture and the second picture, which may be expressed as follows:

$$ys(\omega) = \sum_{i=1}^{M} w_i^s(\omega) x_i(\omega)$$

$$ym(\omega) = \sum_{i=1}^{M} w_i^m(\omega) x_i(\omega)$$

It can be learned from related descriptions of FIG. 7A and FIG. 8A that the beam ys(ω) is the audio signal 3 with a same angular direction as ∠FPF' in FIG. 8A, and the beam ym(ω) is the audio signal 4 (not shown in FIG. 8A) with a same angular direction as ∠APA' in FIG. 8A. It should be noted that the beam ys(ω) and the beam ym(ω) obtained herein have no difference in terms of left and right channels.

S209. The electronic device performs azimuth virtualization on a sound source of the sub-picture.

In this embodiment of this application, the azimuth virtualization of the sound source may be implemented by using a method such as mixing proportion adjustment or HRTF filtering. In this embodiment of this application, a process of performing azimuth virtualization on the audio of the sub-picture in this embodiment by using the HRTF filtering method. A database required for the HRTF filtering method may use a database such as a CIPIC HRTF database of University of California, Davis, or an HRTF database of Peking University. In addition, the database may alternatively be obtained through by HRTF modeling and calculation. This is not limited in this embodiment of this application.

The open source CIPIC database is used in this embodiment, and data is selected for convolution based on the azimuth angle z and the elevation angle e. The method for selecting is as follows:

$$zimut = z/90 \times 12 + 13$$

$$elevation = e/90 \times 16 + 9$$

Correspondingly, CIPIC_HRIR used for convolution is as follows:

$$data\_l = hrir\_l(zimut, elevation, :)$$

$$data\_r = hrir\_r(zimut, elevation, :)$$

During azimuth virtualization on the audio of the sub-picture, audio output ysl(ω) and ysr(ω) with a virtual azimuth sense of hearing can be obtained only by performing convolution on ys(ω) with reference to the foregoing CIPIC_HRIR data, where convolution is represented by "*":

$$ysl(\omega) = ys(\omega) * \mathrm{hrir\_l}(zimut, \text{elevation}, :)$$

$$ysr(\omega) = ys(\omega) * \mathrm{hrir\_r}(zimut, \text{elevation}, :)$$

Dual-channel virtualization is performed on the main picture:

$$yml(\omega) = ym(\omega)$$

$$ymr(\omega) = ym(\omega)$$

It should be noted that there is no difference between yml(ω) and ymr(ω) obtained herein and ym(ω). In other words, in this embodiment, in the picture-in-picture dual-scene recording mode, there is no difference between an audio processing process of the main picture by the electronic device in step S201 to step S209 and that in step S101 to S107 in FIG. 9. After remixing, left-channel output of the audio corresponding to the main picture and right-channel output of the audio are actually the same.

However, a difference of this embodiment from the method shown in FIG. 9 lies in that azimuth virtualization is performed on the audio signal of the sub-picture in this embodiment. Because ysl(t) obtained for the sub-picture in step S209 is an audio signal biased to the left channel, the output ysr(t) is an audio signal biased to the right channel. After remixing, left-channel output and right-channel output of the audio corresponding to the sub-picture are different.

S210. The electronic device remixes sound sources.

After obtaining the beams and the picture weights corresponding to the two pictures, the electronic device mixes the two beams with reference to the picture weights of the two pictures.

After remixing, a specific form of the audio finally output by the electronic device in the recording interface 90 may be expressed as follows:

$$outl(\omega) = yml(\omega) \times wm + ysl(\omega) \times ws$$

$$outr(\omega) = ymr(\omega) \times wm + ysr(\omega) \times ws$$

It is not difficult to find that in this embodiment, although yml(ω)×wm and ymr(ω)×wm are the same during mixing, there is a difference between ysl(ω)×ws and ysr(ω)×ws.

During playing of the foregoing audio signals outl(t) and outr(t), outl(t) and outr(t) may be output respectively by using two speakers in the electronic device. When outl(t) and outr(t) are output respectively by using two channels, because the sub-picture is located on the left side of the main picture in the recording interface 91 shown in FIG. 7B, the user may feel that a sound of the sub-picture is coming from the user's left side when the user's two ears hear outl(ω) and outr(ω). In addition, because the area of the sub-picture is smaller than that of the main picture, the user may feel that loudness of the sound of the main picture is larger than that of the sub-picture when hearing the audio.

S211. The electronic device determines whether the interface is changed.

S212. The electronic device stores processed audio.

For specific implementations of the steps S211 and S212, refer to the descriptions of the steps S101 to S104 in the embodiment corresponding to FIG. 9. Details are not described herein again.

It should be understood that, not limited to the recording interface 90 shown in FIG. 7B, the audio processing method provided in this embodiment is also applicable to processing of audio recorded in the recording interfaces shown in FIG. 5(A) to FIG. 5(D), FIG. 6(A) to FIG. 6(H), FIG. 7A, and FIG. 7C and other recording interfaces. In a horizontally split-screen dual-view recording mode, the electronic device may also obtain the front-facing/rear-facing information, focal length information, and picture weights of two pictures in the recording interface In use the audio processing method provided in this embodiment to filter and combine audio recorded in the recording interface 91. No further examples are provided herein again for description. However, in a horizontally split-screen dual-view recording mode, because relative azimuths of the two display regions have no difference in terms of left and right in the horizontally split-screen recording interface, the electronic device does not need to perform step S210 during audio processing. In other words, a specific process of processing the audio collected in the horizontally split-screen recording interface by using the method shown in FIG. 10 may be replaced with the processing process shown in FIG. 9.

Figure 11:
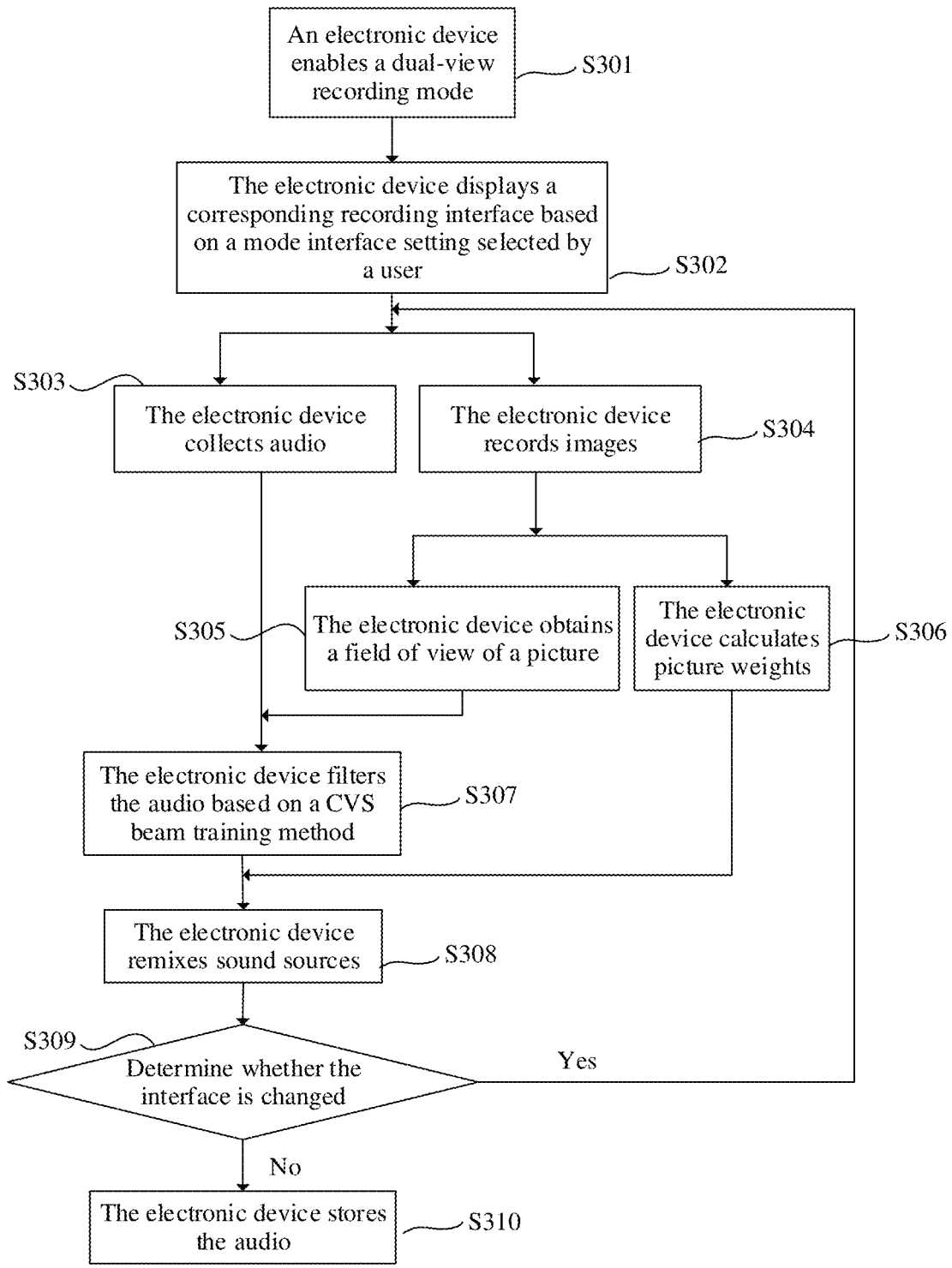
FIG. 11 is a flowchart of still another audio processing method according to an embodiment of this application.

FIG. 11 is a flowchart of still another audio processing method according to an embodiment of this application. The method is used to filter a collected audio signal based on a CVX beam training method. Field of view information of two pictures can be utilized to make more specific selection of a filtering direction of the audio signal, so that a beam obtained for each picture can have differentiated left and right channels. This can further enhance a stereoscopic effect of the audio. As shown in FIG. 11, the method provided in this embodiment of this application may include the following steps.

S301. An electronic device enables a dual-view recording mode.

S302. The electronic device displays a corresponding recording interface based on a user's adjustment to a recording interface.

S303. The electronic device collects audio.

S304. The electronic device records images.

For specific implementations of the steps S301 to S304, refer to the descriptions of the steps S101 to S104 in the embodiment corresponding to FIG. 9. Details are not described herein again.

S305. The electronic device obtains a field of view of a picture.

Refer to the recording interface 90 shown in FIG. 7A. The electronic device is performing dual-view recording in a horizontally split-screen mode by using a front-facing camera with a fixed focal length multiplier of 1× and a rear-facing camera with a focal length multiplier of 3×. In this case, a picture (referred to as a first picture below) presented in an upper viewfinder frame 901 is a picture shot by the front-facing camera, and is the user's own face; a picture (referred to as a second picture below) presented in a lower viewfinder frame 902 is a picture shot by the rear-facing camera, and is a landscape image in front of the electronic device 100. In this case, it can be learned from the foregoing Table 1 that a field of view of the first picture is +180°, and a field of view of the second picture is −90°.

In order to obtain, based on field of view information of a picture, two beams with differentiated left and right channels corresponding to the picture during beam training on audio in step 307, in this embodiment, the electronic device divides the fields of view after obtaining the field of view of the first picture and the field of view of the second picture.

It can be learned from the description of FIG. 8B that, in FIG. 8B, ∠OPO' (on the left side) is the field of view of the first picture, and ∠BPB' is the field of view of the second picture. A normal line QQ' of a plane on which the electronic device 100 is located is an angle bisector of ∠OPO' (on the left side) and ∠BPB'. In this case, the normal line QQ' divides ∠OPO' (on the left side) into ∠OPQ' (referred to as a left field of view 1 below) and ∠O'PQ' (referred to as a right field of view 1 below), and divides ∠BPB' into ∠BPQ (referred to as a left field of view 2 below) and ∠B'PQ referred to as a right field of view 2 below. In other words, the field of view of the first picture may be divided into the left field of view 1 and the right field of view 1, and the field of view of the second picture may be divided into the left field of view 2 and the right field of view 2.

S306. The electronic device calculates picture weights.

For a specific implementation of step S306, refer to the description of step S106 in the embodiment corresponding to FIG. 9. Picture weights w1 and w2 of the two pictures are respectively:

$$w1 = d1/(d1 + d2)$$

$$w2 = d2/(d1 + d2)$$

w1 is a picture weight of the first picture, and w2 is a picture weight of the second picture.

S307. The electronic device filters audio based on a CVS beam training method.

The following further describes a process of sound source separation by using a beamforming algorithm as an example.

It can be learned from the description of step S107 in FIG. 9 that a calculation formula used for filtering is as follows:

$$y(\omega) = \sum_{i=1}^{M} w_i(\omega)x_i(\omega)$$

i=1, 2, 3, . . . , M, $x_i(\omega)$ represents an audio signal collected by an $i^{th}$ (i≤M) microphone in the electronic device, $w_i(\omega)$ may be obtained by using the CVX beam training method, and represents a weight vector of a beamformer when a frequency of the audio signal of the $i^{th}$ microphone is ω. It should be understood that regardless of which algorithm is used to implement audio filtering, $w_i(\omega)$ is a necessary parameter that is strongly related to a filtering direction in the algorithm.

In this embodiment, $w_i(\omega)$ is obtained based on the CVX beam training method. In this embodiment, when $w_i(\omega)$ is obtained based on the CVX beam training method, input of the algorithm includes distances between the $i^{th}$ microphone and the other (M−1) microphones, and an angle of the field of view (namely, a filtering direction). In addition, different from a DSB algorithm, in the CVX beam training method, an input filtering direction during a process of calculating $w_i(\omega)$ may be flexibly changed. In step S105, field of view information of the two pictures is already calculated. Therefore, in this embodiment of this application, a field of view of a specific picture may be divided based on left and right into fields of view as input of the method to obtain two different weight vectors $w_{il}(\omega)$ and $w_{ir}(\omega)$. When filtering is subsequently performed by using a beamforming algorithm, two beams corresponding to the picture can be obtained, and the two beams have a difference between the left channel and the right channel.

After collecting an audio signal in an environment, the electronic device separately filters the audio signal based on field of view information of the two pictures, to obtain audio signals corresponding to the two pictures.

The following uses the recording interface 90 shown in shown 7A as an example for description. It can be learned from the description of step S305 that the recording interface 90 shown in FIG. 7A is in a horizontally split-screen mode. In the recording interface 90, the fields of view of the two pictures are divided into the left field of view 1, the right field of view 1, the left field of view 2, and the right field of view 2.

The electronic device may use the left field of view 1 and the right field of view 1 as input to calculate weight vectors $w_{il}^{1}(\omega)$ and $w_{ir}^{1}(\omega)$ required for filtering the first picture, and filter the collected audio based on the two weight vectors, to obtain a left channel beam $y_{il}^{1}(\omega)$ and a right channel beam $y_{ir}^{1}(\omega)$ corresponding to the first picture, which may be expressed as follows:

$$y_{il}^{1}(\omega) = \sum_{i=1}^{M} w_{il}^{1}(\omega)x_i(\omega)$$

$$y_{ir}^{1}(\omega) = \sum_{i=1}^{M} w_{il}^{1}(\omega)x_i(\omega)$$

Similarly, the electronic device may use the left field of view 2 and the right field of view 2 as input to calculate weight vectors $w_{iLeft}^{2}(\omega)$ and $w_{iRight}^{2}(\omega)$ required for filtering the second picture, and filter the collected audio based on the two weight vectors, to obtain a left channel beam $y_{iLeft}^{2}(\omega)$ and a right channel beam $y_{iRight}^{2}(\omega)$ corresponding to the second picture, which may be expressed as follows:

$$y_{il}^{2}(\omega) = \sum_{i=1}^{M} w_{il}^{2}(\omega)x_i(\omega)$$

$$y_{ir}^{2}(\omega) = \sum_{i=1}^{M} w_{ir}^{2}(\omega)x_i(\omega)$$

It can be learned from related descriptions of FIG. 7A and FIG. 8B that the beam $y_{il}^{1}(\omega)$ is the left-channel audio signal 11 in FIG. 8B, and the beam $y_{ir}^{1}(\omega)$ is the right-channel audio signal 12 in FIG. 8A; and $y_{il}^{2}(\omega)$ is the left-channel audio signal 21 in FIG. 8B, and $y_{ir}^{2}(\omega)$ is the right-channel audio signal 22 in FIG. 8B.

S308. The electronic device remixes sound sources.

After obtaining the beams and the picture weights corresponding to the two pictures, the electronic device mixes the two beams with reference to the picture weights of the two pictures.

The recording interface 90 shown in FIG. 7A is still used as an example for description. After remixing, a specific form of the audio finally output by the electronic device in the recording interface 90 may be expressed as follows:

$$outl(\omega) = y_{il}^{1}(\omega) \times w1 + y_{il}^{2}(\omega) \times w2$$

$$outr(\omega) = y_{ir}^{1}(\omega) \times w1 + y_{ir}^{2}(\omega) \times w2$$

Assuming that the electronic device supports dual-channel output, during playing of the foregoing time-domain signals outl(t) and outr(t), outl(t) and outr(t) may be output respectively by using two speakers in the electronic device. Because left and right directions of the audio signal are distinguished during filtering, the audio heard by the user's left and right ears may be more distinct. In addition, when areas of the two display regions are almost the same or are equal (as shown in FIG. 5(C)), the user may feel that sound loudness is approximately equal between the two pictures when hearing the audio. It is not difficult to find that in this embodiment, when outl(ω) and outr(ω) are used for outputting, the user can better perceive a difference of the audio between the left and right channels, so that the sound has a better stereoscopic effect.

S309. The electronic device determines whether the interface is changed.

S310. The electronic device stores processed audio.

For specific implementations of the steps S309 and S310, refer to the descriptions of the steps S109 and S110 in the embodiment corresponding to FIG. 9. Details are not described herein again.

It should be understood that, not limited to the recording interface 90 shown in FIG. 7A, the audio processing method provided in this embodiment is also applicable to audio recorded in the recording interfaces shown in FIG. 5(A) to FIG. 5(D), FIG. 6(A) to FIG. 6(H), FIG. 7B, and FIG. 7C and other recording interfaces.

For example, in the recording interface 91 shown in FIG. 7B, in a picture-in-picture dual-view recording mode, the electronic device may also obtain the front-facing/rear-facing information, focal length information, and picture weights of two pictures in the recording interface (for details, refer to the descriptions of step S205 to step S207 in FIG. 10), and filter and combine the audio with reference to steps S305 to step S308. No further examples are provided herein again for description.

Figure 12:
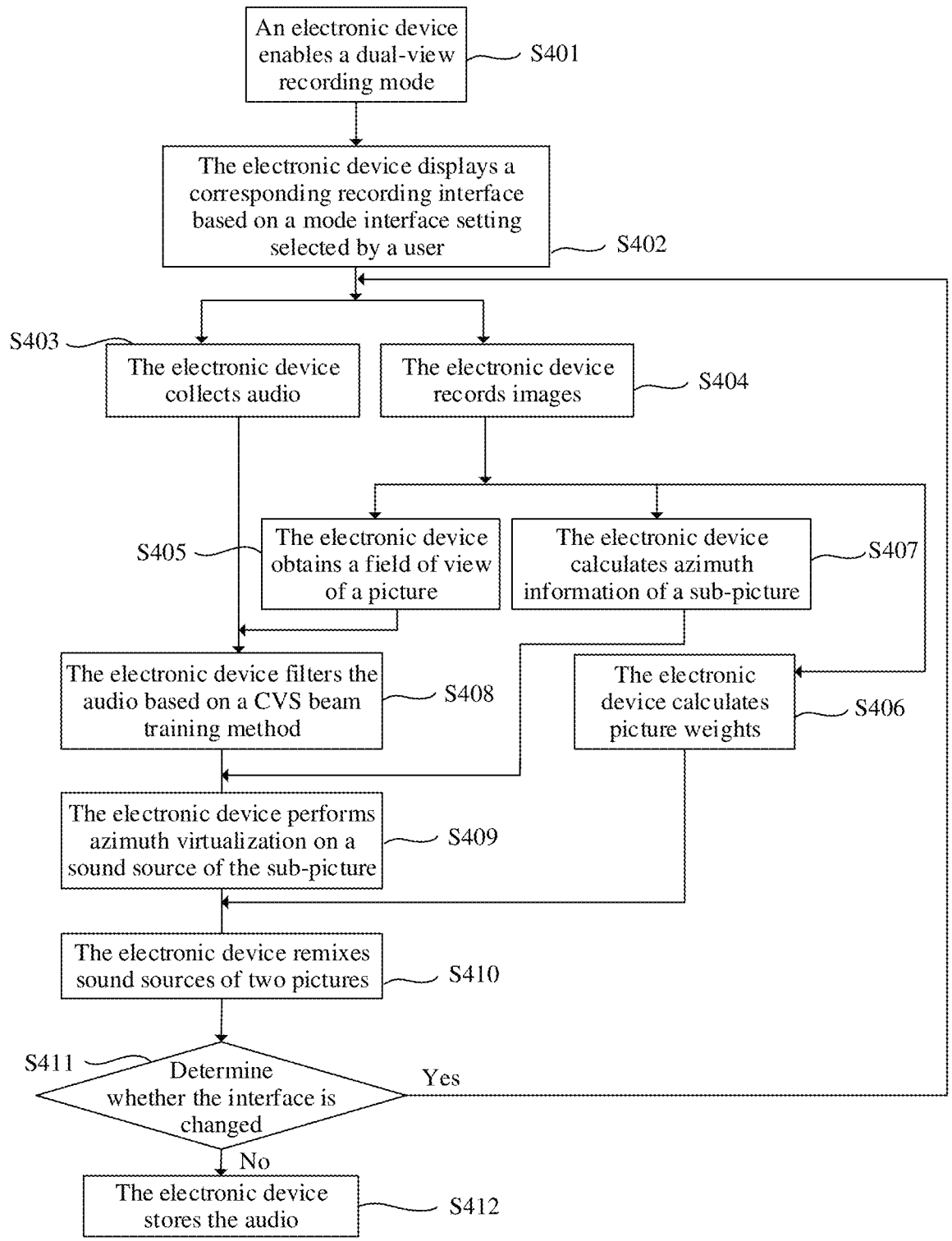
FIG. 12 is a flowchart of yet another audio processing method according to an embodiment of this application.

FIG. 12 is a flowchart of another audio processing method according to an embodiment of this application. On a basis of FIG. 11, this method can be used to perform azimuth virtualization on audio in a picture-in-picture dual-view recording mode to cooperate with a direction sense of the two pictures, so as to further enhance a stereoscopic effect of the audio.

With reference to the description of FIG. 10, when a horizontally split-screen recording interface is used for recording in the dual-view recording mode, if the method in this embodiment is used to process the audio, there is no essential difference between a specific processing process of this method and accordingly obtained audio and the processing process of the method shown in FIG. 11 and accordingly obtained audio. Therefore, the following describes specific steps of the method with reference to the recording interface 91 shown in FIG. 7B.

As shown in FIG. 12, the method provided in this embodiment of this application may include the following steps.

S401. An electronic device enables a dual-view recording mode.

S402. The electronic device displays a corresponding recording interface based on a user's adjustment to a recording interface.

S403. The electronic device collects audio.

S404. The electronic device records images.

For specific implementations of the steps S401 to S404, refer to the descriptions of the steps S101 to S104 in the embodiment corresponding to FIG. 9. Details are not described herein again.

S405. The electronic device obtains a field of view of a picture.

Refer to the recording interface 91 shown in FIG. 7B. In the recording interface 91 shown in FIG. 7B, the user is performing dual-view recording in a picture-in-picture mode by using a front-facing camera with a focal length multiplier of 6×, and a rear-facing camera with a focal length multiplier of 2×. In this case, a picture (referred to as a main picture below) presented in a viewfinder frame 911 is a picture shot by the rear-facing camera with a focal length multiplier of 2×, and is a landscape in front of the electronic device 100; a picture (referred to as a sub-picture below) presented in a viewfinder frame 912 is a picture shot by the front-facing camera with a focal length multiplier of 6×, and is the user's own face. In this case, it can be learned from the foregoing Table 1 that a value of a field of view corresponding to the main picture is 90°, and a value of a field of view corresponding to the sub-picture is 30°.

In order to obtain, based on field of view information of a picture, two beams with differentiated left and right channels corresponding to the picture during RVX beam training on audio in step 407, in this embodiment, the electronic device divides the field of view of the main picture after obtaining the field of view of the main picture. It can be learned from the description of FIG. 8B that ∠FPF is the field of view (referred to as a field of view 3 below) of the sub-picture, and ∠APA' is the field of view (referred to as a field of view 4) of the main picture. A normal line QQ' of a plane on which the electronic device 100 is located is an angle bisector of ∠APA'. In this case, the normal line QQ' divides ∠APA' into ∠APQ (referred to as a left field of view 4 below) and ∠A'PQ (referred to as a right field of view 4 below). However, an area of the sub-picture is relatively small, and subsequently, azimuth virtualization needs to be performed, with reference to relative positions of the sub-picture and the main picture, on an audio signal obtained through RVX beam training of the sub-picture. Therefore, during the RVX beam training on the audio, left and right channel beams do not need to be distinguished, and the electronic device does not need to divide the field of view of the sub-picture.

S406. The electronic device calculates picture weights.

S407. The electronic device calculates azimuth information of the sub-picture.

For specific implementations of the steps S406 and S407, refer to the descriptions of the steps S206 and S207 in the embodiment corresponding to FIG. 9. Details are not described herein again.

Specifically, in step S406, the electronic device may calculate picture weights wm and ws of the two pictures as follows:

$$ws = \alpha \times dl \times dw/(Dl \times Dw)$$

$$wm = 1 - ws$$

ws is a picture weight of the sub-picture, wm is a picture weight of the main picture, and α is a correction coefficient, which is a fixed value that has been set after delivery of the electronic device, and has a value range of [1, (D1×Dw)/(d1×dw)]. In this way, it can be avoided that an area difference between the two pictures is too large, causing a value of a picture weight of a viewfinder frame with a smaller area to be too small.

In step S406, the electronic device may calculate an azimuth angle z and an elevation angle e as follows:

$$z = a/(Dw/2) \times 90°$$

$$e = b/(Dl/2) \times 90°$$

S408. The electronic device filters audio based on a CVS beam training method.

In step S408, for specific manners of collecting audio and performing frequency-domain conversion on the audio by the electronic device, refer to related descriptions of step S107 in FIG. 9. Details are not described herein again.

After collecting an audio signal in an environment, the electronic device separately filters the audio signal based on field of view information of the two pictures, to obtain audio signals corresponding to the two pictures.

The recording interface 91 shown in FIG. 7B is still used as an example for description. It can be learned from the description of step S405 that in the recording interface 91 shown in FIG. 7B, the field of view of the sub-picture is the field of view 3, and the field of view 4 of the main picture is divided into the left field of view 4, and the right field of view 4.

The electronic device uses the left field of view 3 as input to calculate a weight vector $w_i^3(\omega)$ required for filtering the sub-picture, and filters the collected audio based on the weight vector, to obtain a beam $y_i^3(\omega)$ corresponding to the sub-picture, which may be expressed as follows:

$$y_i^3(\omega) = \sum_{i=1}^{M} w_i^3(\omega) x_i(\omega)$$

Similarly, the electronic device may use the left field of view 4 and the right field of view 4 as input to calculate weight vectors $w_{iLeft}^4(\omega)$ and $w_{iRight}^4(\omega)$ required for filtering the main picture, and filter the collected audio based on the two weight vectors, to obtain a left channel beam $y_{iLeft}^4(\omega)$ and a right channel beam $y_{iRight}^4(\omega)$ corresponding to the main picture, which may be expressed as follows:

$$y_{il}^4(\omega) = \sum_{i=1}^{M} w_{il}^4(\omega) x_i(\omega)$$

$$y_{ir}^4(\omega) = \sum_{i=1}^{M} w_{ir}^4(\omega) x_i(\omega)$$

It can be learned from related descriptions of FIG. 7A and FIG. 8B that the beam $y_i^3(\omega)$ is the audio signal 31 (not shown in FIG. 8B) with a same angular direction as ∠FPF' in FIG. 8B, the beam $y_{il}^4(\omega)$ is the left-channel audio signal 41 (not shown in FIG. 8B) with a same angular direction as ∠BPQ in FIG. 8B, and $y_{ir}^4(\omega)$ is the right-channel audio signal 42 (not shown in FIG. 8B) with a same angular direction as ∠B'PQ in FIG. 8B.

S409. The electronic device performs azimuth virtualization on a sound source of the sub-picture.

Refer to the description of step S409 in FIG. 10. The open source CIPIC database is used in this embodiment, and data is selected for convolution based on the azimuth angle z and the elevation angle e. The method for selecting is as follows:

$$zimut = z/90 \times 12 + 13$$

$$elevation = e/90 \times 16 + 9$$

Correspondingly, CIPIC_HRIR used for convolution is as follows:

$$data\_l = hrir\_l(zimut, elevation, :)$$

$$data\_r = hrir\_r(zimut, elevation, :)$$

During azimuth virtualization on the audio of the sub-picture, convolution only needs to be performed on $y_i^3(\omega)$ with reference to the foregoing CIPIC_HRIR data, where convolution is represented by "*":

$$ysl(\omega) = y_i^3(\omega) * hrir\_l(zimut, elevation, :)$$

$$ysr(\omega) = y_i^3(\omega) * hrir\_r(zimut, elevation, :)$$

Dual-channel virtualization is performed on the main picture:

$$yml(\omega) = y_{il}^4(\omega)$$

$$ymr(\omega) = y_{ir}^4(\omega)$$

S410. The electronic device remixes sound sources.

After obtaining the beams and the picture weights corresponding to the two pictures, the electronic device mixes the two beams with reference to the picture weights of the two pictures.

After remixing, a specific form of the audio finally output by the electronic device in the recording interface 90 may be expressed as follows:

$$outl(\omega) = yml(\omega) \times wm + ysl(\omega) \times ws$$

$$outr(\omega) = ymr(\omega) \times wm + ysr(\omega) \times ws$$

During playing of the foregoing audio signals outl(t) and outr(t), outl(t) and outr(t) may be output respectively by using two speakers in the electronic device. When outl(t) and outr(t) are output respectively by using two channels, because the sub-picture is located on the left side of the main picture in the recording interface 91 shown in FIG. 7B, the user may feel that a sound of the sub-picture is coming from the user's left side when the user's two ears hear outl(ω) and outr(ω). Because left and right directions of the audio signal are distinguished during filtering, the audio heard by the user's left and right ears may be more distinct, and the audio has a better stereoscopic effect. In addition, because the area of the sub-picture is smaller than that of the main picture, the user may feel that loudness of the sound of the main picture is larger than that of the sub-picture when hearing the audio.

S411. The electronic device determines whether the interface is changed.

S412. The electronic device stores processed audio.

For specific implementations of the steps S211 and S212, refer to the descriptions of the steps S101 to S104 in the embodiment corresponding to FIG. 9. Details are not described herein again.

It should be understood that, not limited to the recording interface 90 shown in FIG. 7B, the audio processing method provided in this embodiment is also applicable to processing of audio recorded in the recording interfaces shown in FIG. 5(A) to FIG. 5(D), FIG. 6(A) to FIG. 6(H), FIG. 7A, and FIG. 7C and other recording interfaces. In a horizontally split-screen dual-view recording mode, the electronic device may also obtain the front-facing/rear-facing information, focal length information, and picture weights of two pictures in the recording interface In use the audio processing method provided in this embodiment to filter and combine audio recorded in the recording interface 91. No further examples are provided herein again for description. However, if the electronic device detects that the recording interface is changed in step S411, and a changed recording interface is no longer a picture-in-picture recording interface, for example, is changed to a horizontally split-screen dual-view recording mode, because relative azimuths of the two display regions have no difference in terms of left and right in the horizontally split-screen recording interface, the electronic device does not need to perform step S410 during subsequent audio processing. In other words, a specific process of processing the audio collected in the horizontally split-screen recording interface by using the method shown in FIG. 12 may be replaced with the processing process shown in FIG. 11.

Optionally, a processor in the electronic device may perform the audio processing method shown in FIG. 9/FIG. 10/FIG. 11/FIG. 12 when starting to record audio and video. To be specific, in response to a user operation on the control 704 in the user interface shown in FIG. 5(A) to FIG. 5(D), the processor in the electronic device performs the audio processing method shown in FIG. 9/FIG. 10/FIG. 11/FIG. 12 by default.

Optionally, the processor in the electronic device may alternatively perform the audio processing method shown in FIG. 9/FIG. 10/FIG. 11/FIG. 12 when audio and video signals obtained through recording are stored into a memory after the recording of the audio and video ends. The processor in the electronic device performs the audio processing method shown in FIG. 9/FIG. 10/FIG. 11/FIG. 12 when the audio and video signals obtained through the recording are stored into the memory after the recording of the audio and video ends, which can reduce occupation of the processor during an audio recording process, and improve fluency of the audio recording process. In this way, the audio processing method shown in FIG. 9/FIG. 10/FIG. 11/FIG. 12 is performed on the audio signal only when the recorded audio signal needs to be stored, thereby saving processor resources.

It can be learned, from the description of the audio processing methods shown in FIG. 9, FIG. 10, FIG. 11 and FIG. 12 and the user interface embodiments, that the user may adjust the recording interface during dual-view recording. For specific adjustment manners, refer to the description of step S102 in FIG. 9. For some of these adjustment manners, the electronic device may perform smooth processing based on a user operation. For example, when a focal length of a camera is adjusted, an area of a viewfinder frame is zoomed (including adjustment of a position of a separator line between two viewfinder frames in a horizontally split-screen mode and size adjustment of a sub-viewfinder frame in a picture-in-picture mode), a position of a picture is dragged, or a focal length of a camera is adjusted, the user may usually feel that the picture is changing slowly. However, when the user switches a camera corresponding to a specific view finder frame, the electronic device usually requires a specific processing time. For example, when the user switches a camera corresponding to a specific viewfinder frame from a front-facing camera to a rear-facing camera, or when swapping pictures of two viewfinder frames, the user usually feels that the picture is abruptly changed.

In the audio processing method shown in FIG. 9, FIG. 10, FIG. 11, and FIG. 12, when the electronic device switches a camera corresponding to a specific viewfinder frame, a field of view of a picture in the viewfinder frame changes accordingly, and an audio signal obtained by the electronic device by filtering audio based on the picture also changes. However, because the electronic device usually requires a specific processing time for performing lens switching, whereas lens-based audio switching by the electronic device can be completed in a quite short time. In this case, visual perception of the picture and auditory perception of the audio may be unbalanced.

Figure 13:
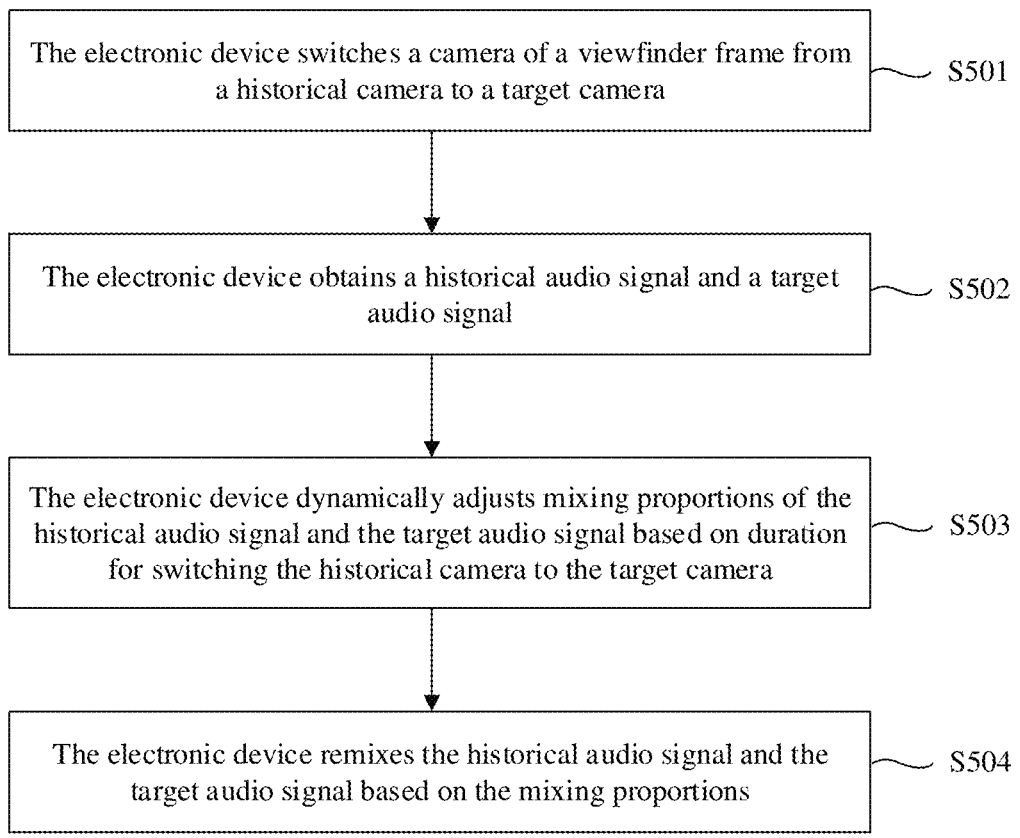
FIG. 13 is a flowchart of a method for smoothly switching audio according to an embodiment of this application.

For such a scenario of adjusting a recording interface, an embodiment of the present application provides a method for smoothly switching audio. An application scenario of the method is not limited to a dual-view shooting mode, but also may be applied to a single-view shooting (common shooting) mode. As shown in FIG. 13, the method may include the following steps.

S501. The electronic device switches a camera of a view finder frame from a historical camera to a target camera.

Specific scenarios of the switching from the historical camera to the target camera include, but are not limited to, switching of the camera corresponding to the view finder frame from a front-facing camera to a rear-facing camera, and swapping of pictures of two viewfinder frames.

For example, the electronic device may detect a tap operation on the control 901B shown in FIG. 7A, and switch a camera corresponding to the viewfinder frame 901 in FIG. 7A from the front-facing camera to the rear-facing camera in response to the operation. For a switched-to user interface, refer to the recording interface 92 shown in FIG. 7C.

For example, the electronic device may detect a tap operation on the picture swap control 708 shown in FIG. 5(D), and swap picture content of the viewfinder frame 701 and picture content of the viewfinder frame 702 in response to the operation.

S502. The electronic device obtains a historical audio signal and a target audio signal.

The historical audio signal is an audio signal obtained by the electronic device by filtering audio based on a picture (field of view) of the historical camera. For example, the historical audio signal is an audio signal obtained, at a moment previous to detection of a camera switching operation by the electronic device, through filtering based on the picture, and is for example, an audio signal at a moment when the user taps a front/rear-facing camera switching button (such as 911B, 912B, or the picture swap control 708) or double-taps the sub-view finder frame 802.

$ya(\omega)$ is used for representation below. The target audio signal is an audio signal $yb(\omega)$ obtained by the electronic device by filtering audio based on a picture (field of view) of the target camera.

For example, the electronic device switches a camera corresponding to the viewfinder frame 901 in FIG. 7A from the front-facing camera to the rear-facing camera in response to a tap operation of the user on the control 901B in FIG. 7A, and a switched-to user interface is the recording interface 92 shown in FIG. 7C, the historical signal ya(ω) is the audio signal 1 shown in FIG. 8A, and the target signal yb(ω) is the audio signal 3 shown in FIG. 8A.

S503. The electronic device dynamically adjusts mixing proportions of the historical audio signal and the target audio signal based on duration for switching the historical camera to the target camera.

A proportion of the historical signal yb(ω) for mixing is represented by β. In this case, a proportion of the target signal ya(ω) for mixing is (1−β), and a method for dynamically adjusting β may be expressed as follows:

$$\beta = (T/T_1 - t)/(T/T_1)$$

T is a time required for the electronic device to switch the historical camera to the target camera, and measured in ms, and a specific value is determined by performance of the electronic device. Optionally, the value of T is duration used for switching the camera, for example, from the front-facing camera to the rear-facing camera. $T_1$ is a frame length for audio processing by the electronic device, which means a frame count for processing an audio signal when the electronic device collects or processes the audio signal. For different electronic devices, T and $T_1$ are related to performance of the electronic device, and different electronic devices may have different T and $T_1$. However, for a fixed electronic device, T and $T_1$ are fixed values. t is a frame count, and a value range of t is [0, $T/T_1-1$]. After the electronic device triggers the action of switching the historical camera to the target camera, t is recorded as 0 as the first frame, and then is accumulated until reaching $T/T_1-1$.

S504. The electronic device remixes the historical audio signal and the target audio signal based on the mixing proportions.

In a process of switching the historical camera to the target camera, the electronic device obtains mixing proportions calculated in each frame, and remixes the historical audio signal and the target audio signal, to obtain audio used for other subsequent operations. A remixing manner may be expressed as follows:

$$yc(\omega) = \beta \times ya(\omega) + (1 - \beta)yb(\omega)$$

yc(ω) is a remixed audio signal.

It can be learned from the remixing formula that camera switching, the proportion of the target signal yb(ω) for mixing is becoming larger, the proportion of the historical signal ya(ω) is becoming smaller. After the camera switching is completed, the proportion of the target signal yb(ω) is 1, and the proportion of the historical signal ya(ω) is 0. In this way, the audio can be smoothly switched with the change of the picture, so that the user feels that a direction of the sound also changes smoothly with switching of the picture.

An embodiment of this application further provides an electronic device. The electronic device includes one or more processors and a memory.

The memory is coupled to the one or more processors, and the memory is configured to store computer program code. The computer program code includes computer instructions, and the one or more processors invoke the computer instructions so that the electronic device is enabled to perform the method in the foregoing embodiments.

As used in the foregoing embodiments, the term "when . . . " may be interpreted to mean "if . . . " or "after . . . " or "in response to it is determined that . . . " or "in response to it is detected . . . ", depending on the context. Similarly, the phrases "when it is determined" or "if the [described condition or event] is detected" may be interpreted, depending on the context, as "if it is determined that . . . " or "in response to it is determined that . . . " or "when the [described condition or event] is detected" or "in response to detection of the [described condition or event]".

All or some of the foregoing embodiments may be implemented by means of software, hardware, firmware, or any combination thereof. When software is used for implementation, the method may be implemented completely or partially in a form of a computer program product. The computer program product includes one or more computer instructions. When the computer program instructions are loaded and executed on the computer, the procedure or functions described in the embodiments of this application are entirely or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk), or the like.

A person of ordinary skill in the art may understand that all or some of the processes of the methods in the foregoing embodiments may be implemented by a computer program instructing relevant hardware. The program may be stored in a computer readable storage medium. During execution of the program, the processes of the foregoing method embodiments may be included. The foregoing storage medium includes: any medium that can store program code, such as a ROM, a random access memory RAM, a magnetic disk, or an optical disc.

What is claimed is:

1. An audio processing method performed by an electronic device, wherein the method comprises:
    displaying a first interface, wherein the first interface comprises a first control;
    detecting a first operation on the first control;
    in response to the first operation, starting shooting at a first moment, and displaying a second interface, wherein the second interface comprises a first display region and a second display region;
    at a second moment, displaying, by the electronic device in the first display region, a first picture collected in real time by a first camera, and displaying, in the second display region, a second picture collected in real time by a second camera;

collecting, by a microphone, a first sound at the second moment, wherein the first sound is a sound of a real-time environment in which the electronic device is located at the second moment, wherein the first sound comprises a first sub-sound and a second sub-sound, the first sub-sound is a sound of the first picture, the second sub-sound is a sound of the second picture;

in response to a camera switching operation, switching, by the electronic device at a third moment, a picture displayed in the first display region from a picture shot by the first camera to a picture shot by a third camera;

displaying, by the electronic device in the first display region at a fourth moment, a third picture shot by the third camera, wherein the fourth moment is after the third moment;

separately filtering, by the electronic device, the first sound based on a third field of view of the third camera and a first field of view of the first camera to obtain a historical sound and a target sound, wherein the first sub-sound is determined based on the historical sound and the target sound;

in a time between the third moment and the fourth moment, dynamically adjusting, by the electronic device, mixing proportions of the historical sound and the target sound based on a time interval between the third moment and the fourth moment, and mixing the historical sound and the target sound based on the mixing proportions to determine the first sub-sound;

after dynamically adjusting the mixing proportions, detecting a second operation on a second control; and in response to the second operation, stopping shooting, and storing a first video, wherein the first video comprises the first picture and the second picture, the first picture and the second picture correspond to a second sound at the second moment of the first video, and the second sound is obtained by processing the first sound based on a picture weight of the first picture and a picture weight of the second picture.

2. The method according to claim 1, wherein the electronic device displays the first display region and the second display region in a horizontally split-screen form, an area of the first display region is a first area, and an area of the second display region is a second area; and the picture weight of the first picture is a proportion of the first area to a total area, the picture weight of the second picture is a proportion of the second area to the total area, and the total area is a sum of the area of the first area and the area of the second area.

3. The method according to claim 1, wherein the first display region is displayed on the second display region in a form of a floating window; an area of the first display region is a first area, and an area of a display of the electronic device is a third area; and the picture weight of the first picture is a proportion of the first area to the third area, and the picture weight of the second picture is a difference between an integer 1 and the picture weight of the first picture.

4. The method according to claim 1, wherein processing the first sound based on the picture weight of the first picture and the picture weight of the second picture comprises:

mixing the first sub-sound and the second sub-sound based on the picture weight of the first picture and the picture weight of the second picture; and when the picture weight of the first picture is greater than the weight of the second picture, using a first sound mixing proportion so that loudness of the first sub-sound is larger than loudness of the second sub-sound; or when the picture weight of the first picture is less than the weight of the second picture, using a second sound mixing proportion so that loudness of the first sub-sound is smaller than loudness of the second sub-sound; or when the picture weight of the first picture is equal to the weight of the second picture, using a third sound mixing proportion so that loudness of the first sub-sound is equal to loudness of the second sub-sound.

5. The method according to claim 1, wherein before the detecting the second operation on the second control, the method further comprises:

storing, by the electronic device, the first sound; and the processing the first sound based on the picture weight of the first picture and the picture weight of the second picture comprises:

processing, by the electronic device, the first sound based on the picture weight of the first picture and the picture weight of the second picture to obtain the second sound; and storing, by the electronic device, the second sound, and deleting the first sound.

6. The method according to claim 1, wherein processing the first sound based on the picture weight of the first picture and the picture weight of the second picture comprises:

separately filtering, by the electronic device, the first sound based on the first field of view of the first camera and a second field of view of the second camera to obtain the first sub- sound and the second sub-sound; and adjusting, by the electronic device, loudness of the first sub-sound and loudness of the second sub-sound based on the picture weight of the first picture and the picture weight of the second picture, and then mixing the first sub-sound and the second sub-sound, to obtain the second sound.

7. The method according to claim 1, wherein processing the first sound based on the picture weight of the first picture and the picture weight of the second picture comprises:

separately filtering, by the electronic device, the first sound based on the first field of view of the first camera and a second field of view of the second camera to obtain the first sub-sound and the second sub-sound;

obtaining, by the electronic device, first azimuth information of the first display region relative to the second display region;

performing azimuth virtualization on the first sub-sound based on the first azimuth information to obtain a first left azimuth sound and a first right azimuth sound; and adjusting, by the electronic device, loudness of the first left azimuth sound, loudness of the first right azimuth sound, and loudness of the second sub-sound based on the picture weight of the first picture and the picture weight of the second picture, and then mixing the first sub-sound and the second sub- sound, to obtain the second sound.

8. The method according to claim 1, wherein processing the first sound based on the picture weight of the first picture and the picture weight of the second picture comprises:

separately filtering, by the electronic device, the first sound based on a first field of view of the first camera and a second field of view of the second camera to obtain the first sub- sound and the second sub-sound, wherein the first sub-sound comprises a first left channel sound and a first right channel sound, the first left channel sound is obtained by the electronic device by filtering the first sound based on a left half angle of the first field of view, and the first right channel sound is obtained by the electronic device by filtering the first sound based on a right half angle of the first field of view;

the second sub-sound comprises a second left channel sound and a second right channel sound, the second left channel sound is obtained by the electronic device by filtering the first sound based on a left half angle of the second field of view, and the second right channel sound is obtained by the electronic device by filtering the first sound based on a right half angle of the second field of view; and adjusting, by the electronic device, loudness of the first left channel sound, loudness of the first right channel sound, loudness of the second left channel sound, and loudness of the second right channel sound based on the picture weight of the first picture and the picture weight of the second picture, and then mixing the first sub-sound and the second sub-sound, to obtain the second sound.

9. An electronic device for audio processing, comprising:
a processor configured to:
display a first interface, wherein the first interface comprises a first control;
detect a first operation on the first control;
in response to the first operation, start shooting at a first moment, and displaying a second interface, wherein the second interface comprises a first display region and a second display region;
at a second moment, display, by the electronic device in the first display region, a first picture collected in real time by a first camera, and displaying, in the second display region, a second picture collected in real time by a second camera;
collect, by a microphone, a first sound at the second moment, wherein the first sound is a sound of a real-time environment in which the electronic device is located at the second moment, wherein the first sound comprises a first sub-sound and a second sub-sound, the first sub-sound is a sound of the first picture, the second sub-sound is a sound of the second picture;
in response to a camera switching operation, switch at a third moment, a picture displayed in the first display region from a picture shot by the first camera to a picture shot by a third camera;
display in the first display region at a fourth moment, a third picture shot by the third camera, wherein the fourth moment is after the third moment;
separately filter the first sound based on a third field of view of the third camera and a first field of view of the first camera to obtain a historical sound and a target sound, wherein the first sub-sound is determined based on the historical sound and the target sound;
in a time between the third moment and the fourth moment, dynamically adjust, by the electronic device, mixing proportions of the historical sound and the target sound based on a time interval between the third moment and the fourth moment, and mixing the historical sound and the target sound based on the mixing proportions to determine the first sub-sound;
after dynamically adjusting the mixing proportions, detect a second operation on a second control; and
in response to the second operation, stop shooting, and storing a first video, wherein the first video comprises the first picture and the second picture, the first picture and the second picture correspond to a second sound at the second moment of the first video, and the second sound is obtained by processing the first sound based on a picture weight of the first picture and a picture weight of the second picture.

10. The electronic device according to claim 9, wherein the processor is further configured to display the first display region and the second display region in a horizontally split-screen form, an area of the first display region is a first area, and an area of the second display region is a second area; and the picture weight of the first picture is a proportion of the first area to a total area, the picture weight of the second picture is a proportion of the second area to the total area, and the total area is a sum of the areas of the first display region and the second display region.

11. The electronic device according to claim 9, wherein the first display region is displayed on the second display region in a form of a floating window; an area of the first display region is a first area, and an area of a display of the electronic device is a third area; and the picture weight of the first picture is a proportion of the first area to the third area, and the picture weight of the second picture is a difference between an integer 1 and the picture weight of the first picture.

12. The electronic device according to claim 9, wherein the processor is further configured to:
mix the first sub-sound and the second sub-sound based on the picture weight of the first picture and the picture weight of the second picture; and
when the picture weight of the first picture is greater than the weight of the second picture, use a first sound mixing proportion so that loudness of the first sub-sound is larger than loudness of the second sub-sound; or
when the picture weight of the first picture is less than the weight of the second picture, use a second sound mixing proportion so that loudness of the first sub-sound is smaller than loudness of the second sub-sound; or
when the picture weight of the first picture is equal to the weight of the second picture, use a third sound mixing proportion so that loudness of the first sub-sound is equal to loudness of the second sub-sound.

13. The electronic device according to claim 9, wherein the processor is further configured to:
store, by the electronic device, the first sound; and
process, by the electronic device, the first sound based on the picture weight of the first picture and the picture weight of the second picture to obtain the second sound; and
store, by the electronic device, the second sound, and deleting the first sound.

14. The electronic device according to claim 9, wherein the processor is further configured to:
separately filter, by the electronic device, the first sound based on the first field of view of the first camera and a second field of view of the second camera to obtain the first sub-sound and the second sub-sound; and
adjust, by the electronic device, loudness of the first sub-sound and loudness of the second sub-sound based on the picture weight of the first picture and the picture weight of the second picture and mix the first sub-sound and the second sub-sound, to obtain the second sound.

15. The electronic device according to claim 9, wherein the processor is further configured to:

separately filter, by the electronic device, the first sound based on the first field of view of the first camera and a second field of view of the second camera to obtain the first sub-sound and the second sub-sound;

obtain, by the electronic device, first azimuth information of the first display region relative to the second display region;

perform azimuth virtualization on the first sub-sound based on the first azimuth information to obtain a first left azimuth sound and a first right azimuth sound; and adjust, by the electronic device, loudness of the first left azimuth sound, loudness of the first right azimuth sound, and loudness of the second sub-sound based on the picture weight of the first picture and the picture weight of the second picture and mix the first sub-sound and the second sub-sound, to obtain the second sound.

16. The electronic device according to claim 9, wherein the processor is further configured to:

separately filter, by the electronic device, the first sound based on the first field of view of the first camera and a second field of view of the second camera to obtain the first sub-sound and the second sub-sound, wherein the first sub-sound comprises a first left channel sound and a first right channel sound, the first left channel sound is obtained by the electronic device by filtering the first sound based on a left half angle of the first field of view, and the first right channel sound is obtained by the electronic device by filtering the first sound based on a right half angle of the first field of view;

the second sub-sound comprises a second left channel sound and a second right channel sound, the second left channel sound is obtained by the electronic device by filtering the first sound based on a left half angle of the second field of view, and the second right channel sound is obtained by the electronic device by filtering the first sound based on a right half angle of the second field of view; and adjust, by the electronic device, loudness of the first left channel sound, loudness of the first right channel sound, loudness of the second left channel sound, and loudness of the second right channel sound based on the picture weight of the first picture and the picture weight of the second picture and mix the first sub-sound and the second sub-sound, to obtain the second sound.

17. A computer program product comprising computer-executable instructions for storage on a non-transitory computer-readable medium that, when executed by a processor of an electronic device, cause the electronic device to:

display a first interface, wherein the first interface comprises a first control;

detect a first operation on the first control;

in response to the first operation, start shooting at a first moment, and displaying a second interface, wherein the second interface comprises a first display region and a second display region;

at a second moment, display, by the electronic device in the first display region, a first image collected in real time by a first camera, and displaying, in the second display region, a second image collected in real time by a second camera;

collect, by a microphone, a first sound at the second moment, wherein the first sound is a sound of a real-time environment in which the electronic device is located at the second moment, wherein the first sound comprises a first sub-sound and a second sub-sound, the first sub-sound is a sound of a first picture, the second sub-sound is a sound of a second picture;

in response to a camera switching operation, switch at a third moment, a picture displayed in the first display region from a picture shot by the first camera to a picture shot by a third camera;

display in the first display region at a fourth moment, a third picture shot by the third camera, wherein the fourth moment is after the third moment;

separately filter the first sound based on a third field of view of the third camera and a first field of view of the first camera to obtain a historical sound and a target sound, wherein the first sub-sound is determined based on the historical sound and the target sound;

in a time between the third moment and the fourth moment, dynamically adjust, by the electronic device, mixing proportions of the historical sound and the target sound based on a time interval between the third moment and the fourth moment, and mixing the historical sound and the target sound based on the mixing proportions to determine the first sub-sound;

after dynamically adjusting the mixing proportions, detect a second operation on a second control; and in response to the second operation, stop shooting, and storing a first video, wherein the first video comprises the first picture and the second picture, the first picture and the second picture correspond to a second sound at the second moment of the first video, and the second sound is obtained by processing the first sound based on a picture weight of the first picture and a picture weight of the second picture.

18. The computer program product according to claim 17, wherein the instructions further cause the electronic device to display the first display region and the second display region in a horizontally split-screen form, wherein an area of the first display region is a first area, and an area of the second display region is a second area; and the picture weight of the first picture is a proportion of the first area to a total area, the picture weight of the second picture is a proportion of the second area to the total area, and the total area is a sum of the areas of the first display region and the second display region.

* * * * *